(12) United States Patent
Johnson

(10) Patent No.: US 12,001,988 B2
(45) Date of Patent: Jun. 4, 2024

(54) AUTOMATED PROCESS TO IDENTIFY OPTIMAL CONDITIONS AND PRACTICES TO GROW PLANTS WITH SPECIFIC ATTRIBUTES

(71) Applicant: Jerome D. Johnson, Waconia, MN (US)

(72) Inventor: Jerome D. Johnson, Waconia, MN (US)

( * ) Notice: Subject to any disclaimer, the term of this patent is extended or adjusted under 35 U.S.C. 154(b) by 0 days.

(21) Appl. No.: 17/532,595

(22) Filed: Nov. 22, 2021

(65) Prior Publication Data

US 2022/0164736 A1 May 26, 2022

Related U.S. Application Data

(60) Provisional application No. 63/117,285, filed on Nov. 23, 2020.

(51) Int. Cl.
*G06Q 10/06* (2023.01)
*G06Q 10/0637* (2023.01)
*G06Q 10/067* (2023.01)
*G06Q 50/02* (2012.01)

(52) U.S. Cl.
CPC ....... *G06Q 10/0637* (2013.01); *G06Q 10/067* (2013.01); *G06Q 50/02* (2013.01)

(58) Field of Classification Search
None
See application file for complete search history.

(56) References Cited

U.S. PATENT DOCUMENTS

| 2015/0100358 A1* | 4/2015 | Klavins | A01M 17/00 |
| | | | 705/7.12 |
| 2020/0077574 A1* | 3/2020 | Bull | A01B 79/005 |
| 2022/0061236 A1* | 3/2022 | Guan | A01G 7/00 |
| 2022/0164736 A1* | 5/2022 | Johnson | G06Q 10/067 |

OTHER PUBLICATIONS

Bulala et al. (Location as a Factor in the Prediction of Performance in Botswana Junior School Certificate Agriculture Examinations by Continuous Assessment Scores; Creative Education; 2014. vol. 5, No. 1, 11-14; Published Online Jan. 2014 in SciRes (http://www.scirp.org/journal/ce)).*

* cited by examiner

*Primary Examiner* — Matthew D Henry
(74) *Attorney, Agent, or Firm* — Olivo IP Law Group, P.C.; John W. Olivo, Jr.

(57) ABSTRACT

The present invention identifies the optimal genetics, environment, and management practices and predicts the probability of growing a crop with the desired attributes, quantifies the attribute, scores relative performance, and identifies actions management can take to increase probability of growing plants with specific attributes. The present invention uses an improved technique of data acquisition known as intelligent sampling. Intelligent sampling functions by identifying a minimal dataset that is used to train the model disclosed herein while still achieving acceptable accuracy.

7 Claims, 95 Drawing Sheets

| | Ash Content | | | |
| --- | --- | --- | --- | --- |
| | Wheat to Flour Conversion Rate | | | |
| | Flour Strength | | | |
| Flour | Gluten Functionality, Strength & Stability | Desired Attribute Metrics | | |
| | Gluten Functionality, Quality & Quantity | | | |
| | Flour Functionality, Water Absorption | | | |
| | Flour Functionality, Damaged Starch | | | |
| | Flour Functionality, Glutenins | | | |
| | Gluten Performance Index | | | |

| Example Attributes: | Metrics |
| --- | --- |
| Ash Content: | <5% |
| Wheat to Flour Conversion Rate: | >74% |
| Flour Functionality, Water Absorption: | <60% |
| Flour Strength: | >180W |
| Attributes & metrics defined by user | |

Figure 2B

| | | | Dough Development Time | | | | |
| --- | --- | --- | --- | --- | --- | --- | --- |
| Attributes | Bread | Manufacturer | Dough Resistance to Extension & Extensibility | Desired Attribute Metrics | | | |
| | | | Machinability, Mixing Tolerance | | | | |
| | | | Stability | | | | |
| | | | Dough Strength | | | | |
| | | | Clean-up Time | | | | |
| | | | Shelf Life | | | $ | $ |

| Example Attributes: | Metrics |
| --- | --- |
| Dough Resistance to Extension & Extensibility: | >80 mm |
| Machinability, Mixing Tolerance: | <30 BU |
| Clean Up time: | <X minutes |
| Stability: | >14 minutes |
| Attributes & metrics defined by user | |

Figure 2C

| | | | Flour to Bread Conversion Rate | | | | |
|---|---|---|---|---|---|---|---|
| Attributes | Bread | Procure | Field Location | Desired Attribute Metrics | | | $ |
| | | | Pesticide Residue | | | | $ |
| | | | Chemical Content | | $ | $ | $ |

| Example Attributes: | Metrics |
|---|---|
| Flour to Bread Conversion Rate: | >42 loaves/bu, |
| Field Location: | <50 miles |
| Pesticide Residue: | 0 |
| Attributes & metrics defined by user | |

Figure 2D

| Attributes | | | | Desired Attribute Metrics | | | |
|---|---|---|---|---|---|---|---|
| Bread | Health | Dietary Fiber | | | $ | $ | |
| | | Mineral Content | | | $ | $ | |
| | | Sodium Content | | | $ | $ | |
| | | Iron Content | | | $ | $ | |
| | | Carbohydrate | | | $ | $ | |
| | | Calcium Content | | | $ | $ | |
| | | Protein Content | | | $ | $ | |
| | | Fat Content | | | $ | $ | |
| | | Calories | | | $ | $ | |

| Example Attributes: | Metrics |
|---|---|
| Dietary Fiber: | 3 g/slice |
| Protein Content: | >5 g/slice |
| Fat Content: | <2 g/slice |
| Calories: | <70 /slice |
| Sodium Content: | <180 mg/slice |
| Carbohydrate: | <28 g/slice |
| Attributes & metrics defined by user | |

Figure 2E

| | | | Aroma | | | $ | $ |
|---|---|---|---|---|---|---|---|
| Attributes | Bread | Sensory | Taste | Desired Attribute Metrics | | $ | $ |
| | | | Crumb & Texture | | | $ | $ |
| | | | Crust Moisture | | | $ | $ |
| | | | Loaf Volume (cc./100g. Loaf) | | | $ | $ |
| | | | Finish including Color | | | $ | $ |

| Example Attributes: | Metrics |
|---|---|
| Aroma: | >X, Y Compound |
| Crumb & Texture | 8 Index |
| Taste: | >X, Y Compound |
| Loaf Volume | >1,000 cc |
| Attributes & metrics defined by user | |

Figure 2F

| Example Attributes: | Metrics |
|---|---|
| Processed Flour: | 0 |
| Added Sugar: | 0 |
| Calcium Sulfate: | 0 |
| Attributes & metrics defined by user | |

Figure 2G

| Attributes | | Desired Attribute Metrics | | |
|---|---|---|---|---|
| Sustainability | GHG | | $ | $ |
| | Soil Health | | $ | $ |
| | Land Use | | $ | $ |
| | Carbon Sequestration | | $ | $ |
| | Chemical Efficiency | | $ | $ |
| | Energy Efficiency | | $ | $ |
| | Fertilizer Efficiency | | $ | $ |
| | Energy Efficiency | | $ | $ |
| | Farmer Profit | | $ | $ |

| Example Attributes: | Metrics |
|---|---|
| GHG: | >20 lbs. CO2e /ac |
| Carbon Sequestration: | > 5 tons/acre |
| Land Use: | -15% for same bu. |
| Fertilizer Efficiency: | < 5 lbs./bu |
| Attributes & metrics defined by user | |

Figure 2H

| | Risks | Supply Risk | Desired Attribute Metrics | | $ $ |
|---|---|---|---|---|---|
| | | Quality Risk | | | $ $ |
| | | Weather and Climate Change Related Risk | | | $ $ |
| | | Supply Chain Performance risk | | | $ $ |
| | | Price Risk | | | $ $ |

| Example Attributes: | Metrics |
|---|---|
| Weather & Climate Change: | - 8.5% risk |
| Quality: | + 85% Probability of achieving attributes |
| Supply Chain Performance: | - 6% risk |
| Attributes & metrics defined by user | |

Figure 3

| | |
|---|---|
| Compaction | |
| Borders Management | |
| Headlands Management | |
| Seed Bed Quality | |
| Seeding Accuracy, Stand Development | |
| Weed Control Efficiencies & Practices | |
| Pest Control Efficiencies & Practices | |
| Disease Control Efficiencies & Practices | |
| Fertility Efficiencies & Practices | |
| Nitrogen Availability, When Needed | |
| Micronutrients Availability When | |
| Canopy Variability | |
| Residue Management | |
| Tillage Type | |
| Tillage Intensity | |
| Lodging | |
| Pre-Harvest Management | |
| Drying | |

(Metrics / Practices / Cropping System)

| Example Cropping System: | Metrics |
|---|---|
| Tillage Type: | Minimum Till |
| Tillage Intensity: | <7 |
| Weed Control: | Variable Rate |
| Seed Bed Quality: | 95% smooth ride |
| Seeding Accuracy: | <5% acres with gaps greater than 2 feet |
| Attributes & metrics defined by user | |

Figure 4B

| Metrics | | Inputs | Cropping System |
|---|---|---|---|
| Seed Variety & Certified | | | |
| Soil Amendments and Nutrition | | | |
| Microbial Usage | | | |
| Chemical Usage | | | |
| Seed Treatments Usage | | | |
| Stabilizers Usage | | | |
| Fungicides Usage | | | |

| Example Cropping System: | Metrics |
|---|---|
| Seed Variety | Seed ABC |
| Seed Treatment | Fungicide |
| Fertilizer: | Time Release N |
| Attributes & metrics defined by user | |

Figure 4C

| | Seeding Date | | Cropping |
|---|---|---|---|
| Metrics | N Application, Foliar @ Flowering | Timing | System |
| | Fungicide Application | | |
| | Harvest Date | | |

| Example Cropping System: | Metrics |
|---|---|
| Panting Date: | Between May 1 - May 10 |
| N Application Date: | Flowering |
| Harvest Date: | Between July 20 – July 30 |
| Attributes & metrics defined by user | |

Figure 4D

| Metrics | Farmer Production Hiastory | Other | Cropping Systems |
| | Storage | | |
| | Transportation & Logistics | | |

| Example Cropping System: | Metrics |
| --- | --- |
| Storage: | Electronic 24 hour monitored |
| Attributes & metrics defined by user | |

Figure 4E

| Area of Interest | Acres | Yield Bu./Ac | Costs $/Bu. | Unrealized Yield[1] Bu. /Acre Area | | Revenue $ | Avoidable Costs[2] $/Bu. $/Area | | Correlation[3] % | Totals $/Ac. $/Area | |
|---|---|---|---|---|---|---|---|---|---|---|---|
| Pothole, not Farmed | 1.3 | 0 | --- | (195) | (254) | ($1,014) | --- | --- | 85% | --- | --- |
| Deep Depression | 1.2 | 135 | $3.70 | (60) | (72) | ($288) | ($1.34) | ($154) | 81% | ($368) | ($442) |
| Poorly Drained Depression | 5.5 | 151 | $3.21 | (44) | (242) | ($968) | ($0.75) | ($113) | 93% | ($197) | ($1,081) |
| Well Drained Depression | 8.1 | 173 | $2.89 | (22) | (178) | ($713) | ($0.33) | ($56) | 93% | ($95) | ($769) |
| Other | 32.4 | 195 | $2.56 | | | | | | | | |

Figure 9B

Example: Two tillage tools impact on farmer profits

Figure 12A

| Protein's Impact on a Food Company's Manufacturing Costs | | % / Point | Points |
|---|---|---|---|
| Manufacturing Characteristics | | | |
| -0.45% | Machinability | -0.15% | 3.00 |
| -0.30% | Proofing time | -0.10% | 3.00 |
| -0.30% | Arrival time | -0.10% | 3.00 |
| -0.30% | Departure time | -0.10% | 3.00 |
| -0.30% | Mixing tolerance | -0.10% | 3.00 |
| -0.30% | Mixing time | -0.10% | 3.00 |
| -0.30% | Dough stability | -0.10% | 3.00 |
| 0.00% | Water absorption | 0.00% | 3.00 |
| 0.00% | Dough Strength_High Speed Manufacturing Lines | 0.00% | 3.00 |
| 0.00% | Rheological characteristics | 0.00% | 3.00 |
| -2.25% | TOTAL | | |

(Callout: Protein's impact on a food company's manufacturing costs)

(Callout: Manufacturing cost reduction for all manufacturing categories. These cost reductions result from protein increase of -2.25% in this example)

| Protein's Impact on a Food Company's Procurement Costs | | % / Point | Points |
|---|---|---|---|
| Procurement Characteristics | | | |
| -0.30% | Flour Yield | -0.10% | 3.00 |
| -0.30% | Bread Yield | -0.10% | 3.00 |
| -0.30% | Protein Additives | -0.10% | 3.00 |
| 0.00% | 4. Procurement Characte | 0.00% | 3.00 |
| 0.00% | 5. Procurement Cha | 0.00% | 3.00 |
| 0.00% | 6. Procurement Character | 0.00% | 3.00 |
| 0.00% | 7. Procurement Characteristics | 0.00% | 3.00 |
| 0.00% | 8. Procurement Characteristics | 0.00% | 3.00 |
| 0.00% | 9. Procurement Characteristics | 0.00% | 3.00 |
| 0.00% | 10. Procurement Characteristics | 0.00% | 3.00 |
| -0.90% | TOTAL | | |

(Callout: Protein's impact on a food company's procurement costs)

(Callout: Same algorithm as previously described however; categories relate to reduced procurement costs resulting from higher protein)

(Callout: Procurement cost reduction for all procurement categories. These cost reductions result from protein increase, .90% in this example)

Figure 12C

| Nutrition | 1 Slice (25 g) | |
|---|---|---|
| Calories | 70 ↓ | -7% |
| Protein (g) | 5 ↑ | 80% |
| Dietary Fiber (g) | 2.5 ↑ | 67% |
| Total Fat (g) | 0.9 ↓ | -10% |
| Saturated Fat (g) | 0.02 ↓ | -20% |
| Trans Fat (g) | 0 | — |
| Polyunsaturated Fat (g) | 0.5 ↓ | — |
| Monounsaturated Fat (g) | 0 | — |
| Cholesterol (mg) | 0 | — |
| Sodium (mg) | 80 ↓ | -16% |
| Iron (mg) | 1 ↑ | 33% |
| Calcium (mg) | 60 ↑ | 15% |
| Preservatives | 0 ↓ | |
| Added Minerals & Vitamins | 0 ↓ | |
| Artificial Flavoring | 0 ↓ | |
| Minerals (mg) | >125 ↑ | 12% |
| Sugar (g) | <1.2 ↓ | -20% |
| Total Carbohydrates (g) | 14 ↓ | -15% |

Figure 15A

|  | | |
|---|---|---|
| Wheat | Yield (bu/acre) | >80 |
| | Test Weight (lbs./bu) | 60-61 |
| | Foreign Material & Damaged Kernels (%) | <.5 |
| | Moisture (%) | <12.5 |
| | 1000 Kernel Weight (g) | >40 |
| | Wheat Protein (%) | 12 |
| | GMO (Y:N) | N |
| | Chemical Residue (ppm) | <1 |
| | Pre-Harvest Sprouting Damage (seconds) | >400 |
| | Consistency (%) | >95 |
| | DON, Mycotoxins (ppm) | <.5 |
| Flour | Wheat to Flour Conversion Rate (%) | >75 |
| | Ash Content (%) | <.5 |
| | Flour Strength (W) | >180 |
| | Gluten Functionality, Strength & Stability (%) | >68 |
| | Gluten Functionality, Quality & Quantity (%) | <25 |
| | Flour Functionality, Water Absorption (%) | <60 |
| | Flour Functionality, Damaged Starch (%) | <6 |
| | Flour Functionality, Glutenins (%) | >5.5 |
| | Gluten Performance Index | >5 |

Figure 15B

| | | | |
|---|---|---|---|
| Bread | Processing | Dough Development Time (minutes) | <12 |
| | | ... to Bread Conversion Rate (loaves/lb of flour) | >2.4 |
| | | ... Resistance to Extension & Extensibility (MM) | >80 |
| | | Machinability, Mixing Tolerance (BU) | <30 |
| | | Stability (min) | >14 |
| | | Dough Strength (W (104J)) | >200 |
| | | Clean-up Time (minutes) | <12 |
| | | Shelf Life (days) | >21 |
| | Nutrition (2 lb. loaf) | Calories | <70 |
| | | Protein (g) | >5 |
| | | Dietary Fiber (g) | >2.5 |
| | | Total Fat (g) | <.9 |
| | | Saturated Fat (g) | <.02 |
| | | Trans Fat (g) | 0 |
| | | Polyunsaturated Fat (g) | <.5 |
| | | Monounsaturated Fat (g) | 0 |
| | | Cholesterol (mg) | 0 |
| | | Sodium (mg) | <80 |
| | | Calcium (mg) | >60 |
| | | Iron (mg) | >1 |
| | | Minerals (gm) | >125 |
| | | Added MSG | 0 |
| | | Added Omega 3 | 0 |
| | | Added Preservatives | 0 |
| | | Added Minerals & Vitamins | 0 |
| | | Added Artificial Flavoring | 0 |
| | | Sugar (g) | <1.2 |
| | | Carbohydrates (g) | <14 |
| | | Processed Flour (%) | 0 |
| | Sensory | Aroma (OAV, Oder Activity Value) | >0.25 |
| | | Taste, Quinine Compound (ppm) | <10 |
| | | Crumb & Texture (Index) | 8 |
| | | Crust Moisture (%) | <7 |
| | | Loaf Volume (cc./100g. Loaf) | >650 |
| | | Finish including Color | 4 |
| Sustainability | | GHG Efficiency (lbs. CO2e/bu) | <112,000 |
| | | Soil Health Index | >5.6 |
| | | Water Use Efficiency (gal/bu) | <8 |
| | | Land Use Efficiency (acres/bu) | >.012 |
| | | Carbon Sequestration (Mg C ac) | >4 |
| | | Chemical Use Efficiency (oz/bu) | <.3 |
| | | Energy Use Efficiency (gal/bu) | <0.1 |
| | | Fertilizer Use Efficiency (lbs./bu) | <0.5 |
| | | Farmer Profit ($/acre) | $150 |
| Risks | | Supply Risk (%) | <10 |
| | | Quality Risk (%) | <12 |
| | | Weather and Climate Change Related Risk (%) | <14 |
| | | Supply Chain Performance Risk (%) | <6 |
| | | Price Risk (%) | <7 |

Figure 15C

| Category | Trait |
|---|---|
| Yield | Yield, Agronomic Potential (cwt/ac.) |
| | Yield, less non-harvested (cwt/ac.) |
| | Yield, US #1 7/8 to 4" dia (cwt/ac.) |
| | Marketable Yield (cwt/ac.) |
| | Storage Loss (cwt/ac.) |
| | Manufacturing Rejections |
| | Chip Yield |
| Chemical | Starch Content |
| | Reducing Sugar |
| | Out-of-Field Specific Gravity |
| | Protein Content & Quality |
| | Chemical Content |
| | GMO |
| Physical Including Size & Shape | Color |
| | Eyes |
| | Skin |
| | Shape |
| | Size 1: 1 1/2 to 1 7/8" |
| | Size 2: 1⅞ to 2 1/2" |
| | Size 3: 2 1/2 to 3 1/4" |
| | Size 4: 3 1/4 to 4" |
| | Size 5: over 4" |
| | Size: 1 7/8 to 4" |
| | Size: 2 1/1 to 4" |
| Defects | Consistency |
| | External Defects |
| | Internal Defects |
| | Hollow Heart |
| | Bruise Susceptibility Score |
| | Bruise Index, Shatter |
| | Bruise Index, Blackspot |
| | Step-End Defect Scores (SED) |
| Disease | Heat Necrosis |
| | Rot |
| | Verticillium Wilt |
| Storage Timing: 1:N | Color |
| | Storage Specific Gravity |
| | Sugar Conversion |
| | External Defects |
| | Internal Defects |
| | Merit Overall |

Figure 15D

| | |
|---|---|
| Chipping | Production Efficiencies |
| | Frying Time / Efficiencies |
| | Acrylamide Content |
| | Oil Used |
| | Energy Used |
| | Trimming Efficiencies & Loss |
| Final Product | Chip Color |
| | Flavor |
| | Nutrition |
| | Chip Texture including Crunch & Brittle |
| | Vitamin & Mineral Content |
| | Protein Content |
| | Fat/Oil Content |
| | Thickness |
| | Chip Moisture |
| | Seasoning/Salt Content |
| | Chemical Content |
| | Sugar Content |
| | Shelf Life |
| | Consistency |
| Farme | Profitability |
| | Sustainability |

| Nutrition | New | |
|---|---|---|
| Serving Size: 1 Slice) | | |
| Calories | 70 ↓ | -7% |
| Protein (g) | 5 ↑ | 100% |
| Dietary Fiber (g) | 2.5 ↑ | 67% |
| Total Fat (g) | 0.9 ↓ | -10% |
| Saturated Fat (g) | 0.02 ↓ | -20% |
| Trans Fat (g) | 0 | — |
| Polyunsaturated Fat (g) | 0.5 | — |
| Monounsaturated Fat (g) | 0 | — |
| Cholesterol (mg) | 0 | — |
| Sodium (mg) | 80 ↓ | -16% |
| Total Carbohydrate (g) | 14 ↓ | — |
| Calcium (mg) | 60 | — |
| Iron (mg) | 1 ↑ | 33% |

Figure 16C

| Ingredients | Undesirable |
|---|---|
| Enriched Wheat Flour | X |
| Flour | X |
| Malted Barley Flour | X |
| Reduced Iron | |
| Niacin | |
| Thiamin Mononitrate | X |
| Vitamin B1 | |
| Riboflavin (Vitamin B2) | |
| Folic Acid | |
| Water | |
| Whole Wheat Flour | |
| Added Sugar | X |
| Wheat Gluten | |
| Wheat Bran | |
| Yeast | |
| Inulin (Chickory Fiber) | |
| Soybean Oil | |
| Salt | |
| MSG | X |
| Soy Lecithin | |
| Calcium Sulfate | X |
| CA Propionate | X |
| Datem, Monoglycerides | X |
| Monocalcium Phosphate | X |
| Grain Vinegar | X |
| Citric Acid | X |
| Potassium Iodate | X |

Figure 16D

| Sustainability: | Current | New (60,000 acres) | |
|---|---|---|---|
| GHG | - | (9,000,000) | lbs. CO2e |
| Water Use | - | (7 billion) | gal. |
| Land Use | - | (8,500) | acres |
| Energy Use | - | (200,000) | gal. |
| Fertilizer Use | - | (110,000) | lbs. |
| Soil Health | - | 10% | Index |
| Chemical Use | - | (2,500,000) | oz. |

| Health (/serving): | Current | New |
|---|---|---|
| Carbohydrates: | 14 g | 12 g |
| Added Sugar: | 3 g | 0 g |
| Added Fiber: | 3 g | 1 g |
| Added Protein: | 2.5 g | 5 g |
| Reduced Gluten: | - | - |
| Minerals: | - | - |
| Added Vitamin B1: | - | - |
| Added Vitamin B2: | - | - |
| Added Iron: | - | - |
| Dough Conditioners: | - | 0 g |
| Preservatives: | - | 0 g |

| Sensory: | Current | New |
|---|---|---|
| Aroma: | - | - |
| Flavor: | - | 0 |
| Crust: | - | 0 |
| Texture: | - | - |

| Manufacturing: | Current | New |
|---|---|---|
| Mixing Time: | - | - |
| Shelf Life: | 14 days | 21 days |
| Clean up Time: | - | - |
| Water Absorption: | - | - |

| Procurement: | Current | New |
|---|---|---|
| Conversion Rate: | - | - |
| Pre Harvest Sprouting: | - | 0 |
| 1000 Kernel Weight: | - | - |

Outcomes by Field Selection Report

AUTOMATED PROCESS TO IDENTIFY OPTIMAL CONDITIONS AND PRACTICES TO GROW PLANTS WITH SPECIFIC ATTRIBUTES

PRIORITY CLAIMS

This application claims the benefit of U.S. Provisional Application Ser. No. 63/117,285, filed Nov. 23, 2020, the contents of which are incorporated herein by reference.

BACKGROUND OF THE INVENTION

All plants have attributes that describe a plant's physical, biological, chemical, and financial characteristics. The attributes may be manifested in the plant itself, or the crop that is harvested. "Plants" and "crops" are used synonymously in this document. The attributes may also be manifested in the fruit or seeds of the plant, products derived directly or processed from the plant or crop or indirectly from the plants for example from animals that eat the plants or crop. The term "attribute", is used synonymously with the terms "characteristic" and "outcome" in the present document. Attributes may include nutrition and health benefits when eating the plants or plant by-products. Attributes may describe the ability for the plant or plant by-product to be processed efficiently into derivatives products, or its ability to be stored and transported. Attributes may describe the price paid by the consumer or suppliers and the marketability of a crop or final product. An attribute may describe the crop and the growing of the crop's impact on sustainability and financial outcomes across the supply chain. A variety of economic, testing and measurement methods are used today to quantify attributes metrics.

Crop attributes are variable within a farm field and more so across farming operations. This variability results from variable soil, slope, drainage, weather, and other site-specific conditions. Not only do the attributes fluctuate based on field conditions they also fluctuate based the cropping system used to grow the plant for example, tillage, seed and seed genetics, plant population, weed control, fertility, drainage, and numerous additional cropping system elements.

All plants respond to their environment. Consequently, environmental factors can be a major contributor to the attributes of a plant. Certain attributes of plants used in food and industry are directly related to the conditions where the plant is growing. For example, it may be that fruit trees grown on a gentle, north-facing slope that have been only slightly fertilized may produce fruit with a lower acidity than equally healthy (or even more "healthy") trees found in a neighboring field that was managed only slightly differently.

SUMMARY OF THE INVENTION

The present invention identifies the optimal genetics, environment, and management practices to grow plants with specific attributes and predicts the probability of growing a crop with the attributes, quantifies the attribute, scores relative performance and identifies actions management can take to increase probability of growing plants with specific attributes. For example, plants grown for food ingredients may have particular desired attributes. Wheat, for instance, may have attributes that improve the taste, texture, nutrition, aroma, and wellness of the bread. Attributes of plants used for animal feed similarly may improve the characteristics of meat, dairy, and eggs resulting from animals that consume the plants or a sustainability attribute such as the methane produced by the animal.

The present application uses an improved technique of data acquisition known as intelligent sampling. Intelligent sampling functions by identifying a minimal dataset that is used to train the model disclosed herein while still achieving acceptable accuracy. Intelligent sampling works by first selecting plots of lands (fields) that will provide the data that is most helpful, and then by selecting locations within the fields to collect data. Locations are selected to capture the variety of data needed and minimize redundancy and duplication. Data is derived by capturing samples of the cropping related elements at these locations, testing samples is a lab or by some other method.

The test results from the samplings are combined with growing condition data and research. From this data the causative relationships between the growing conditions and crop attributes are identified. These relationships are captured in a model that can be broadly applied across numerous fields or sub-fields to predict the probably that the field will grow plants with the desired attributes, score performance, and quantify attributes. In some implementations, the model can identify the issues that are limiting attributes and scorecards are used to track performance over time.

As defined and used herein, the terms "environment" and "environment" or "environmental" growing conditions are used synonymously, to refer to all growing conditions.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein:

FIGS. 2A-H detail the attributes and metrics of the present invention.

FIG. 3 details the risk mitigation metrics of the present invention.

FIGS. 4A-E show data related to growing condition elements of the present invention.

FIGS. 9A-B are examples of the root causes output model of the present invention.

FIGS. 12A-C are examples of scorecards of the present invention.

FIGS. 15A-M are diagrams of outcome samples of the present invention.

FIG. 16A-F are diagrams of testing and measurement attributes of the present invention.

FIGS. 17A-E are examples of smart sampling of the present invention.

DETAILED DESCRIPTION OF THE PREFERRED EMBODIMENT

Figure 1:
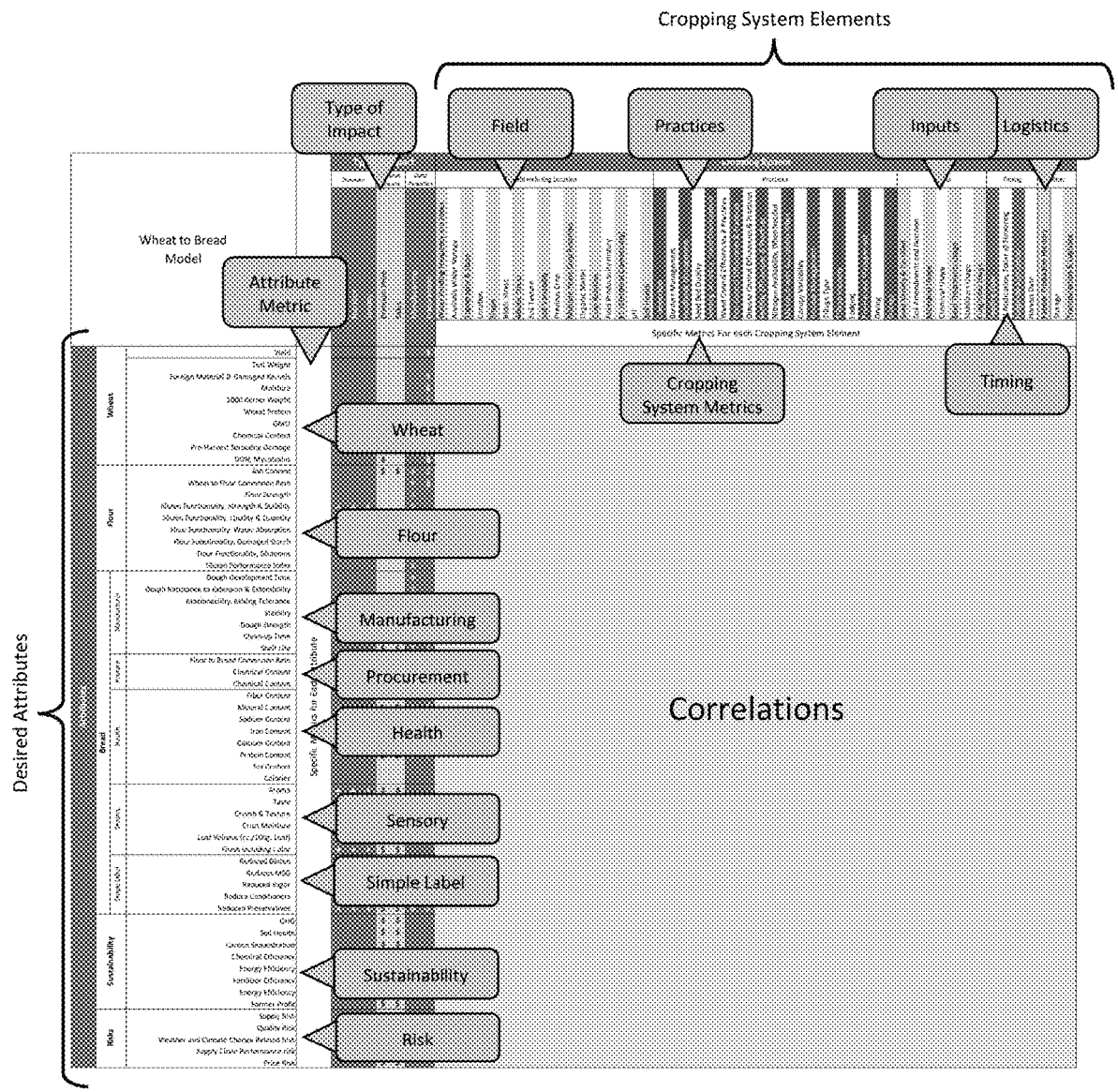
FIG. 1 illustrates a two-dimensional, one-to-one model with several of the growing condition elements and several crop/food attributes of the present invention.

The following are objectives achieved by the disclosed invention. Identify optimal conditions and practices to increase probability of growing plants with specific attributes, for example: ingredients for food, including macro ingredients such as wheat, with attributes that improve the taste, nutrition, aroma, and health of bread; improve the characteristics of meat, dairy and eggs resulting from animals that consume the plants; develop or improve new products with specific attributes resulting from using plants with specific attributes; improve plant-based protein by reducing the amount of processing and additives required to achieve the desired end use final product; and improve manufacturing efficiency to process the plants into an end-product. Increase yield per unit of land and have a positive impact on sustainability, for example, soil health, water use and quality, reduce green-house gas production for example methane, carbon, including increase carbon sequestration, carbon prevention, reduce chemical usage, and increase farmer income as well as income for others along the food and agriculture supply chain. Non-food plant use, examples include: improved efficiency when producing biofuel by a biodiesel or ethanol plant, for example corn or sugarcane, with attributes such as yield, conversion rate, and processing efficiency, grow hemp with attributes such as R value to improve its insulation characteristics, grow cotton with attributes that result in improved fiber, and grow trees with attributes that result in improved building materials. Cropping system optimization including: identify fields and farmers with the highest probability of growing a crop with specific attributes; identify practices, inputs, and timing with the highest probability of growing a crop with the desired attributes; predict outcomes based on the cropping system; identify constraints and root causes that are limiting outcomes; and simulate various cropping conditions to minimize constraints and root causes and improve outcomes. Provide the analysis at scale, for any crop, for any geography, and for any use.

The following definitions will be helpful in understanding the present disclosure: Attributes have metrics that describe the attributes qualitative and/or quantitative metrics of measurement. Attributes may be physical, chemical, biological, and based on nutrition, sustainability, processing, quality, financial or another outcome. Attributes may impact: nutrition, product label, consumer purchasing behavior and therefore the price of a product and sales success; operational efficiencies including manufacturing, procurement and supply chain management; risks such as supply and quality; sustainability, for example GHG (green-house gases) emissions, soils health, chemical use, water use, and carbon sequestration; and yield and profitability.

Macro ingredients are the primary ingredients in a food product, for example, wheat is a macro ingredient for bread, and barley is a macro ingredient of beer. Micro ingredients are secondary ingredients, for example preservatives, enzymes, taste and nutrition enhancers, and vitamin supplements.

Cropping system can be defined as crop production elements used to grow a crop and can be controlled by management for example, seed, fertilizer, timing, storage. Each element is described by qualitative and/or quantitative metrics of measurement.

Growing conditions can be defined as crop system elements plus additional elements that cannot be controlled by management and need to be managed as best as possible, for example weather, soils, slope. Each element is described by qualitative and/or quantitative metrics of measurement.

Causation can be explained as the answer to the question: "What caused the attributes to deviate from the desired objectives? The term correlation is used in this document as a synonym for causation. Causation is a measure of the extent to which two variables are related. For example, a relationship between a growing condition element such as tillage and an attribute such as protein or aroma. A relationship may be positive, negative, or zero. In addition, the relationship may be linear or curvilinear. They may backward looking, for example "root causes", and/or forward looking for example predicting "limiting factors".

Models are used to capture the relationships between the desired outcomes and growing conditions. Relationships may be one-to-one, one-to-many, or many-to-many, and are most often derived via the use of data combined with science such as university or corporate research.

Data may be structured or unstructured, acquired from commercial, public, and other sources including sensors, machine-generated (e.g., precision agriculture machines), derived through analysis, from test and measurement devices, physical observations by farmers, agronomists or other experts, and other sources. Data may be sourced from new research or from existing research. Data may be derived from previous years' results as well as other sources as available and required.

Models are most often a combination of AI/ML and research algorithms that capture and identify the relationship between growing condition elements and outcome attributes in a form that can be broadly applied to a given set of data. Examples of growing condition elements are described in the document.

Examples of food attributes include: food objectives (nutrition, health, sensory, including aroma, texture, taste); sustainability objectives, for example GHG (Green House Gasses, carbon, soil health, chemical use, land use, water use); yield or supply objectives; manufacturing and processing objectives for example mixing time, clean-up time, and shelf life and fewer factory changes; and procurement objectives including for example conversion rates. Attributes for non-food such as performance of crop input for agribusiness sales include: product placement; product performance; research; product development; and product selection. Other non-food attributes include: conversion rate for example biofuels gal/bu; manufacturing efficiency; processing efficiency, clean up time; and Physical attributes such as the R value of hemp used for insulation.

As defined and used herein, the terms "environment" and "environment" or "environmental" growing conditions are used synonymously, to refer to all growing conditions.

FIG. 1 illustrates a two-dimensional, one-to-one model with several of the growing condition elements and several crop and food attributes of the present invention. Wheat for bread is used as the example. Additional examples include growing feed with specific attributes for animals to improve outcomes, or plants with attributes for reduced processing of plant-based protein. Several other examples are defined later in this document. Black and white is used for the present examples, charts and illustrations throughout the document although colors are often used to convey additional information. Certain growing condition elements and desired attributes can be prioritized. For example, X % protein for a food company where the protein objective is the priority attribute. In this use case all other attributes are secondary to achieving the desired protein percentage. In another example, yield can be maximized for a seed variety for an agribusiness selling seed or another input to farmers. In this use case all attributes are secondary to yield and placing the seed in growing conditions where yield is optimized. Yield can be maximized for another role in the supply chain, for example a farmer who has a primary objective of achieving the highest yield possible. In this use case all other performance attributes are secondary to the gaining the maximum yield for a given field. New cropping system elements can be identified. In some use cases, data can be analyzed to identify new cropping system elements that are relevant.

FIGS. 2A-H contains sample attributes and sample metrics of the present invention. In accordance with the preferred embodiment of the present invention, it is important to point out that the attributes are established by the user such as a new product designer, brand manager, farmer, or others interested in growing a crop with specific attributes. For this reason, each of the attributes may and most likely will vary from use case to use case. In this use case example, wheat to bread is used.

Figure 2A:
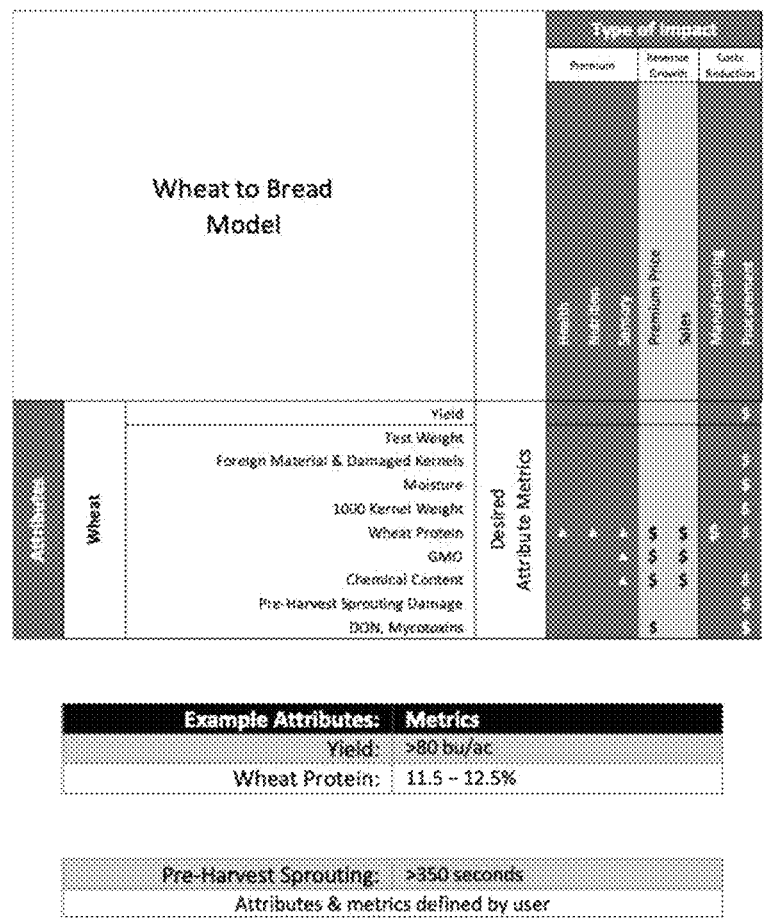

In FIG. 2A-H, the columns to the right identify the type of impact for each attribute, for example taste, sales, health. This impact desired by the user is defined by the user. As are the list of attributes and their metrics. The Wheat—Bread group of attributes shown in FIG. 2A include sample wheat attributes. FIG. 2B shows the flour attributes. FIG. 2C shows the manufacturing attributes. FIG. 2D shows the procurement attributes. FIG. 2E shows the health attributes. FIG. 2F shows the sensory attributes. FIG. 2G shows the sample label attributes. FIG. 2H shows the sustainability attributes.

FIG. 3 details the risk mitigation attribute metrics of the present invention. In accordance with the preferred embodiment of the present invention, another key outcome is reducing risk across the supply chain. Supply risks have been brought to the forefront during the Covid-19 pandemic, the impact of climate change, geopolitical events, and the financial status of farmers. The following are some examples of potential risks. Supply risks are risks where the supply of advantaged macro ingredients may not be available. In this scenario the food company may need to settle for lower quality ingredients such as commodities. Or if alternative ingredients are not available reduce or stop producing the product. Quality risks are risks that macro ingredients will not have the attributes that has been designed into the product. In this scenario the food company may need to settle for lower quality ingredients such as commodities. Or if alternative ingredients are not available reduce or stop producing the product. Weather and climate change related risks are risks that weather impacts either or both quality and supply. This risk is increasing each year as ever-increasing climate changes occur. Supply chain performance risks are risks that the supply chain is not able to grow and deliver a crop with the contracted attributes. Supply chain performance could result from a variety of reasons such as weather, practices, soil health, or cropping system timing. Price risks are risks the price paid to suppliers are different from what is expected. In many cases the procurement plan is made 2 years prior to when the crop is needed. This delay is a characteristic of the food system and the need to plan, then grow, then store, then transport the crop when needed by the processor or manufacturer. Storage and transportation risks are risks that the processes and conditions to store and transport ingredients are not met, resulting in deterioration of attributes. The harvested crop is stored to segregate it from commodity crops and in conditions to maintain quality. Most often the crop is stored using on-farm storage. Source traceability risks are risks of losing visibility from field source, practices and inputs used to grow the crop. Changing consumer behavior are risks of maintaining alignment with consumer purchasing behavior. Geopolitical event risks result from geopolitical events which interrupt traditional supply and quality.

These risks can be mitigated in the following ways: a more direct relationship between, for example, the food company and the farmer; a cropping system modeled to reduce the risk attribute as shown in FIG. 3; selecting fields and farmers with the greatest probability of sustainably growing advantaged macro ingredients; and, supply contracts directly with the farmer.

FIGS. 4A-E show data related to growing condition elements of the present invention. In accordance with the preferred embodiment of the present invention, the horizontal axis of our example model shown in FIGS. 4A-E contains the growing condition elements. These are the genetics, management practices and environment that can be managed to increase the probability of growing a crop with the desired attributes. Color is typically used in the charts to convey information but for the purposes of this document black and white is used. The growing condition elements will vary by crop and region. For example, the growing conditions in the USA to grow wheat may be very different than the growing conditions in the Ukraine, China, or India.

Figure 4A:
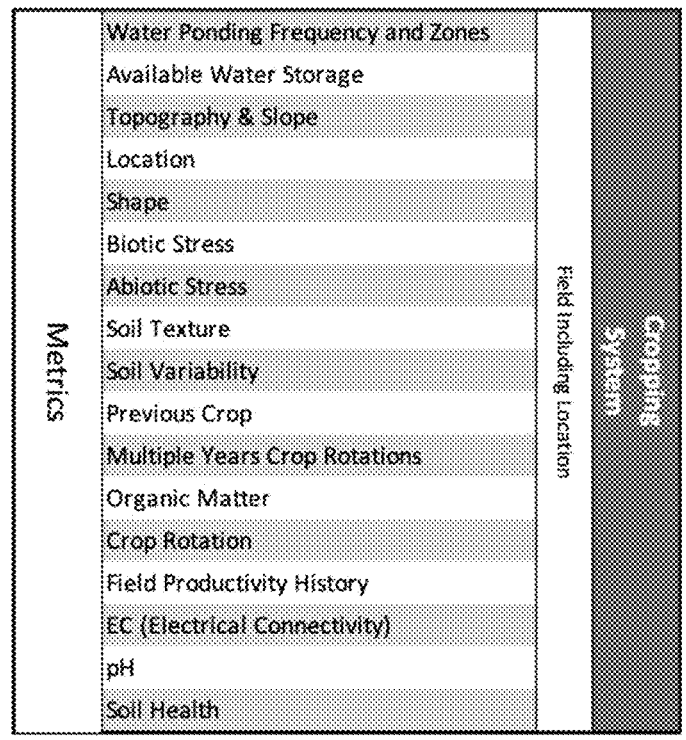

FIG. 4A shows the cropping system elements related to the field characteristics and its performance over several years, for example biotic stress history and crop rotation history. FIG. 4B shows the cropping system elements related to the practices used by a farmer to grow the crop, for example tillage and compaction. FIG. 4C shows the cropping system elements related to the inputs used by a farmer to grow the crop, for example seed genetics and variety, seed treatment and microbe use. FIG. 4D shows the cropping system elements related to timing, when are practices performed, for example planting date and weed control date(s). FIG. 4E shows the cropping system elements related to logistics including storage.

Figure 5A:
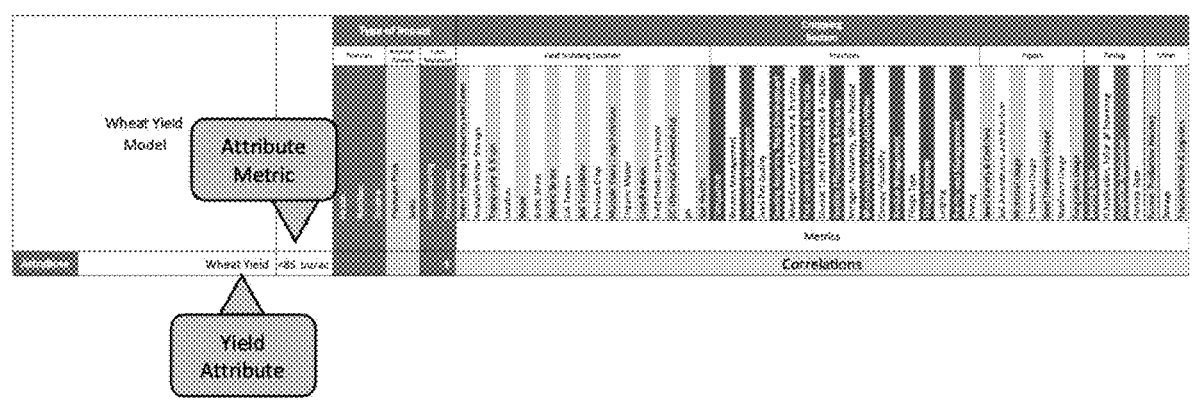
FIGS. 5A-D show additional model use cases of the present invention.
Figure 5B:
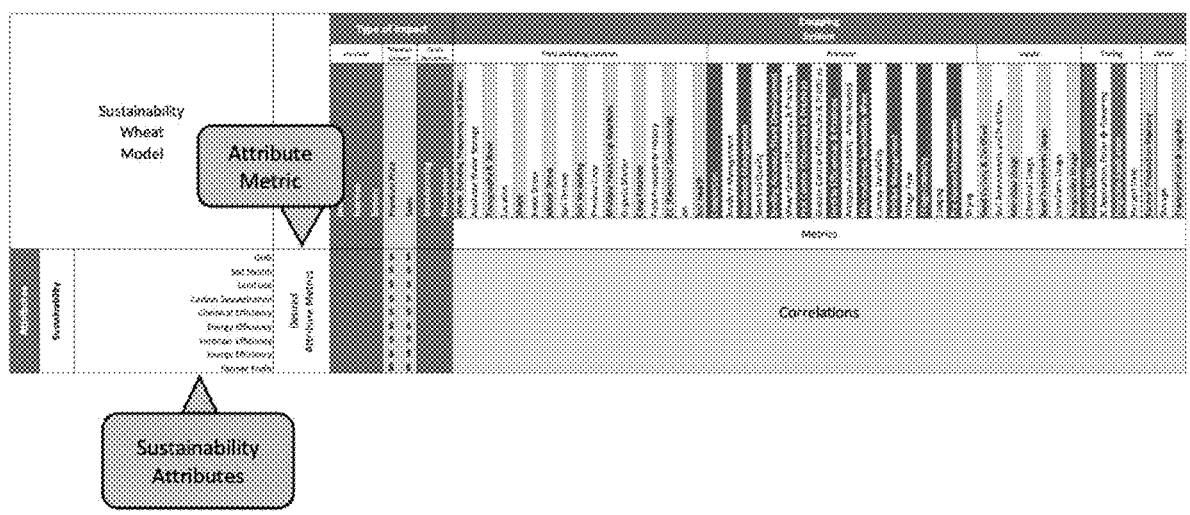
Figure 5C:
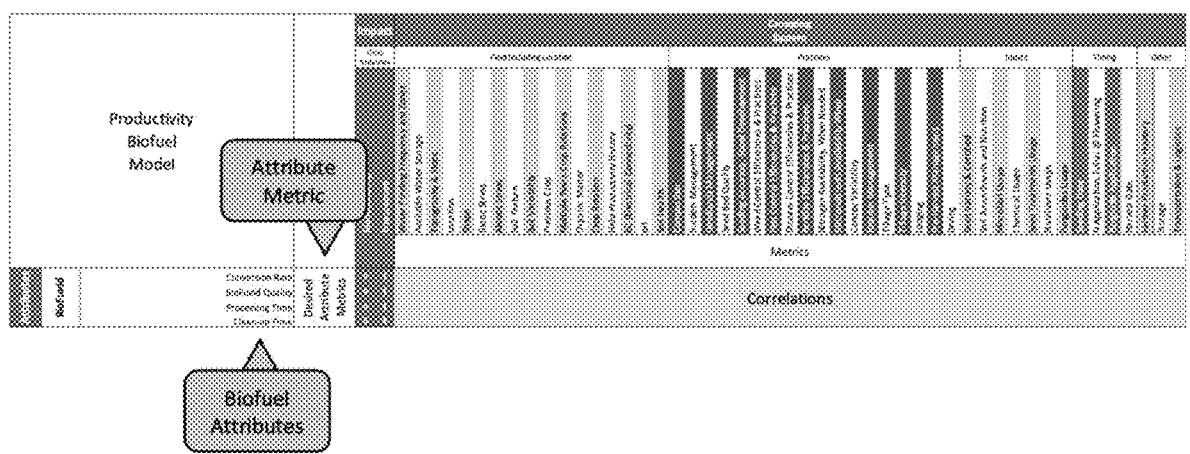
Figure 5D:
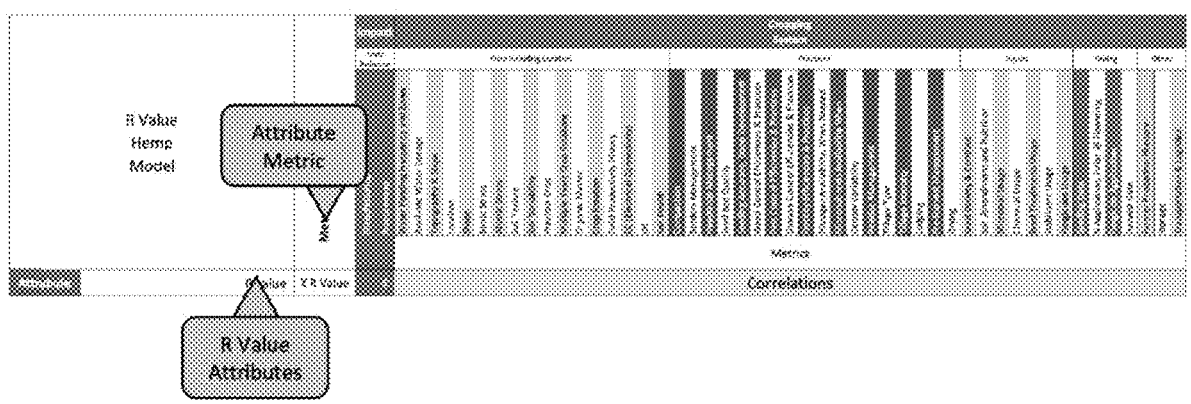

FIGS. 5A-D show additional model use cases of the present invention. The model shown in FIG. 5A is limited to the yield attribute but includes all of the cropping system elements. The version of the model shown in FIG. 5A may be used to maximize a single attribute such as yield. Another example is to identify the cropping system and fields where an agribusiness can place a new product and optimize conditions to optimize performance of a product. The model shown in FIG. 5B is limited to achieving the sustainability attributes and all cropping system elements. The version of the model shown in FIG. 5B may be used to maximize the impact on sustainability in a field. For example, a private company in the energy, petro-chemical, transportation, or even air travel industry who wishes to maximize and acquire carbon credits. Other examples include an NGO such as the UN seeking to improve farmer income; or the USDA striving to implement regenerative agriculture practices. The model shown in FIG. 5C is a use case to improve a non-food attribute of a plant for example the R value of hemp. Hemp is increasingly being used as an insulation material. In FIG. 5C, the R value is the attribute and growing hemp to optimize the insulation value is the objective. The model shown in FIG. 5D is to improve the attributes related to biofuel production for example, maximize biofuel production efficiency is the objective.

Figure 6A:
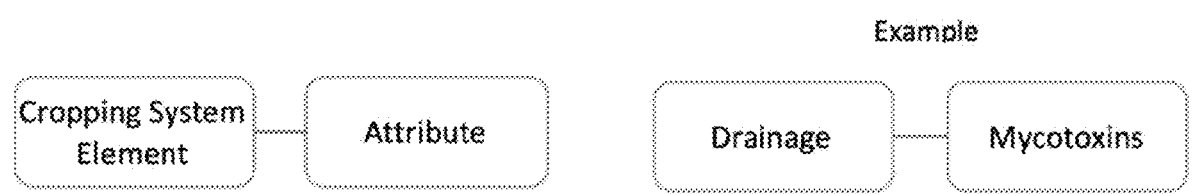
FIGS. 6A-C are flow diagrams of causation relationship models of the present invention.
Figure 6B:
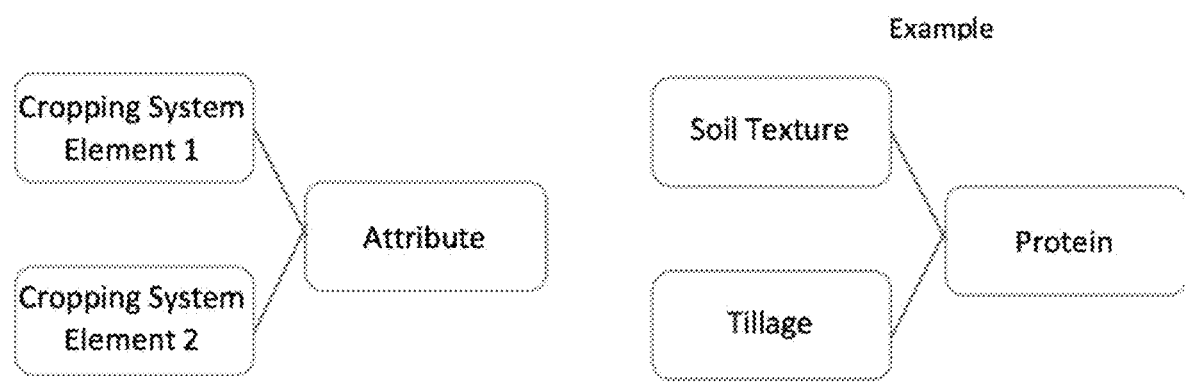
Figure 6C:
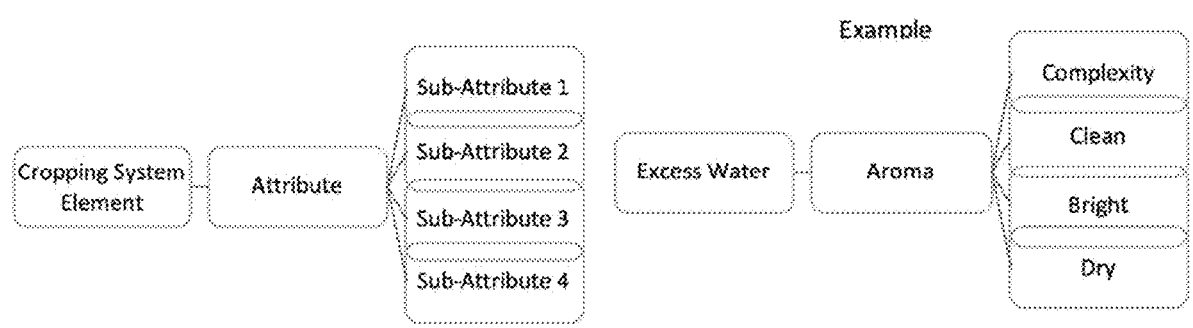

FIGS. 6A-C are diagrams of causation relationship models of the present invention. FIG. 6A shows an example of a 1:1 relationship between the cropping system element and attribute. This type of relationship is represented in the FIG. 6A. However, it is common to have more complex relationships such as 2:1 or N:1 where a combination of cropping systems elements impact an attribute. FIG. 6B shows an example of how soil textures or tillage may not independently impact protein, however the combination does impact protein. Another example where the relationship is more complex than 1:1 is illustrated in FIG. 6C. Here the attribute has 1:N sub-attributes. In the example shown in FIG. 6C, the cropping system (excess water) has an impact on the attribute (aroma) and this attribute has several sub-attributes. In the example shown in FIG. 6C, the impact on each sub-attribute can vary from positive, negative to no relationship.

Yet another type of relationship between multiple growing condition elements and attributes may exist. In this use case, achieving one desired attribute may conflict with achieving another attribute. For example, a growing condition may have the desired impact on one attribute and a negative impact on another. In this use case it is not possible to achieve both attributes. As a result, special rules defining priorities and compromises becomes relevant. There are additional combinations of relationships between 1:N cropping systems and 1:N attributes that may occur. The combination of relationships may be infinite or approaching infinite depending on the use case.

Figure 7A:
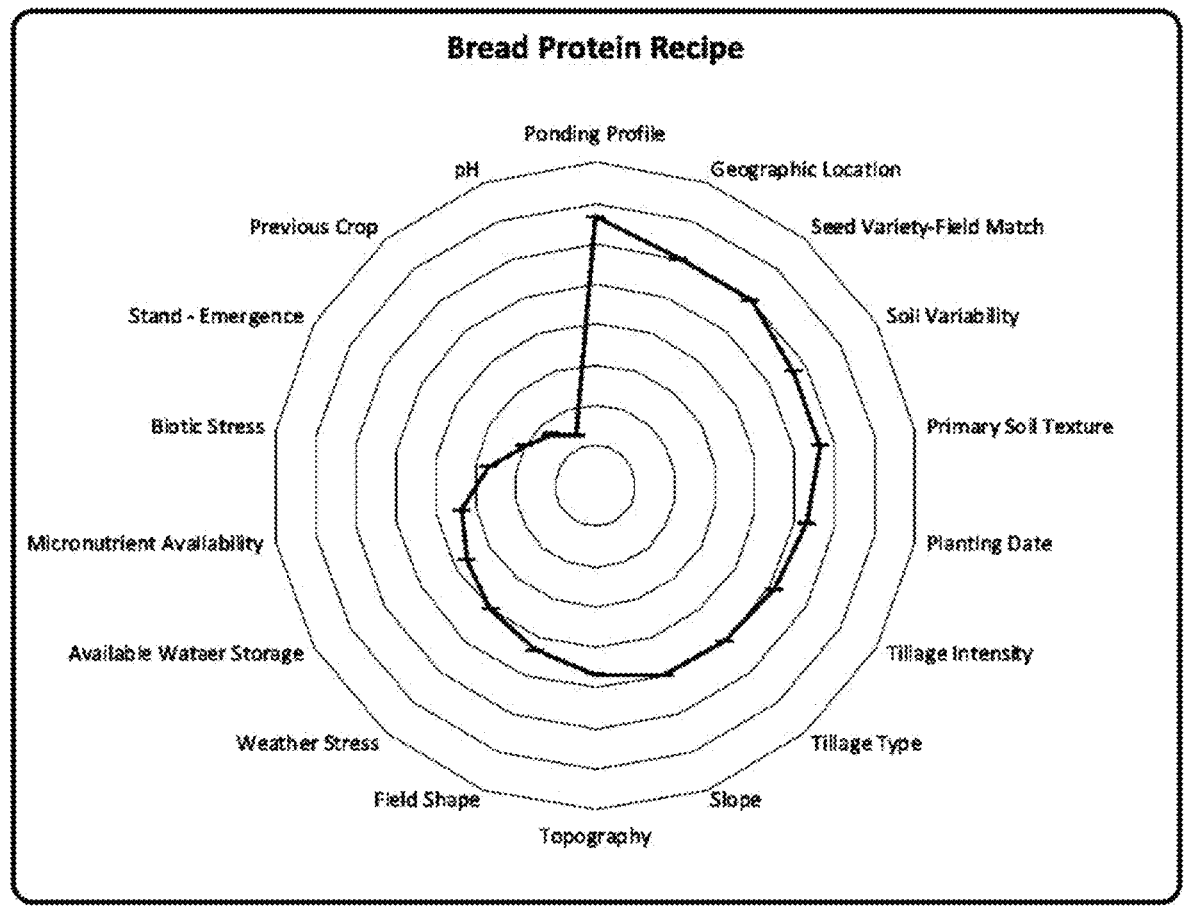
FIGS. 7A-D are diagrams of relationship and correlation models of the present invention.

FIGS. 7A-D are diagrams of relationship and causation models of the present invention. In accordance with the preferred embodiment of the present invention, these diagrams are used to illustrate a many-to-one (N:1) relationship between the bread protein attribute and the growing condition elements that impact protein. The diagram shown in FIG. 7A illustrates a model against which all other data is analyzed. In this example, the growing condition elements that are the furthest from the center of the spider diagram have the greatest impact on protein. In this example, the ponding profile of the field has the greatest impact on bread protein while pH has the least impact. Growing condition elements that have no impact on protein are not including in this diagram. This causation model was created using AI/ML and collected data.

Figure 7B:
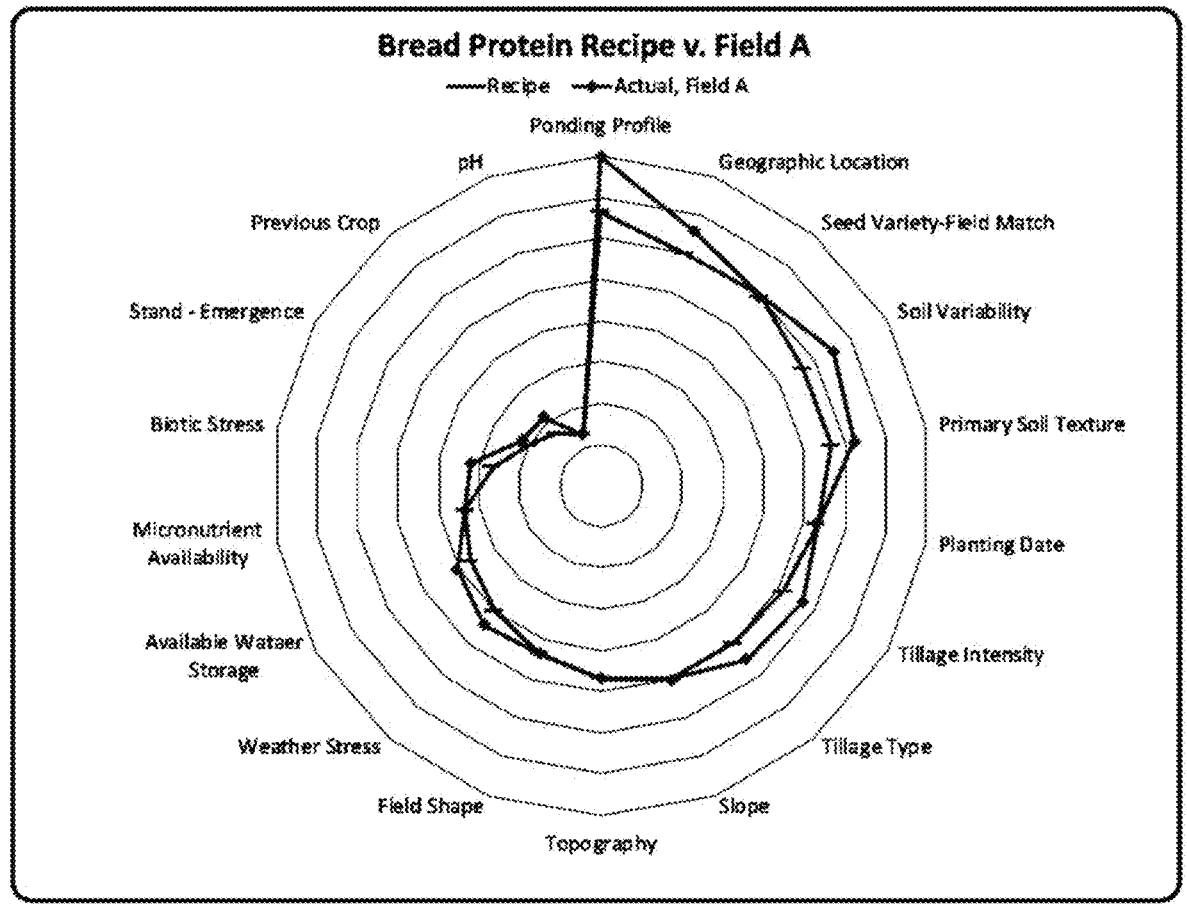

The diagram shown in FIG. 7B illustrates how the metrics of a specific field, growing conditions are analyzed against the model. Alignment between the model and a specific field growing condition metrics indicates a positive relationship with the model and therefore this growing condition element has a high probably that it will grow wheat with the desired protein level. On the other hand, divergence from the model indicates deviation from the model and a lower probability of growing wheat with the desired protein level. In this example ponding profile has the greatest model deviation and is therefore the greatest contributor to reducing the probability of growing wheat with the desired protein level.

Causation analysis can be used for multiple use cases. In this use case one attribute is predicted based growing condition elements. The degree of association or relationship between two variables is captured in the model quantitatively as a co-efficient of correlation. Co-efficient is a numerical index that tells us to what extent the two variables are related. The coefficient is typically a number and not a percentage.

Figure 7C:
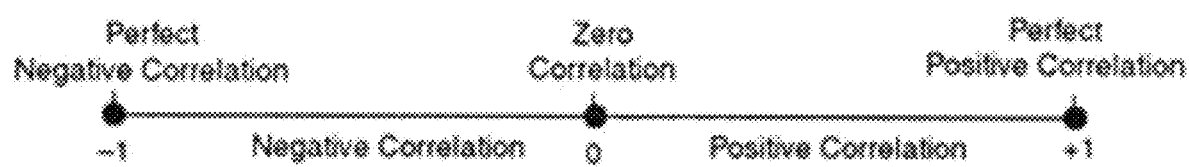

The types of correlation can be positive, negative, and zero; and linear or curvilinear (non-linear). FIG. 7C shows an example of positive, negative, or zero correlation. When the increase in one growing conditions is followed by a corresponding increase in the attribute, the causation is positive. Positive causation range from 0 to +1. +1 is the maximum positive coefficient of causation and it indicates that, for every unit increase in one variable, there is proportional increase in the other. If the increase in one variable (growing conditions) results in a corresponding decrease in the other variable (attribute), the causation is negative. Negative causation range from 0 to −1. −1 is a maximum negative causation and it indicates that for every unit increase in one variable, there is proportional unit decrease in the other. Zero causation means no relationship exists between the two variables, growing conditions and attributes; i.e. the change in one variable is not associated with the change in the other variable.

Figure 7D:
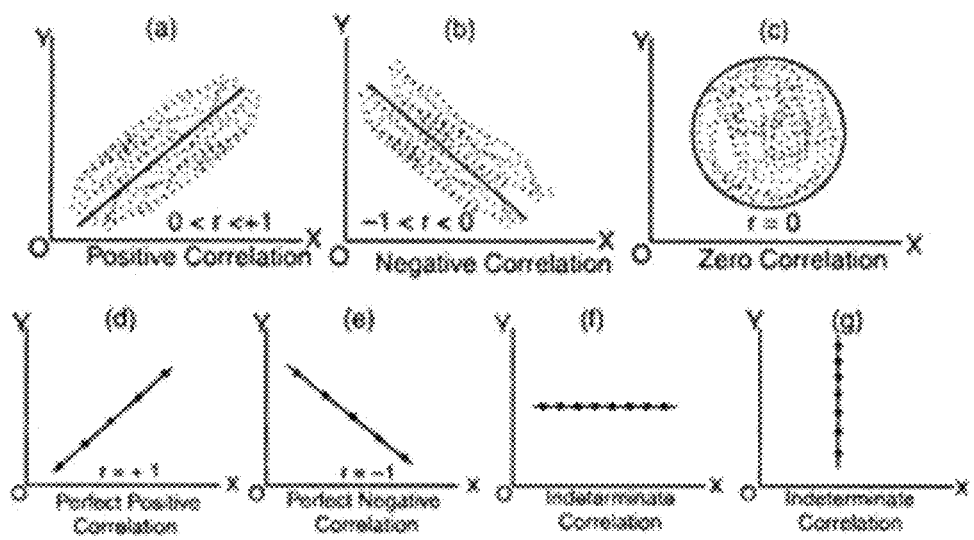
Figure 7D:
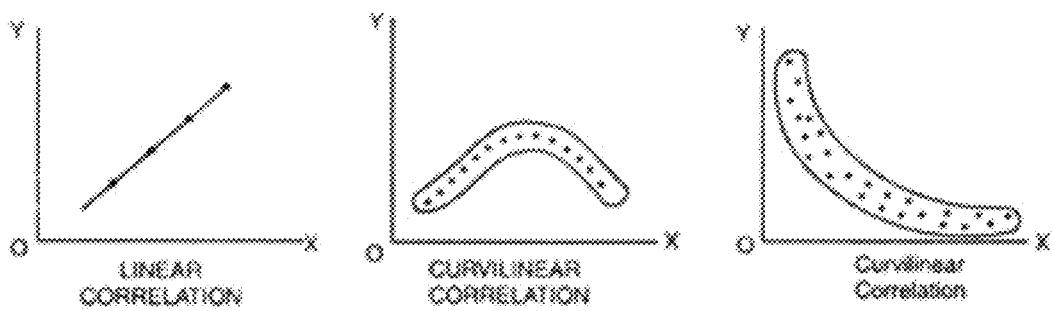

FIG. 7D shows an example of linear or curvilinear correlation. Linear correlation is the ratio of change between the two variables either in the positive or negative direction and the graphical representation of the one variable with respect to other variable is straight line. Another type of correlation is where if there is an increase of one variable, the second variable increases proportionately up to some point; after that with an increase in the first variable the second variable starts decreasing. The graphical representation of the two variables will be a curved line. Such a relationship between the two variables is termed as the curvilinear correlation. If the line goes upward and this upward movement is from left to right, it will show positive correlation. Similarly, if the lines move downward and its direction is from left to right, it will show negative correlation. The degree of slope will indicate the degree of correlation. If the plotted points are scattered widely, it will show absence of correlation. This method simply describes the 'fact' that correlation is positive or negative. The causation coefficient is a numerical measure of some type of correlation, meaning a statistical relationship between two variables.

Figure 8A:
FIGS. 8A-E are diagrams of prediction models of the present invention.
Figure 8B:
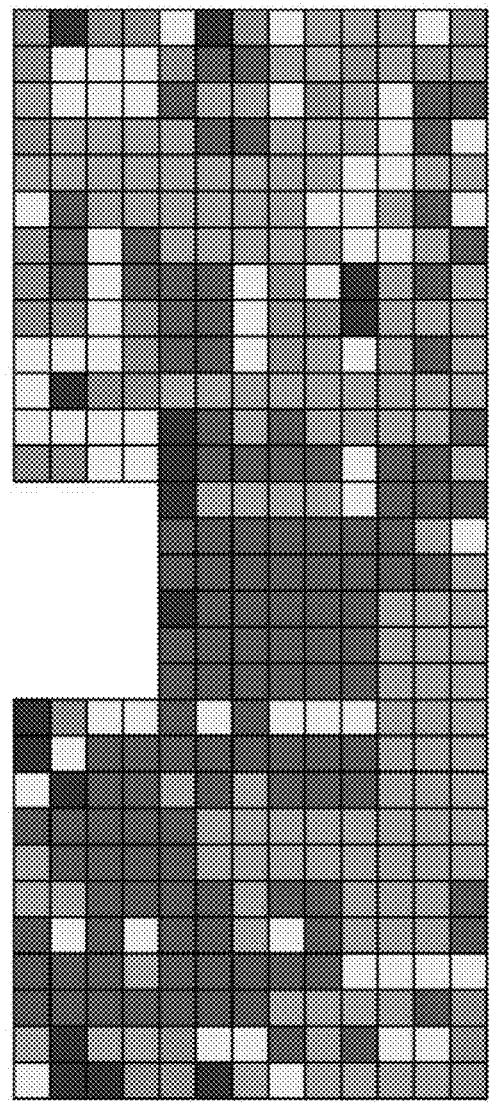
Figure 8C:
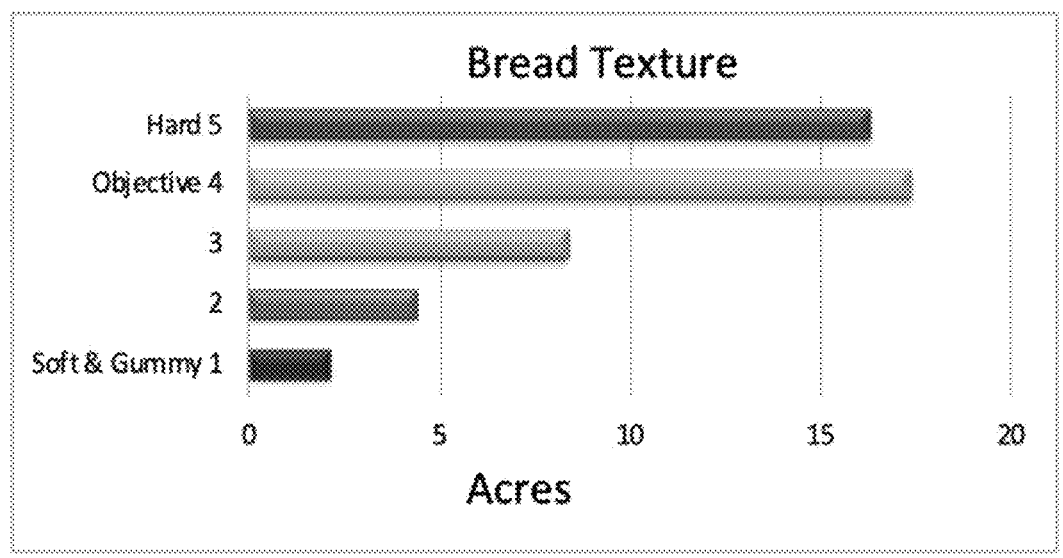

FIGS. 8A-E are diagrams of prediction use cases of the present invention. In accordance with the preferred embodiment of the present invention, models can be applied at the field level to predict which fields have the highest probability of growing a crop with the desired attributes. The graphic shown in FIG. 8A illustrates the locations of the fields, within an area of interest, with the highest probability of growing a crop with the desired attributes. The field locations are color coded based on the probably of grow the crop with the desired attributes. Field selection using field level analysis can also be used to optimize the probability of growing a crop with any attribute, for example. texture, protein, aroma, yield, sustainability and/or financial.

The model can also be applied at the sub-field level. For the field shown in FIG. 8B, color coding is used to identify the probability of achieving the desired bread texture at a sub-field level. Sub-field analysis can be applied for any attribute and any growing condition element relationship. In the example shown in FIG. 8C, the attribute metrics are predicted using a 0.1-acre resolution. Predicting attribute metrics is a practical and economical way to understand the metrics and their variability across a field. Depending on the variability, site specific precision agriculture practices, based on the required growing conditions may be required. For some attributes such as protein or yield, sensors may be installed on harvesting equipment that can measure the level of protein and yield as well as the GPS location of the metric. Yield monitors are widely used; however, protein monitors are used by only a few farmers. These monitors measure results after the fact rather than predicting outcomes.

Sub-field prediction can be performed for any attribute including sustainability attributes for example green-house gases, soil health, water use, and/or carbon sequestration. A primary use of the models is to predict the probability that the growing condition elements will result in a crop with the desired attributes. Understanding the probability enables proactive management decisions to be made to increase the probability of growing a crop with a specific attribute. Predictions can be performed at any resolution including sub-field or sub-acre to better manage and reduce variability of attribute metrics across a field.

Figure 8D:
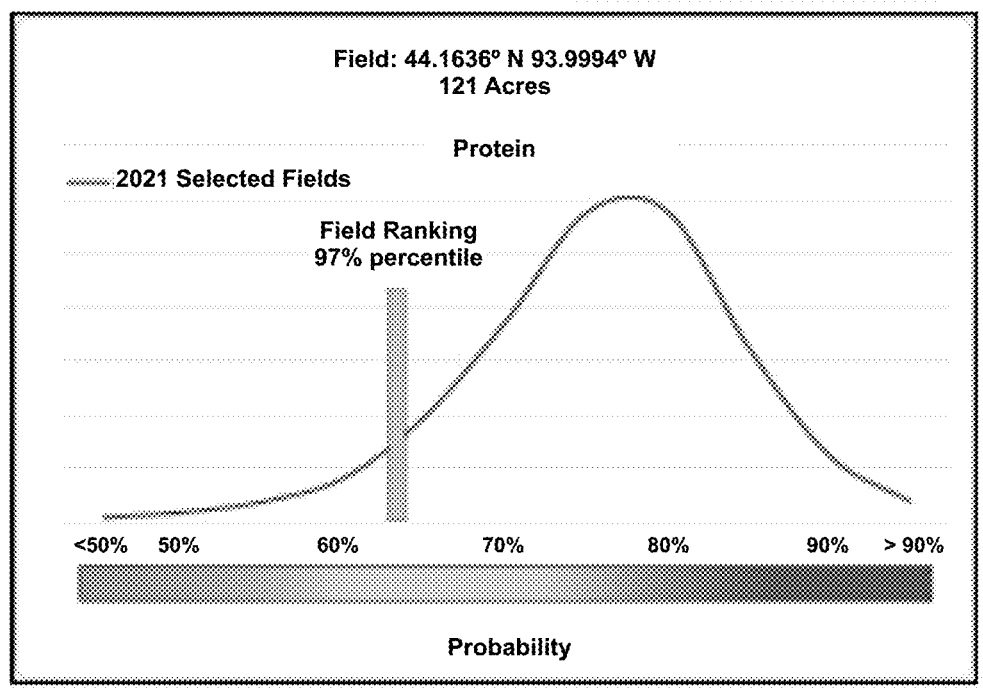
Figure 8E:
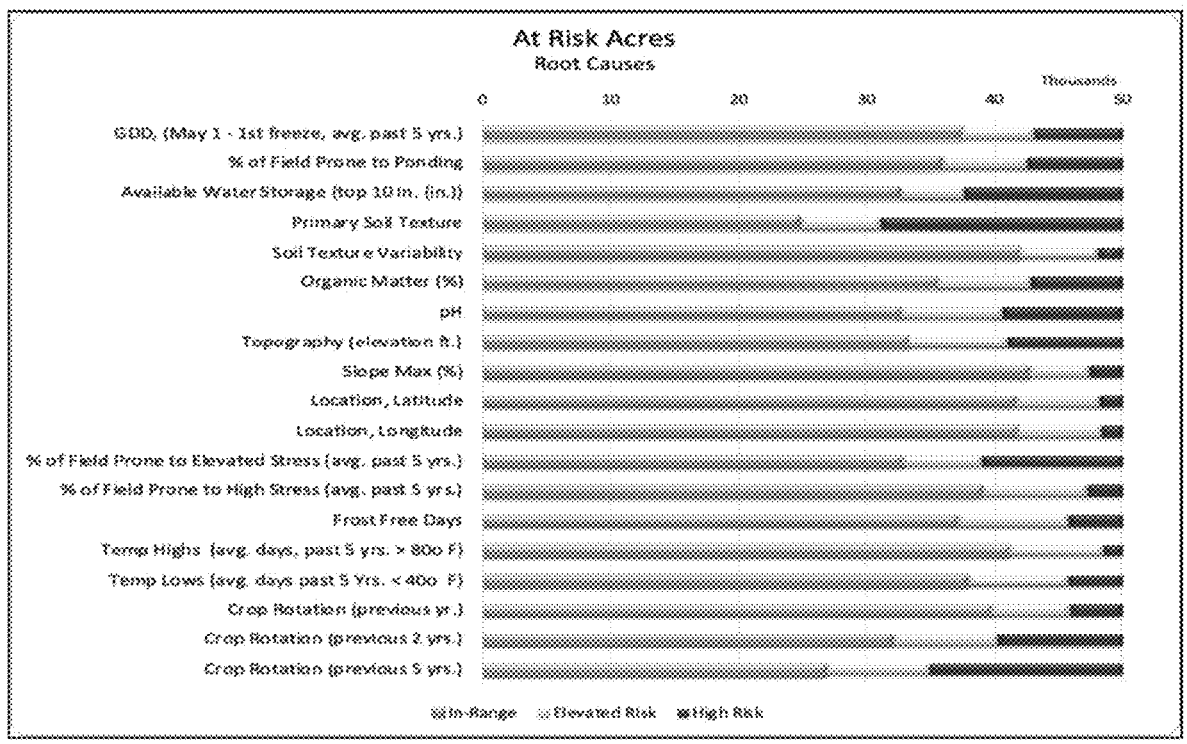

The example shown in FIG. 8D is a distribution curve that illustrates the predicted protein outcomes for all fields that have been analyzed. Overlaid on the distribution curve is the predicted protein outcome for one field. This level of analysis and benchmarking is available for any attribute, including sustainability, yield, or other desired metric. This same prediction can be performed for a region, or other area of interest including sub-acre. In the example shown in FIG. 8E, all of the predicted root causes and acres at risk are shown. This type of analysis can be used to understand the risks of sustainably growing crops with the desired specifications.

A second important output of the model are root causes. Root causes identify the specific cause or causes of an issue rather than the symptoms. Root causes are the growing conditions underlying the reduced performance which, if addressed, can increase the probability of growing the crop with the desired attributes. The top 5 root causes in this example are: ponding; compaction; soil variability; tillage intensity; and field location. Root causes can be predicted preseason, in-season, or post-harvest.

Figure 9A:
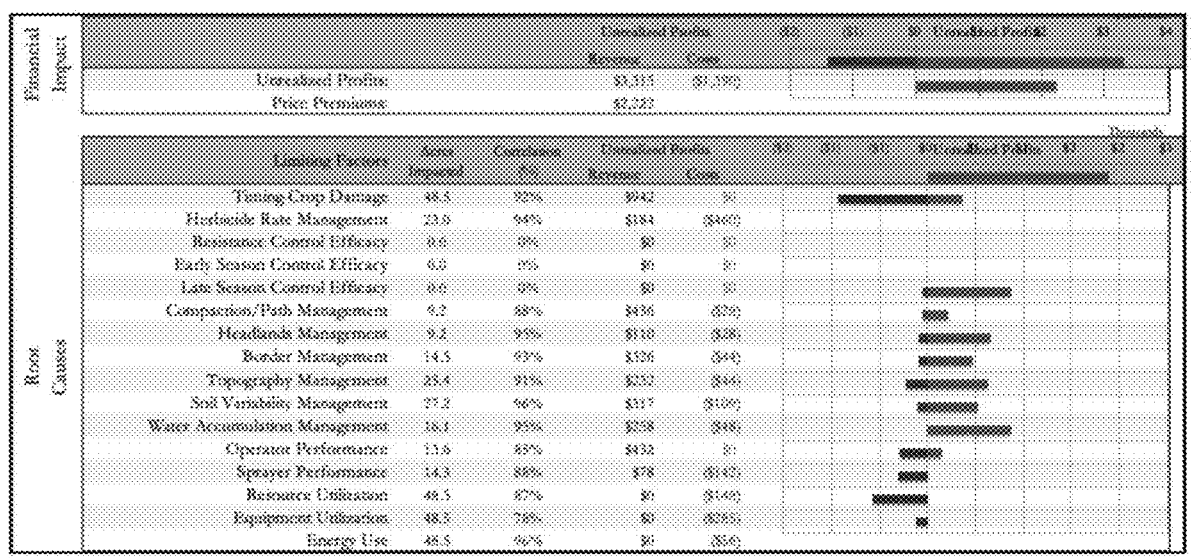

FIGS. 9A-B are examples of the root causes identified by the present invention. FIG. 9A shows an example of a root cause for a field. In this example, the financial impact on the farmer for each of the growing condition elements is shown. Understanding the financial impact is a key motivator to gaining adoption and participation by the farmer and improving outcomes. In this example the financial impact is classified at unrealized yield and unrealized costs. Unrealized costs are costs that did not result in an increase in yield or revenue. Unrealized yields are yields that were not achieved. Both unrealized costs and yields are based on benchmarking all parts of a field to the best performing parts of the field as previously described.

The table shown in FIG. 9B describes one algorithm used to determine the financial impact of the root causes on the yield attribute. In this example the cost of drainage, or lack of drainage, on yield has been determined. The impact is quantified as cost to produce ($/bu.) for various drainage zones. Also, note the unrealized yields for various drainage zones. The "Other" zone was the best performing drainage zone and therefore was used as the benchmark upon which all other drainage zones were measured.

Figure 10A:
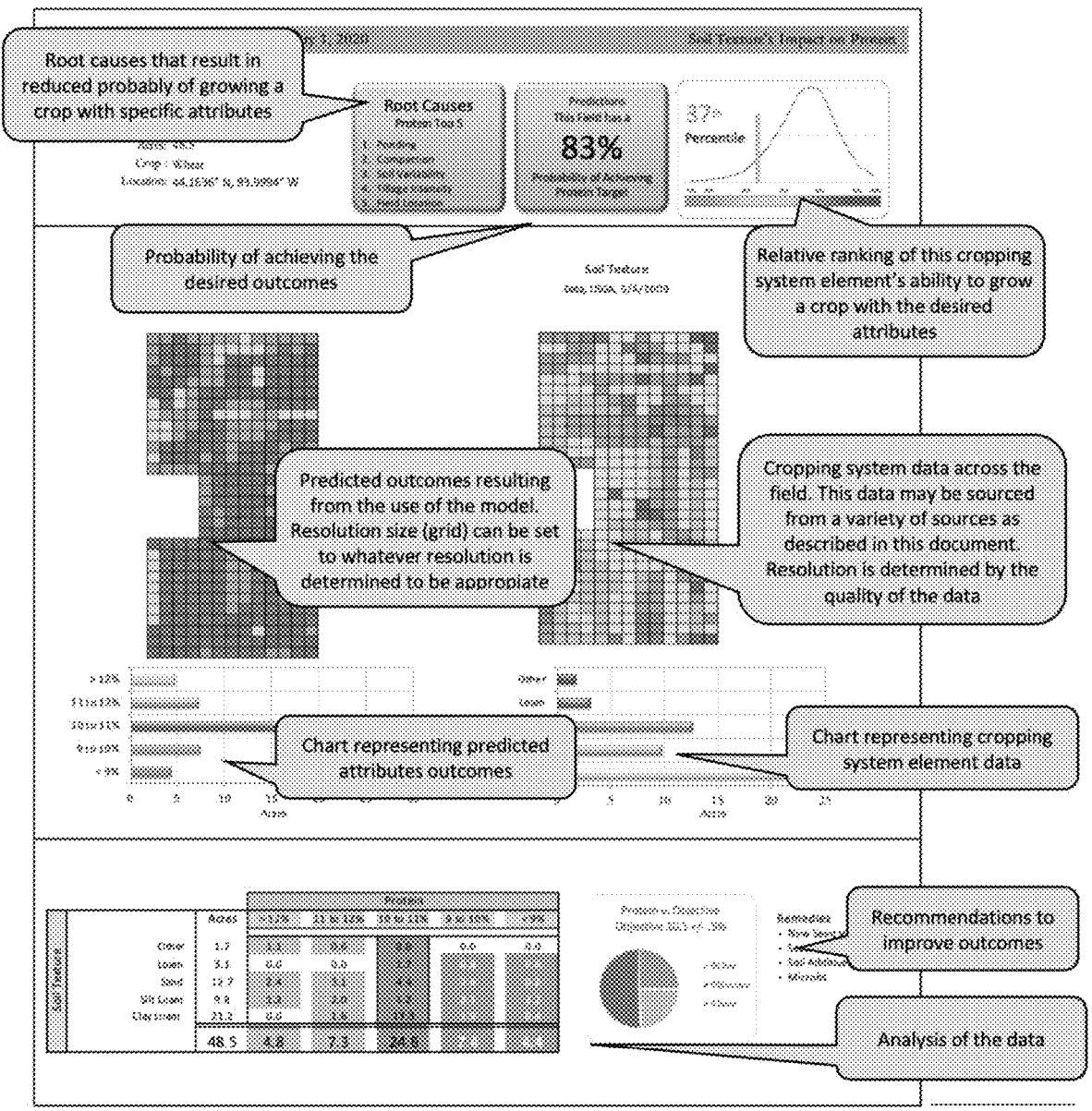
FIGS. 10A-G are examples of analysis reports of the present invention.
Figure 10B:
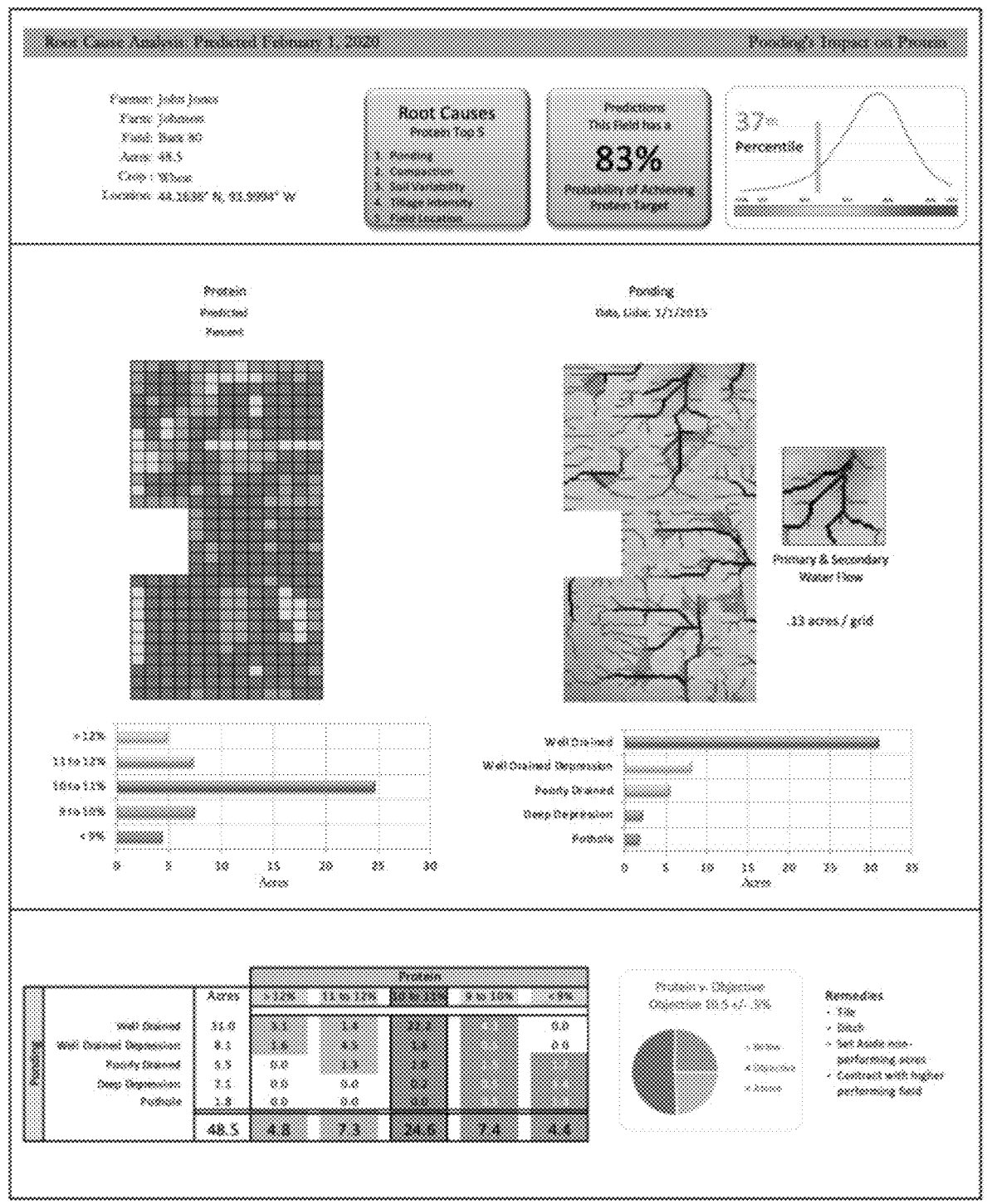
Figure 10C:
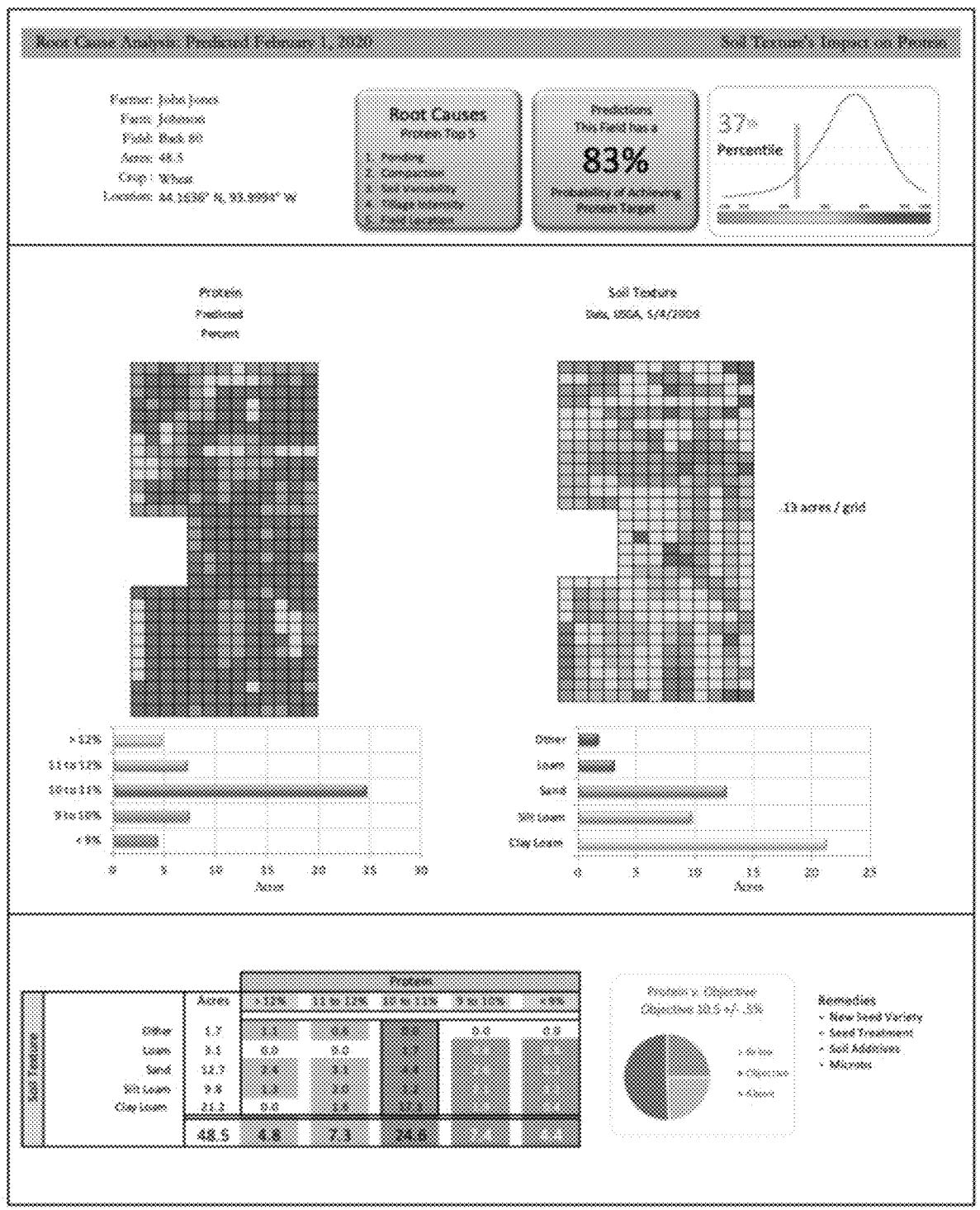
Figure 10D:
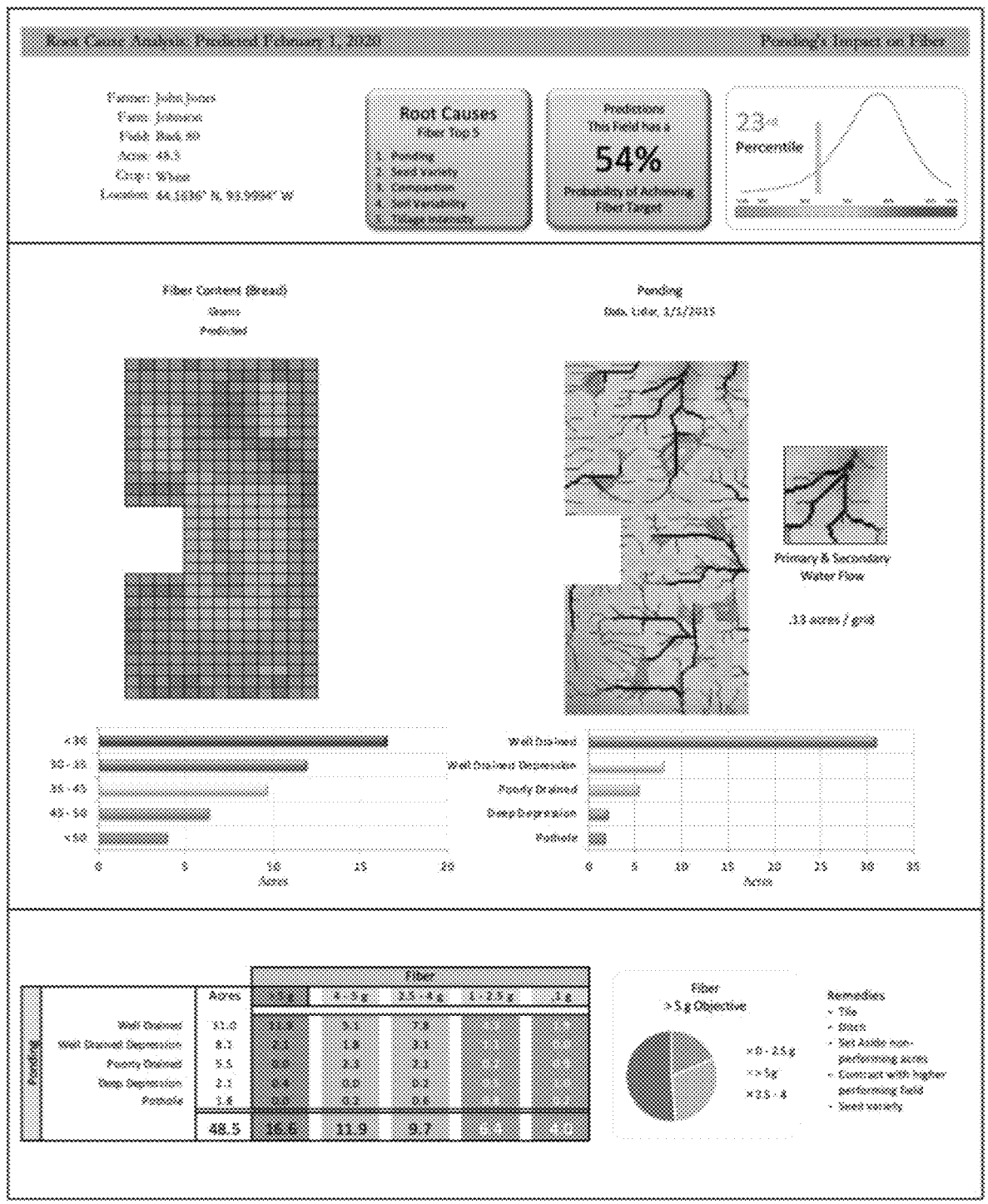
Figure 10E:
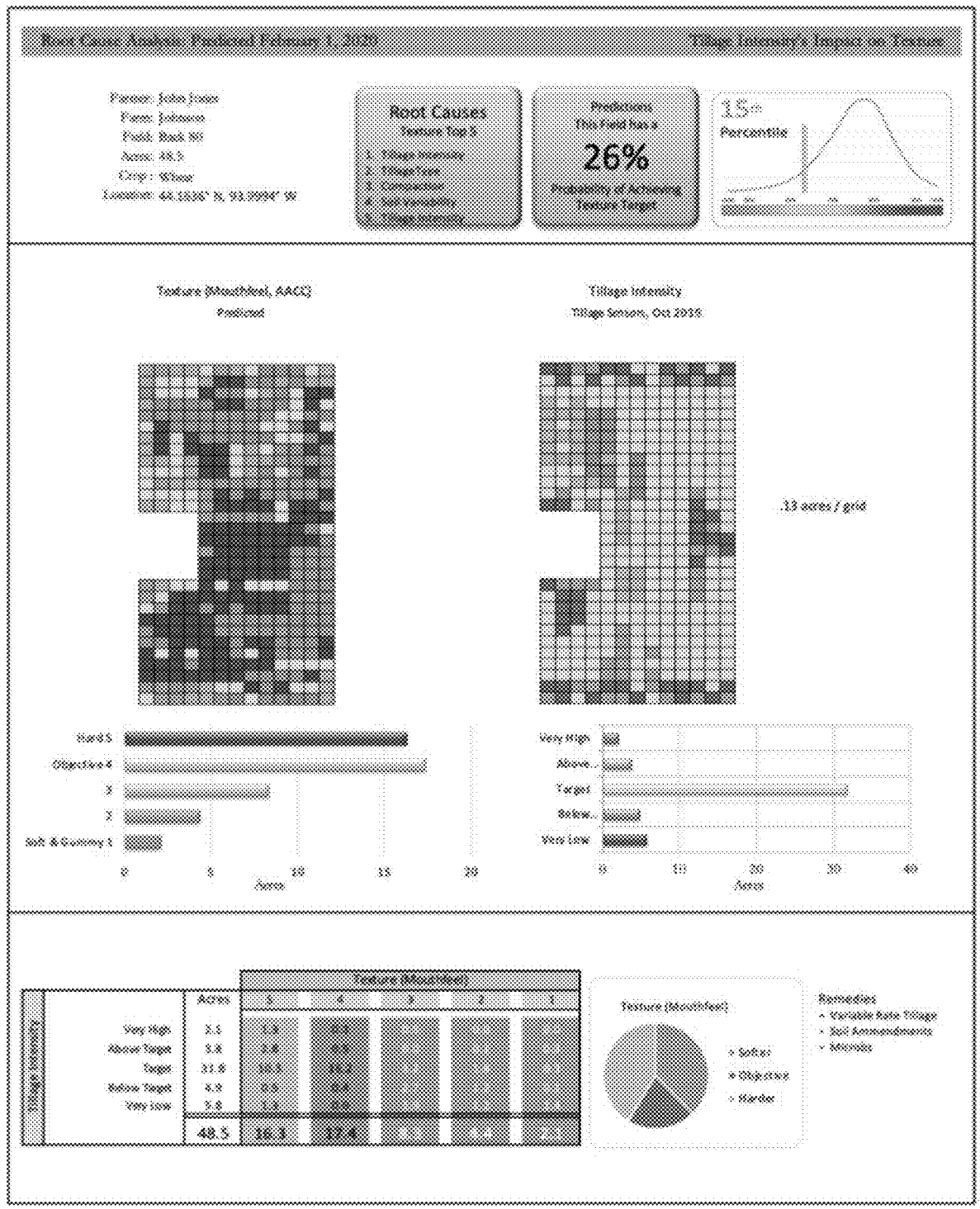
Figure 10F:
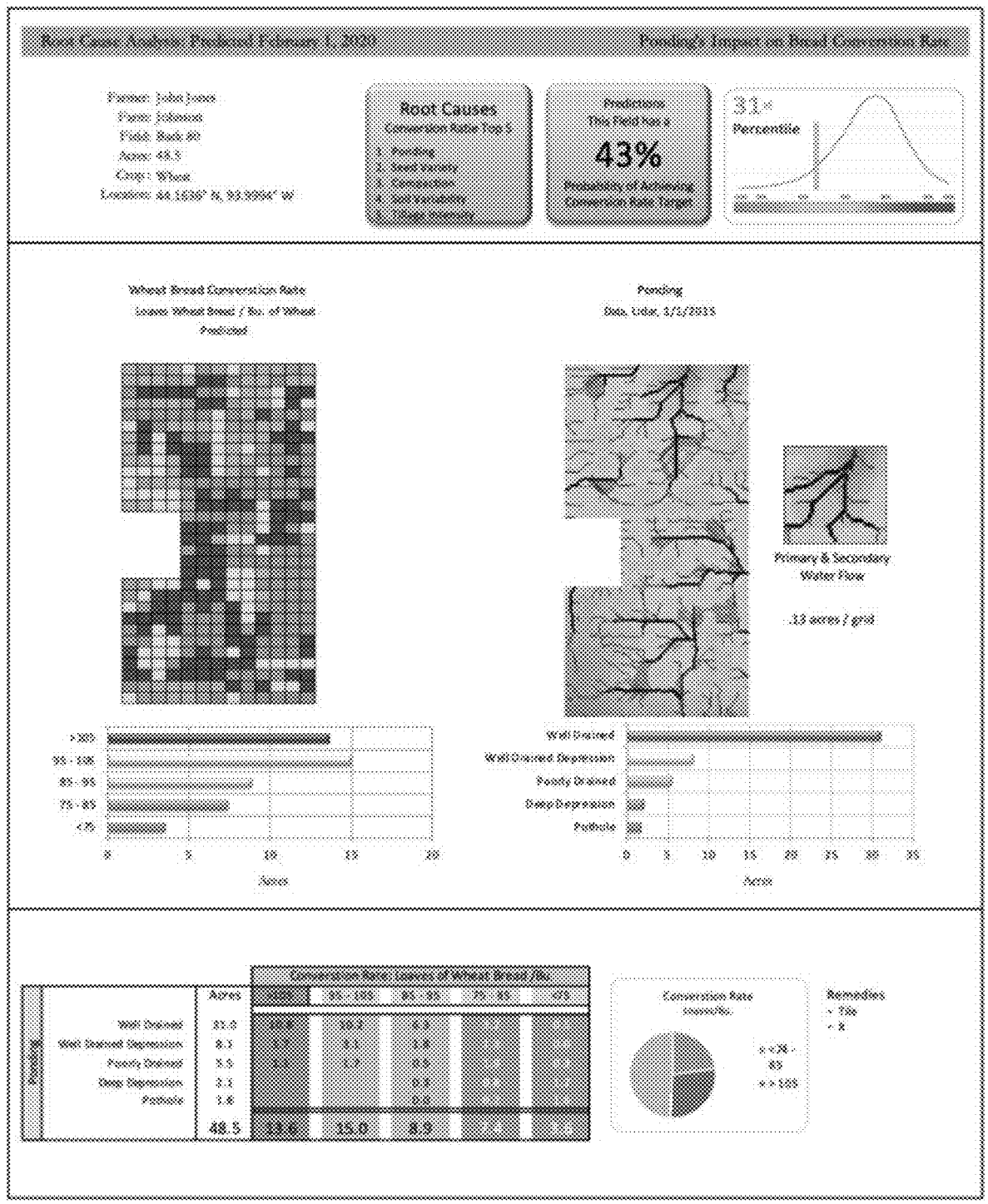
Figure 10G:
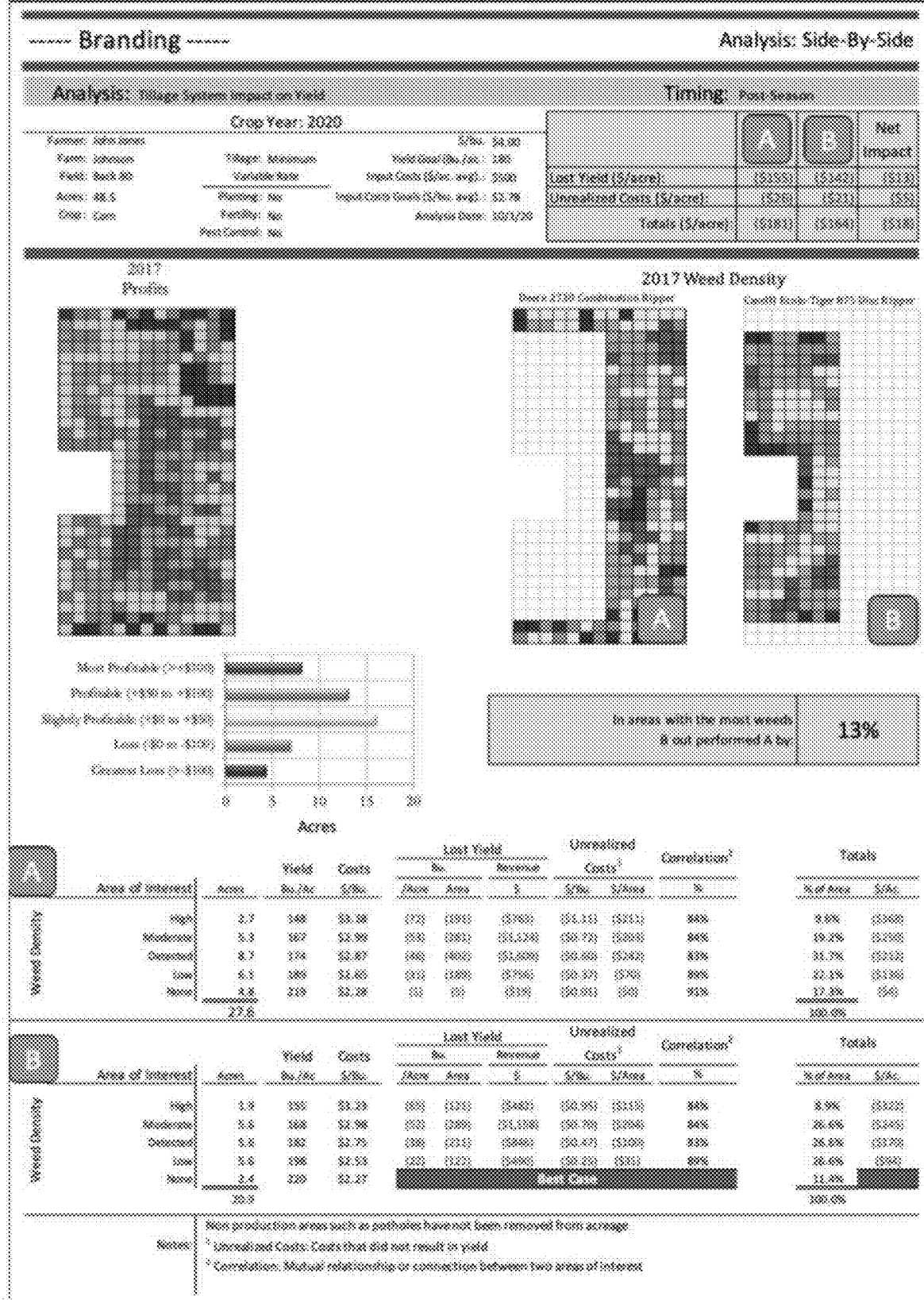

FIGS. 10A-G are examples of analysis reports of the present invention. The examples shown in FIGS. 10A-G are illustrations of specific root cause analyses with a 1:1 relationship between one attribute and one growing condition. The model provides simulation and predictions of outcomes with advanced visualizations. FIGS. 10A-G shows various root cause correlations including: ponding impact on protein; soil texture impact on protein; ponding impact on fiber; tillage intensity impact on texture (mouthfeel); ponding impact on conversion rate; border management impact on mixing tolerance index; and weed density impact on yield. FIG. 10A shows an example of the root causes analysis for soil texture's impact on protein. FIG. 10B shows an example of the root causes analysis for ponding's impact on protein. FIG. 10C shows an example of the root causes analysis for soil texture's impact on protein. FIG. 10D shows an example of the root causes analysis for ponding's impact on fiber. FIG. 10E shows an example of the root causes analysis for tillage intensity's impact on texture. FIG. 10F shows an example of the root causes analysis for ponding's impact on wheat to bread conversion rate. Conversion rate is the rate at which wheat is processed into bread, for example buns/acre, or buns per acre. Another example is corn to ethanol to measure most often as gal/bu of corn. FIG. 10G shows a root causes side by side analysis, for example, two tillage tools impact on farmer profits.

Figure 11A:
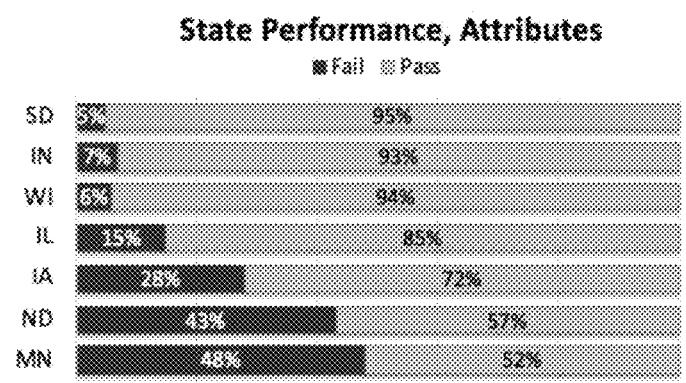
FIGS. 11A-I are examples of scorecards of the present invention.
Figure 11B:
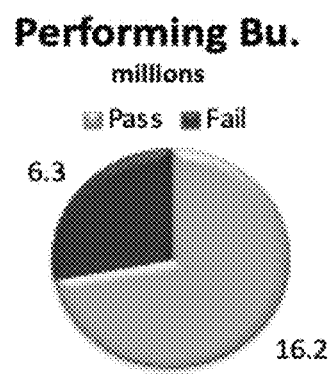
Figure 11C:
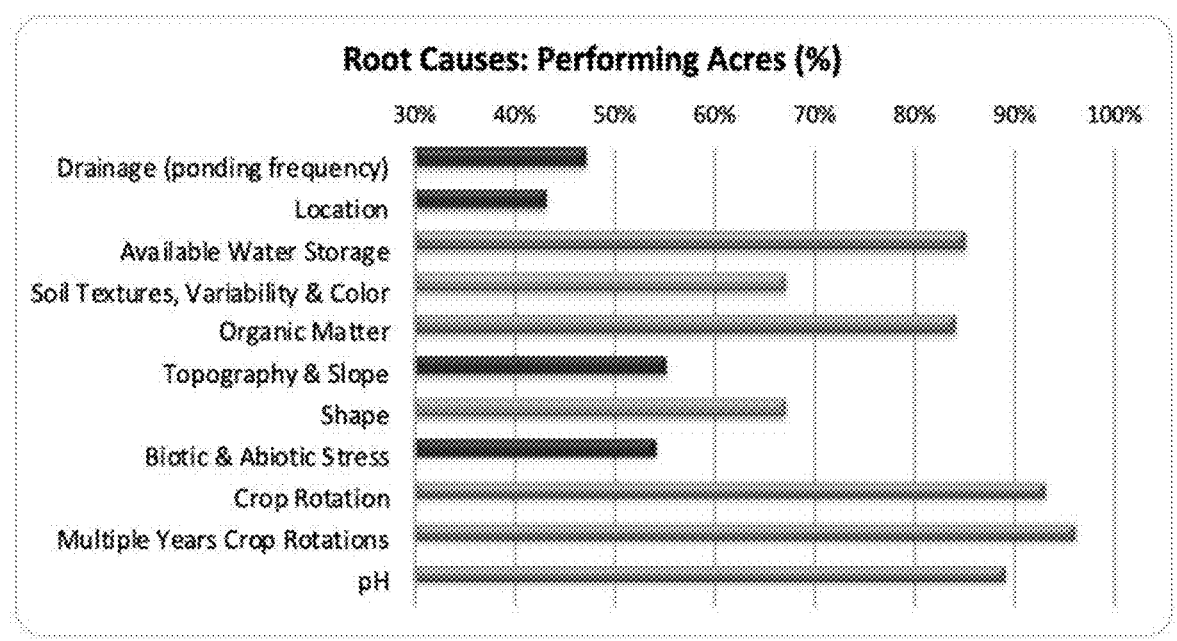
Figure 11D:
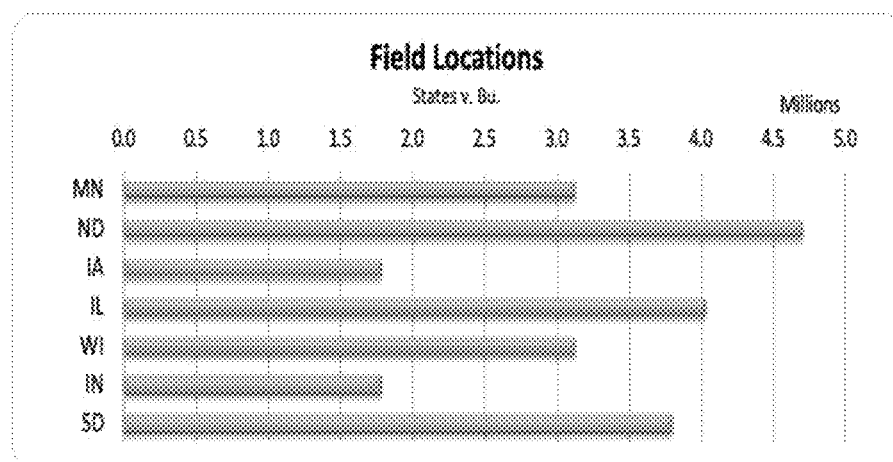
Figure 11E:
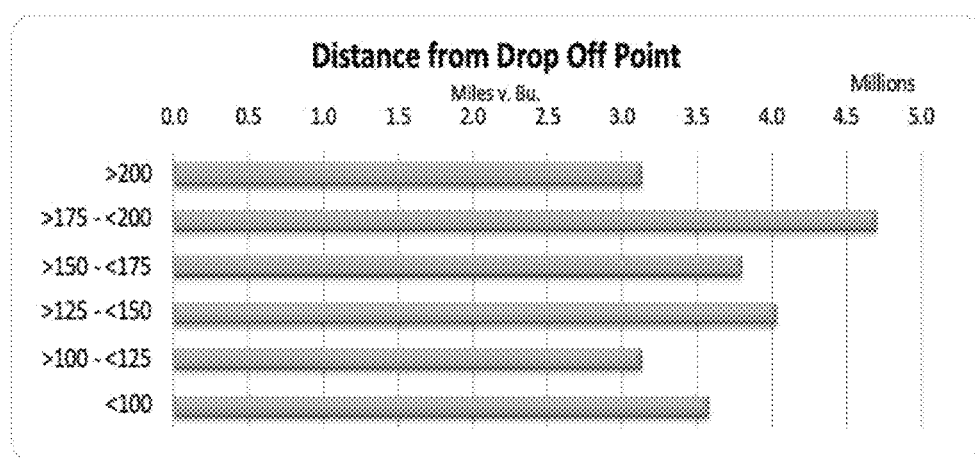
Figure 11F:
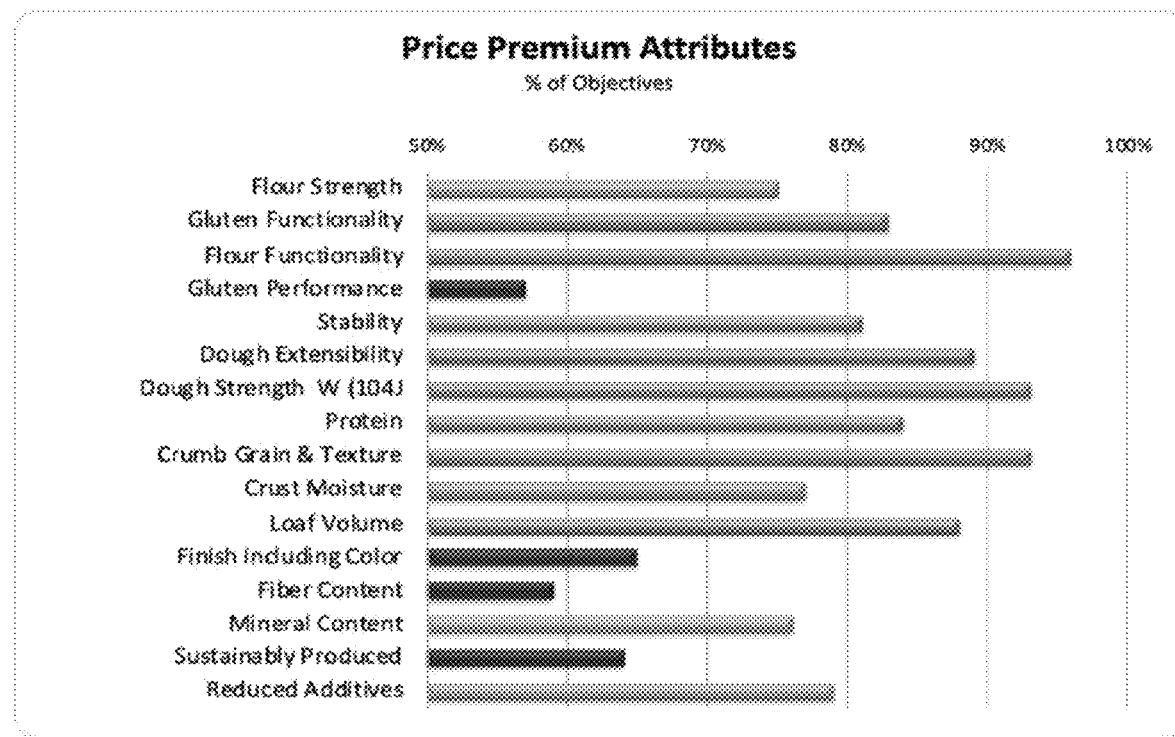
Figure 11G:
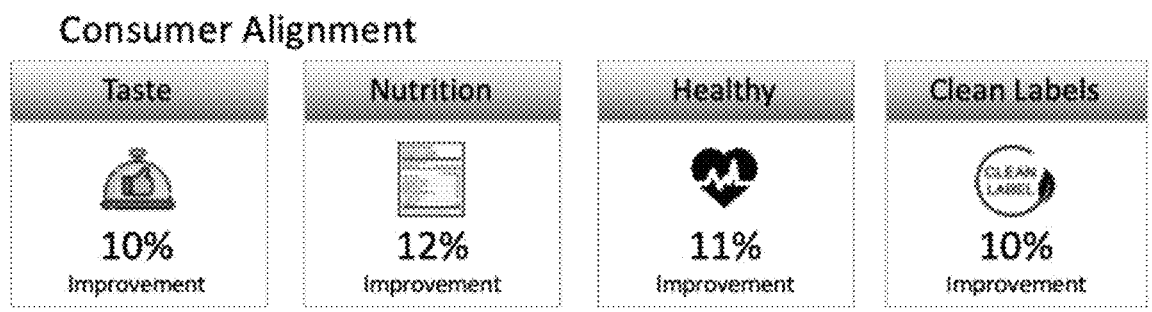
Figure 11H:
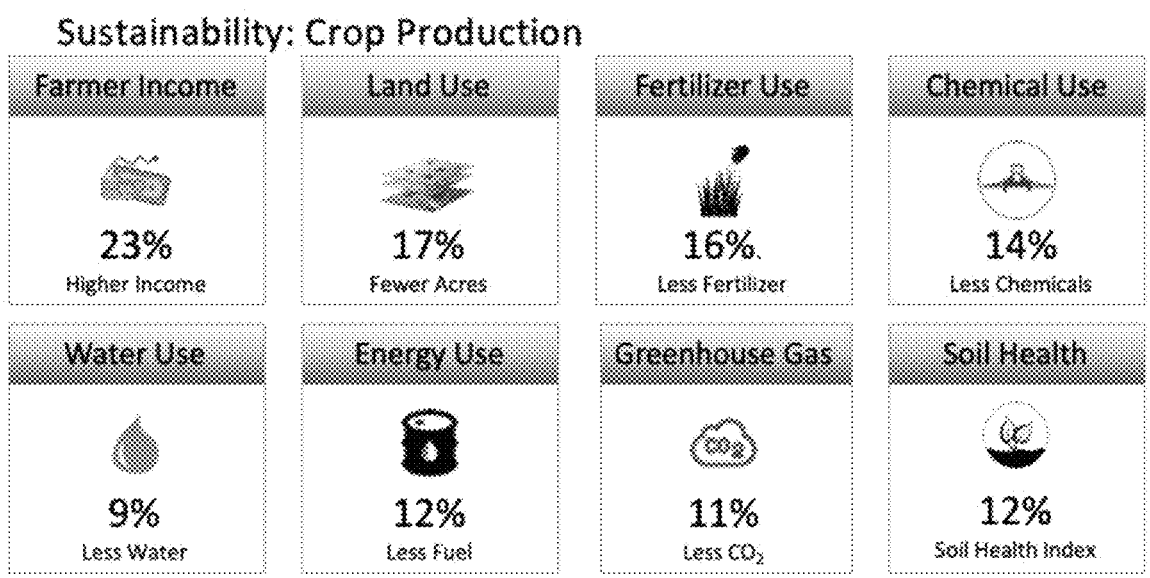
Figure 11I:
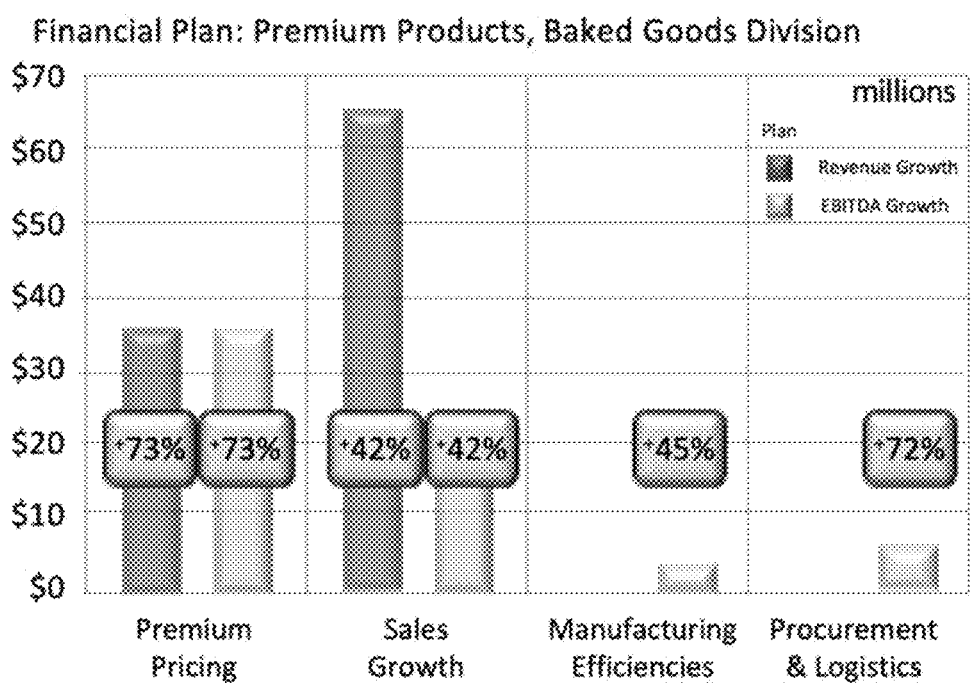

FIGS. 11A-I are examples of scorecards of the present invention. In accordance with the preferred embodiment of the present invention, Scorecards providing advanced visualization by field, farmer, attribute, region, crop, and growing condition are illustrated in FIGS. 11A-I. FIG. 11A is an example of a state performance attribute scorecards. FIG. 11B is an example of a yield scorecard. FIG. 11C is an example of a root causes scorecard. FIG. 11D is an example of a field location scorecard. FIG. 11E is an example of a distance from drop off point scorecard. FIG. 11F is an example of a price premium attributes scorecard. FIG. 11G is an example of a consumer alignment scorecard including, for example, taste, nutrition, health, and clean labels. FIG. 11H is an example of a crop production sustainability scorecard, wherein the following attributes are predicted: farmer income; land use; fertilizer use; chemical use; water use; energy use; green-house gases; and soil health. Carbon sequestration can also be predicted. FIG. 11I is an example of a financial scorecard, wherein the following attributes are predicted: premium pricing gains; sales growth; manufacturing or processing costs savings; and procurement and logistics cost savings.

Figure 12A:
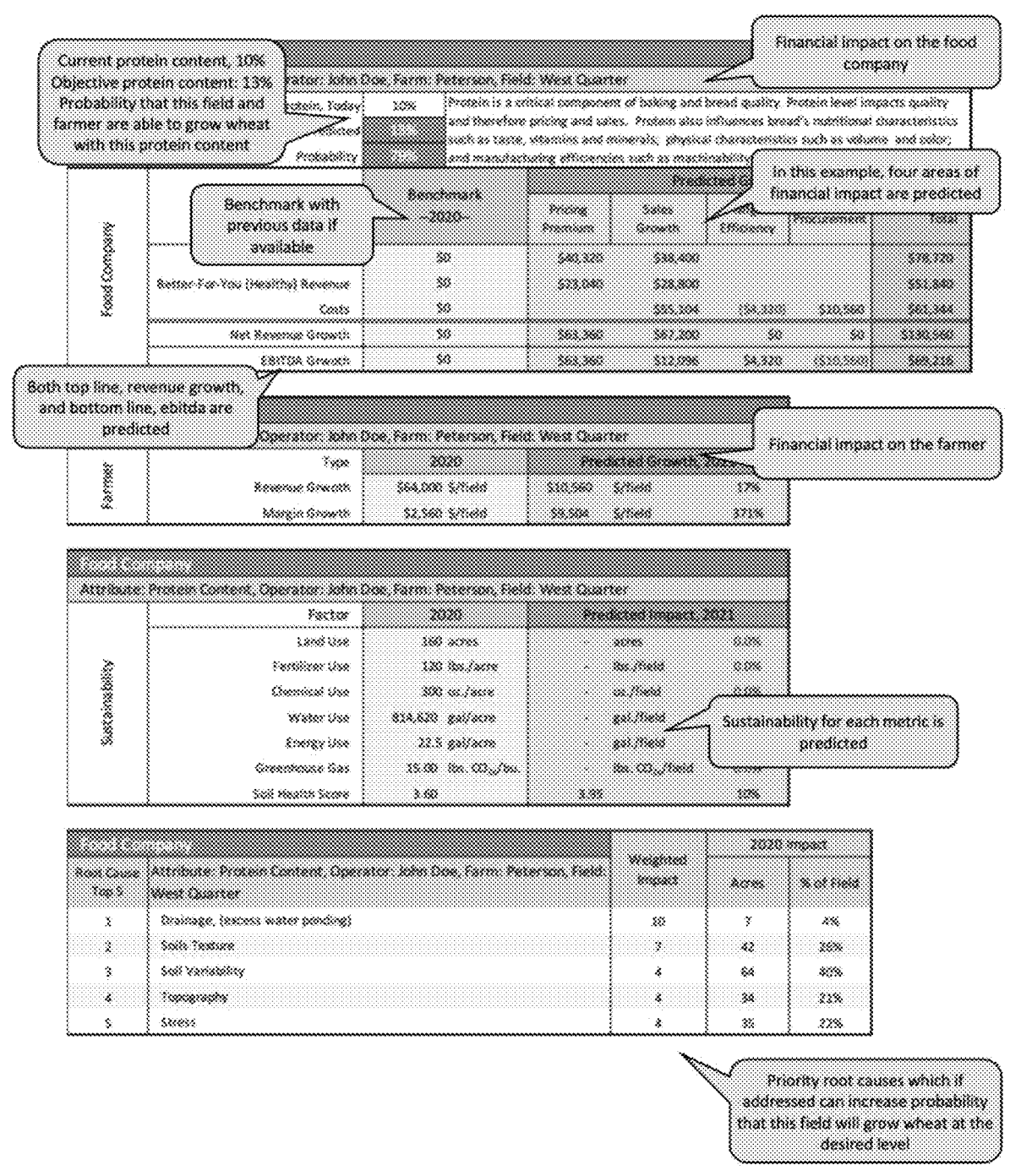
Figure 12B:
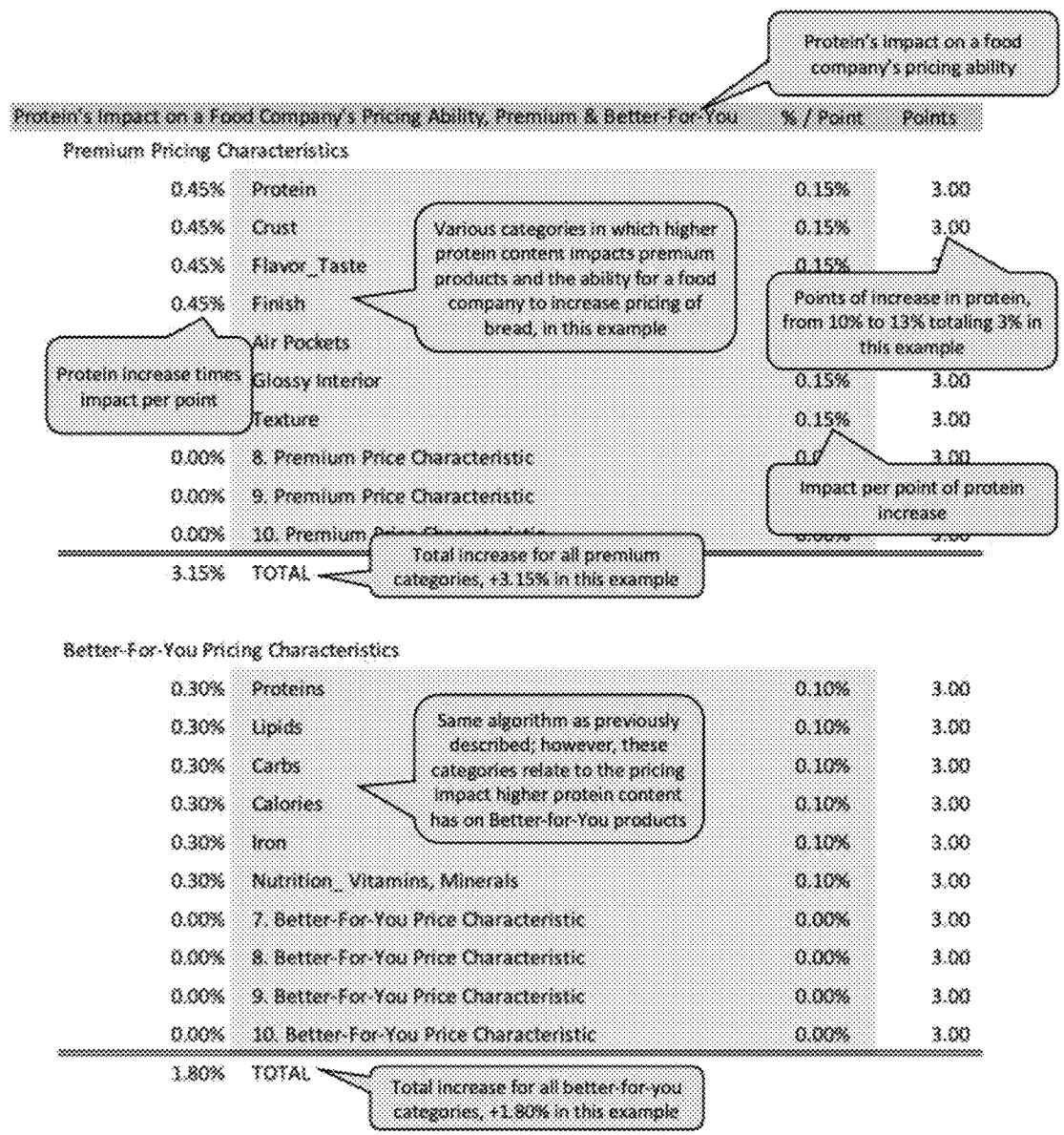

FIGS. 12A-C are examples of financial impact analysis in report format of the present invention. In FIG. 12A, an algorithm is used to calculate the financial impact of one attribute (protein in this example) on one field and one farmer. An impact on all fields is rolled up and illustrated later in this document. This data can be presented in a variety of scorecards including dashboards, alerts, mobile and printed. FIG. 12B illustrates the algorithm used to determine the financial impact of achieving a specific attribute metric. FIG. 12C illustrates the algorithm used to determine protein's metric impact on a food company's manufacturing costs.

Figure 13A:
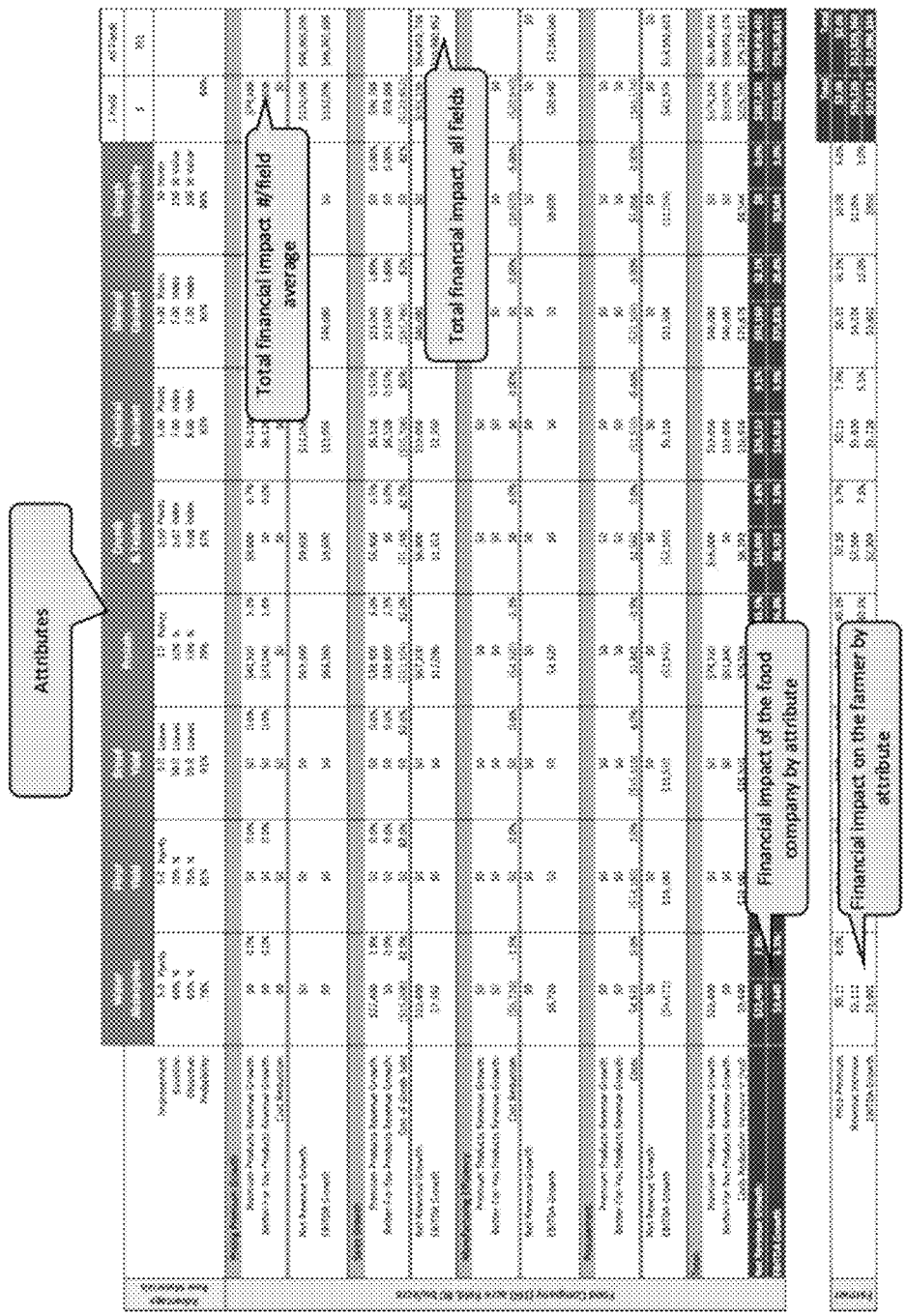
FIGS. 13A-B are examples of overall prediction outcome reports of the present invention.
Figure 13B:
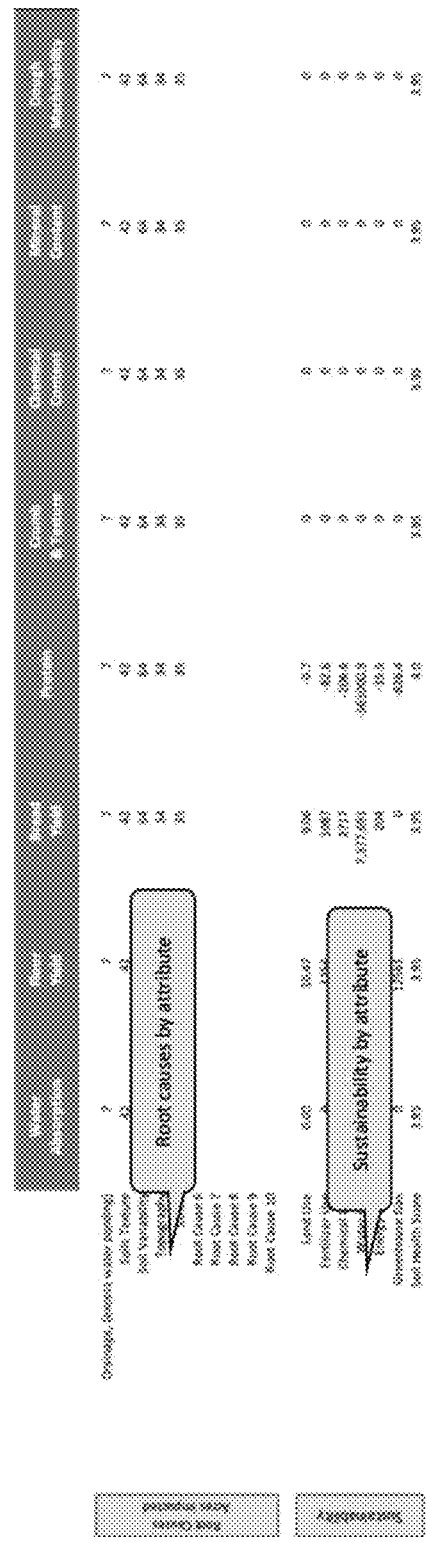

FIGS. 13A-B are examples of overall predicted outcome and metrics of the present invention. In accordance with the preferred embodiment of the present invention, all of the predicted outcomes for all of the attributes can be rolled up into a total for a field, farmer, attribute, geography, or by other area of interest. In the example shown in FIG. 13A, eight attributes for one field are rolled up. FIG. 13B is an additional example of an rolled up prediction of outcomes.

Figure 14A:
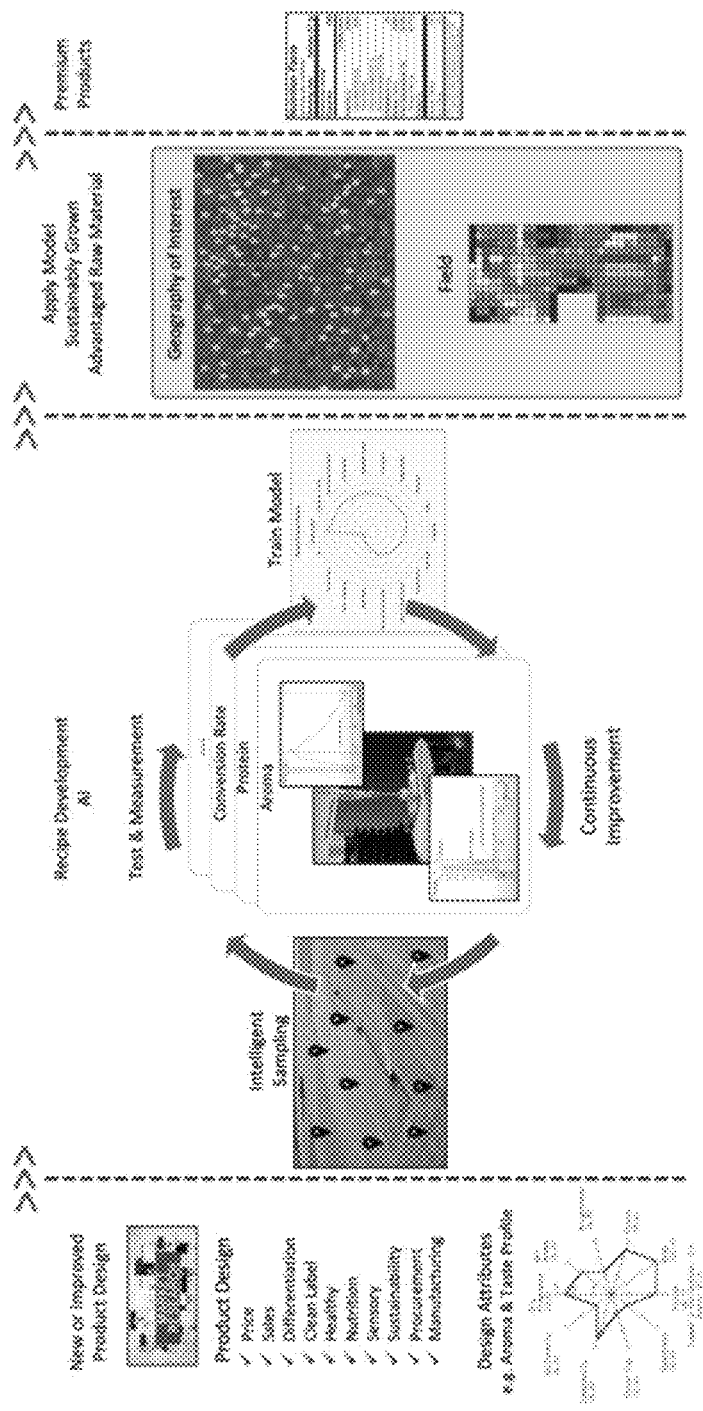
FIG. 14A-B are diagrams of the overall workflow of the present invention.
Figure 14B:
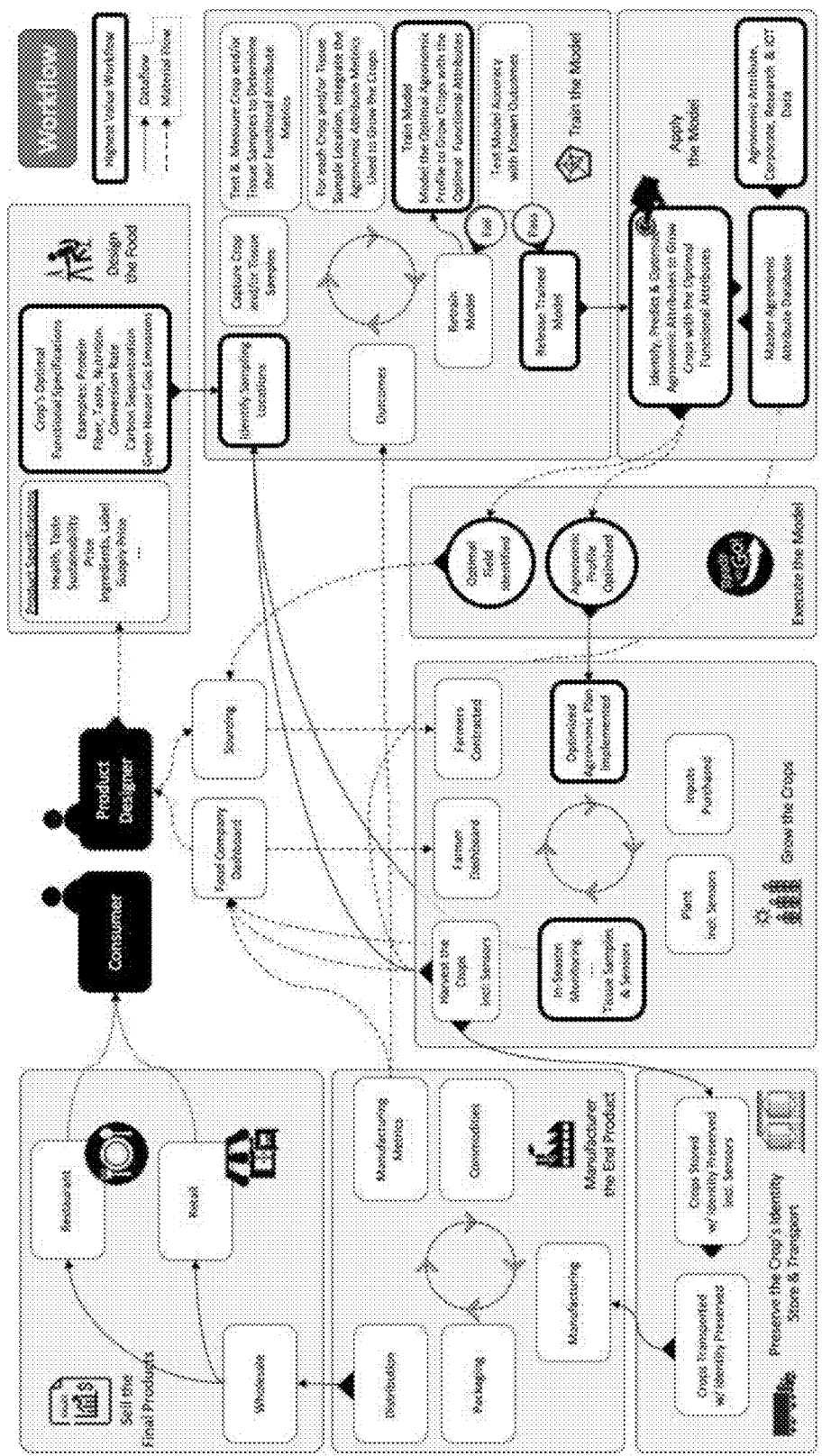

FIG. 14A-B is a diagram of the workflow of the present invention. In accordance with the preferred embodiment of the present invention, FIG. 14A shows an example of deployment: designing and launching a new or improved product, which can be described as follows. A food product or brand manager designs the new or improved product including price, target consumer, branding, packaging, label, ingredients, taste, health, safety, sustainability, supply chain, manufacturing, and other requirements for new product. A key component of a successful new product includes the ingredients. Macro ingredients will impact many areas of product performance including consumer perception, clean labels, marketing, pricing, costs, sales, manufacturing, supply chain, and micro ingredient requirements. Sourcing sustainably grown ingredients begins by defining the desired attributes, for example protein, sensory (taste, texture & aroma), and conversion rate. Fields and locations in a field are identified for sampling (Smart Sampling). Most often during harvest, within the identified fields, samples of the crop are captured at specific locations in the field. These locations have been previously identified to provide data that results in acceptable model accuracy with minimal sampling and testing costs. Greater detail about identifying fields and sampling locations is included later in this document. Most often the samples are transferred to a testing location where trained personnel use specialized equipment perform the testing. Each sample is tested and measured to determine the actual metric for each of the desired attributes. The number of tests performed will vary according to the number of attributes defined by the product manager when they defined the product specifications. Greater detail about testing & measurements is included later in this document. Growing condition data such as field, practices, inputs, and timing data is combined with testing data. The combined test data and growing condition data is used to train the model using AI/ML techniques. The trained model is applied to a set of data where the outcomes are known. This method is used to determine the accuracy of the model. This process continues until the model produces the desired accuracy. Training the model is an iterative process. The trained model can now be applied across an area of interest to predict the probability that the growing conditions will sustainably grow the crop with the desired attributes. Farmers and fields that have been identified are contracted to grow the crop using the growing condition elements. The model is applied to fields and portions of fields to identify root causes, which if addressed by management can increase the probability of sustainably growing the crop with the attributes defined by the product manager. This step is optional and requires additional data from the farmer. The crop is harvested. The harvested crop is sampled and tested to further train the model and improve accuracy. The harvested crop is temporarily stored to segregate and protect its identity from commodity crops and in conditions to maintain quality. Most often the crop is temporarily stored using on-farm storage. The crop is transported to the processing and/or manufacturing plant where it is used as an ingredient for the end use final product.

The product manager may decide to contract with third-party suppliers to engage with the farmers and provide the crops with the attributes that have been specified. The capture of sampling data may be performed by the farmer or a trained representative. The product manager may contract with other suppliers to perform other necessary services accordance with the preferred embodiment of the present invention.

The following information provides addition background on the preferred embodiment of the present invention.

Models capture the causative relationship between growing condition metrics and outcome attribute metrics. Model can be consistently and repeatedly applied to a set of growing condition metric data to make predictions and optimize a crop's outcome attribute metrics. Models are created using Artificial Intelligence/Machine Learning (AI/ML) techniques. Training techniques, applied to data and research, are used to identify the causative relationship between growing condition metrics with desired outcome attributes metrics. AI/ML generated Models are especially useful for this use case due to the complexity resulting from the large number of growing condition metrics and their infinite or near infinite possible combinations.

Optimizing attribute metrics in this complex environment is beyond the ability of a human, even an expert to perform. Traditional rules-based programming techniques are not practical due to cost and complexity. The relationships captured in the Model identify and quantify the relationship between two or more outcome attribute metrics with two or more growing condition metrics. The relationship may be multi-dimensional for example: independent, contributory, mutually exclusive, multiplier, strength or weighting with variability based on context such as regionality. The relationship may be defined one or a combination of the types of relationships just described. "Training the Model" is the AI/ML process where data and research are used to identify and quantify the relationship between growing condition metrics with desired outcome attribute metrics. "Apply the Model" is the process of applying the Model, previously trained, to a set of growing condition metric data to: predict the probability for a crop to be growing with the desired outcome attribute metrics; Identify the root causes that limit the probability of achieving the desired outcome metrics; and identify the corrective action that can be taken to improve the probability.

Growing conditions can be defined as conditions under which the crops are grown, for example, field conditions: location; soil texture & variability; soil health; topography & slope; ponding profile; biotic stress history; crop rotation history; field production history; organic content; pH; and shape.

A subset of growing conditions is cropping system conditions, for example: tillage type; tillage intensity; tillage timing; border management; weed efficiency & control; pest efficiency & control; fertility efficiency & use; disease efficiency & control; nitrogen availability; seed bed management, stand; and ponding mitigation, drainage.

Another example of cropping system is inputs such as: seed genetics and variety; seed genetics; planting rate; seed treatment product(s) & usage; pesticide product(s) & usage; fertilizer product(s) & usage; fungicide product(s) & usage; microbial product(s) & usage; and fertility stabilizer(s) & usage.

Another example of growing conditions is storage and logistic conditions: temperature; humidity; and time in storage.

Growing condition metrics include specific metrics or measurements that quantify the growing conditions, for example: A% of the acres prone to ponding, loam soil type, B-acre field size, C ft field boundary to acre ratio, D plants per acre seed rate, and F seed variety and G genetics.

Types of growing condition metrics: Optimal growing conditions are the conditions with the highest probability to grow a crop with the desired outcome metrics); Actual growing conditions are the actual growing conditions being used by the farmer to grow the crop.

Desired outcome attributes and their metrics are defined by the purchaser of the crops for example a food company's procurement or supply chain staff, product and/or brand manager when designing a new or improved end product for example, food for consumption such as bread, crackers, french fries, potato chips, beer, hamburger, butter and eggs, fiber for fashion, wood for construction, corn for biofuel. In some scenarios a new process is defined such as for a sustainability initiative. Desired outcome attributes can be further classified, for example attributes that define: sustainability; quality; pricing premium; profitability; yield; sensory such as taste and aroma; nutrition; manufacturing & processing; and risk.

Desired outcome attribute metrics: Specific metrics or measures that quantify the desired outcome attribute metrics, for example: A % protein, B aroma, C carbon, D waste, E water use, F conversion rate, G risk.

Known outcome attribute metrics: data derived when testing and measuring samples previously captured. This data is an input when training the model.

Predicted outcome attributes' metrics: Predictions of future crop outcome attribute metrics derived by apply the model to growing condition metrics data.

Samples may include, for example, harvested crop including seed, fruit, vegetables, plant tissue or end product. Samples are a subset of the crops that have been grown or end product produced. Samples are used to test and measure outcome attribute metrics which are used when training the model. Outcome attribute metrics are measured and therefore the metrics are known with a high degree of confidence and accuracy. Crop samples are most often physically captured at harvest but may be captured during the crops life cycle or at various times while the crop is in storage and transportation. Tissue samples are portions for example, a leaf, of the growing plants. Samples are specific to a date and location.

Testing crop and other samples to determine actual outcome attribute metrics. Testing the samples most often occurs in a laboratory using laboratory equipment. Some testing can be field based using mobile sensors and devices.

Data is comprised of a database, which: stores all growing condition data; is updated as new data is available. Some data is process from raw data into a more usable form for example, lidar data processed to define a ponding profile, weather to define extreme weather, imagery to define crop stress; GPS to connect data to specific locations, Extract, transform, load (ETL) functions are traditional techniques used to "clean up" the data. Field data, previously described, publicly or commercially available data, including, for example: soils, topography, boundaries (CLU), organic matter; historical including crops grown and rotation; satellite, LIDAR. Farmer supplied data, previously described, including, for example: cropping practices; inputs including products, rates, and locations; and timing.

Research: Academic and industry research relative to growing conditions, outcomes, and metrics.

Supply chain data, for example data provided by the food brand, processor, biofuel plant, restaurant, food retailer; supply chain performance; and product specification. Cropping input specifications, for examples: product including seed, genetics, rates, usage, impact, regulatory requirements; equipment performance; sensor and other products.

Cropping system data, metrics derived from iOT farm equipment, sensors, physically by a person and/or external commercial and public sources. This data will be applied to specific locations in a field.

Optimized growing condition metrics data: Growing conditions with the highest probability of growing plants and crops with specific outcome metrics. This data is specific to a location in a field.

Training data: Combination of known outcome metrics data and growing condition metrics data for each location where the samples were captured, and the outcome metrics data is known. This data is specific to a date and location.

Sustainability: Improving economic viability, environmental protection and social equity across the food, fiber, energy agriculture supply chain. For example: Green House Gases; carbon sequestration; land use; water use and quality; chemical use; fertilizer use including N, P, K and micronutrients; farmer income; and waste.

Supply chain can be defined as any commercial business that provides or uses agriculture products for: food, for example, food retailers, food brands, ingredient providers, processors, distributors, and restaurants; fiber industry, for example, cotton and wool for fabric; feed for animals for example pork, beef, dairy, and pets; plant-based protein industry; and raw material for the biofuel industry including biodiesel and ethanol. Any organization striving to improve sustainability when growing a crop or processing it into another product. Any organization marketing or selling carbon credits and offsets based on carbon footprint resulting from growing an agriculture crop. Any government agency or NGO that regulates and/or promotes the growing, processing or sales of agriculture-based products, for example, USDA, NRCS, DOE, conservation, and foundations. Any organization in the agriculture-food supply chain providing financial services for example, bankers, financiers, marketing, and insurance providers. Any supplier in the agricultural-food supply chain including, for example, agribusiness, input providers, and farm equipment manufacturers. Any organization in the agriculture-food supply chain providing logistic services including, for example, trucking firms, brokers, shippers, freight forwarder and distributors.

Farmer can be defined as a person operating the field including advisors and employees, to grow plants and crops.

Plant can be defined as any plant cultivated for use as for example, food, beverage, fiber, ingredients, energy, animal feed, dairy, and building products. Plants and crops are synonyms in this document.

iOT sensors can be defined as sensors mounting on farm equipment including, for example, yield, moisture, location (GPS), application and planting rate controllers and monitors. Aerial sensors including, for example, cameras mounted on satellites, airplanes, and drones. In-field sensors including, for example, traps, weather, soil, and moisture sensors. Hand-held sensors, for example, probes.

End product is the end use of the crop and may be food, for example, bread, crackers, french fries, potato chips, beer, hamburger, butter, eggs or fiber for fashion, wood for construction, biofuel, plant based protein and animals.

Field can be defined as any area where a plant is grown including, for example, farm field, greenhouse, and vertical farming facility.

FIG. 14B shows a segment of the workflow describing the creation of product design and specifications for a new or improved product or improved process by management within the supply chain. Then translates the product specification into the desired attribute metrics for the crops to achieve the desired product or process results. Identifying and achieving the desired outcome attribute metrics drives the entire workflow. Management within the supply chain, when designing the new product such as a bread or process such as carbon sequestration, create the product or process specifications. For this example, designing and developing a new food product will be used. The initial product specification may result from: Personal preference, experience, and opinions of the brand and product design team; Input from marketing; Input from advisors, for example, consultants, researchers, suppliers, and industry experts; Input from the consumer, for example, surveys, interviews, research, purchasing behavior, or other feedback mechanisms.

Feedback may be solicited from a specific consumer group such as millennials or Gen Z, genders, regions, income levels, or other groups of consumers. Consumer feedback may include, for example: health preferences such as cholesterol, fat, sugar, GMO, gluten-free, and many others, and Sensory preferences such as taste, texture, aroma, and many others. Sustainability objectives across the supply chain such as GHG (green-house gases), carbon sequestration and prevention, land and water use, farmer income. Input from leadership concerning business objectives including, for example, premium pricing, sales growth, and customer loyalty. Input from manufacturing, for example, costs, bottlenecks, efficiencies including the supply chain, quality, and other manufacturing-related opportunities for improvement that a crop with desired outcome metrics may impact. Input from corporate sales, for example, pricing, margins, terms, and forecasts. Input from accounting for example, financial performance such as budgets, costs, margins, and EBITDA. Input from the supply chain concerning crop and ingredients, for example preferences, specifications, supply availability, and risks.

The absence of an attribute may be an important design consideration, for example the absence of GMO ingredients or chemicals and cleaner and simpler labels; The traceability to the source of the product and ingredients as well as the production practices; and Input from others who can provide input and insight into product specifications.

FIG. 15A shows product specifications which are often expressed as specific metrics; for example, X % protein, Y % sugar or Z % of daily requirements. A subset of the product specifications is often communicated to the consumer via a product label or some type of detailed product specification. The content of the product label is generally limited to what is required to meet regulatory compliance and/or company policy. A representative product label example is shown in FIG. 15A. In this version of a product label the change in the product specifications from one product version to another is included.

Product specifications are then translated to desired attribute metrics. The tables 15B-15E include examples of desired outcome attribute metrics for wheat that is to be used as a primary ingredient for a new product, in this use case, bread. Each outcome attribute has a specific metric that quantifies the desired objective. FIG. 15B shows an example of desired outcome attribute and metrics, wheat for bread including sample metrics such as wheat desired outcome attributes & metrics and flour desired outcome attributes & metrics.

FIG. 15C shows an example of desired outcome attributes and metrics, wheat for bread including sample target metrics, including: manufacturing and processing desired outcome attributes & metrics; nutrition desired outcome attributes & metrics; sensory desired outcome attributes & metrics; sustainability desired outcome attributes & metrics; and risk desired outcome attributes & metrics.

FIG. 15D shows an example of desired outcome attribute and metrics, potatoes for potato chips, including: yield desired attributes & metrics; potato desired chemical attributes & metrics; potato desired physical attributes & metrics; potato desired defect attributes & metrics; potato desired disease attributes & metrics; and potato desired storage attributes & metrics.

FIG. 15E shows desired outcome attributes and metrics, potatoes for potato chips, including: potato desired chipping attributes & metrics; potato chip desired attributes & metrics; and farmer desired attributes & metrics.

FIG. 14B also shows the workflow group describing the workflow components to identify optimal sampling locations, capture crop and in some cases plant tissue samples at those locations, test and measure them to determine their actual outcome attribute metrics. Then combine the now known outcome attribute metrics with growing condition metrics data used to grow the samples. This combination of data is then used to train the Model and later, iteratively improve the Model over time. This Model will then be used to predict, simulate, and optimize growing condition metrics to grow a crop with the desired attribute outcomes metrics.

When quantifying the outcome attribute metrics, capturing samples from all possible locations can be prohibitive due to financial and time constraints. Intelligent or smart sampling is an alternative approach to scale down the number of samples required and therefore the costs and time to capture the samples; and then test and measure them to determine their outcome attribute metrics. Important considerations when using intelligent sampling are to determine the smallest training data set size that achieves the same accuracy as a larger data set. Statical analysis can be used to determine the number of samples required. The specific locations need to provide the quality and variability of outcome attribute metrics. The optimal sampling locations are located at specific sites in specific fields, that have the desired combination of growing condition metrics required to train the Model.

Some types of growing condition metric data can be used directly from the available data while others require processing to determine the growing condition metric. For example, weather is processed to determine, for example, the number of days above 90° F. during the period of time when the plant is flowering, or number of sequential days with less than 0.5" of rain. In this example implementation, the growing condition metrics are stored in the master growing condition database and are updated as new data becomes available. Updating frequency may vary from many times a day for some types of data such as weather, to once a day for planting data, or rarely for data that changes infrequently such as soil texture Examples of growing conditions include: water ponding frequency and zones; available water storage, top 10 inches of soil; available water storage, top 20 inches of soil; topography; slope; latitude and longitude location for each of the samples; shape of the field; short and long-term history of biotic stress; short and long-term history of abiotic stress; primary soil texture; soil variability; soil color; previous crop; multiple year crop rotations; organic matter; field productivity history; EC (Electrical Connectivity); soil pH; and weather history, including extremes, for example: days above 90° F., rain events greater than 3", sequential days will less than 0.5" of rain, dates of first frost (earliest past 5 years, most recent past 5 years), dates of last frost (earliest past 5 years, most recent past 5 years), and average date soils achieve 50° F. (earliest past 5 years, most recent past 5 years). Other data if available may include cropping practices, inputs and outcomes.

After the locations are identified, crop and/or plant tissue samples are captured at each location. Capturing the samples will generally occur during harvest when the crop has reached maturity and the final outcomes can be determined, although other samples, for example, tissue samples may be captured in-season. Each time the samples are gathered the physical location and capture date are recorded such that the sample and subsequent sample data can be tied to a specific time and location in a field.

During the testing and measurement segment of the workflow each of the samples captured during the previous workflow step are tested and measured to determine their specific outcome attributes' metrics. At the end of this process the outcome attributes' metrics for each of the sample locations will be known. A variety of testing and measuring devices are used to test the samples, plus there are commercially available testing services. The testing device used depends on the specific outcome attribute being measured. Various types of devices include spectrometers, alcohol analyzers, refractometers, titrators, moisture analyzers, and other standard lab equipment. Specialized analyzers and meters are also available.

During the integrate known outcome attribute metrics data with the growing condition metric data segment of the workflow, growing condition metrics used to grow the samples is acquired and integrated for each of the sample locations. Testing and measuring methods were used to determine the outcome attribute metrics while the growing condition data used to grow the samples will be received from a variety of iOT (Internet of Things) sensors that are machine mounted and/or located in a field, as well as from commercial and public sources. Growing condition metric data is site-specific and defines the conditions under which the samples were grown. In some use cases the data for multiple years may be available for example crop rotation. Growing condition metrics may have variable spatial and temporal resolutions, as well as levels of quality which needs to be accounted for. The availability of growing condition metrics may vary from country to country, region to region, and field to field.

Growing condition metric data can be classified into a variety of categories for convenience. For example, field: these growing conditions metrics describe are specific to a field, regardless of who operates it. This data is generally available through public and/or commercial sources. Examples Include: water ponding frequency and zones; available water storage; topography and slope; location; shape; biotic stress; abiotic stress; soil texture; soil variability; previous crop, crop rotation; multiple year crop rotation; organic matter; field productivity history; EC (Electrical Connectivity); and pH.

In addition to the field data growing condition data may include cropping practices used to farm the field and grow the crops. These metrics are generally available from either the farmer, iOT sensors on a farm machine, field-located iOT sensors, farm management, or precision agriculture software. Some metrics may be available via WIFI directly from a farm machine or other networks or via other means, for example a memory stick, email, on-line storage or internet. For many farmers and supply chains, access, use and management of growing condition metric data will be defined contractually. Examples include: compaction; borders management; headlands management; seed bed quality; seeding accuracy; stand development; weed control efficiencies and practices; pest control efficiencies and practices; disease control efficiencies and practices; fertility efficiencies and practices; nitrogen availability when needed; micronutrients availability, when needed; canopy variability; residue management; tillage type; tillage intensity; lodging; and pre-harvest management.

Another type of growing condition metrics are relative to the inputs used when growing the crops. These metrics are generally available from either the Farmer, iOT sensors on a farm machine, field-located iOT sensors, and farm management or precision agriculture software. These metrics may be available via WIFI directly from the machine or sensor or other technical networks or via other means, for example a memory drive, email, internet or on-line storage. For many farmers and supply chains, the availability, use and management of growing condition metrics will be defined contractually. Examples include the product, rate, and placement of: seed variety and genetics; seed treatment; soil amendments and nutrition; microbials; chemicals; fertility; stabilizers; and fungicides.

These growing condition metrics are relative to when the various field operations were performed. These metrics are generally available from either the farmer or agronomist, iOT sensors on a farm machine, field-located iOT sensors, and farm management or precision agriculture software. The data may be available via WIFI or other technical networks or via other means, for example a memory drive, email, or on-line storage. For many farmers and supply chains the availability, use and management of growing condition metrics will be defined contractually. Examples include: seeding-planting date; fertilizer application date; fungicide application date; and harvest date.

Another type of growing condition metrics are relative to storage and transportation of the crop, its quality during this period of time, and preserving the crop's identity throughout the storage and delivery processes. Crops with certain specific outcome attribute metrics cannot be co-mingled or handled in bulk with other crops (commodities) and still retain the desired outcome attributes metrics. There are a variety of identity-preservation systems that can be deployed. A common approach is the use of on-farm storage. Growing condition metrics are generally available from either the farmer, iOT sensors on a farm machine or grain bin, field- or storage-located iOT sensors, and farm management or precision agriculture software. The data may be available via WIFI or other technical networks or via other means, for example a memory drive, email, or on-line storage. For many farmers and supply chains the access, use and management of the growing condition metrics will be defined contractually with final delivery dependent on the requirements of the delivery point. Examples include: quality; deterioration; sugar content; bruising; rotting; rodents; temperature; and mold.

Growing condition metrics may be available from the supply chain or other company contracting with the farmer. It may be stored in an ERP, a CRM, or other corporate system. Examples include: sales history; contract history; and performance history.

During this segment of the workflow shown in FIG. 14B, the two data sets; the known outcome attributes metrics as well growing condition metrics are used to train the model. The model will be trained initially and then on an on-going basis as new growing condition metric data is available.

The one or more machine learning operations can include one or more of: a generalized linear model; a generalized additive model; a non-parametric regression operation; a random forest classifier; a spatial regression operation; a Bayesian regression model; a time series analysis; a Bayesian network; a Gaussian network; a decision tree learning operation; an artificial neural network; a recurrent neural network; a reinforcement learning operation; a linear/non-linear regression operation; a support vector machine; a clustering operation; and a genetic algorithm operation.

A portion of the known outcome attribute metrics from the sample locations, for example, 25% to 30% of the known total, will be "set aside" and used later to determine the accuracy of the Model after the Model is trained. Using this approach, the trained Model, can be applied to a set of growing condition metrics to predict the probability of growing a crop with the desired outcome attributes. These predictions are then compared to the known outcome metrics and accuracy of the Model determined. If the accuracy is not acceptable, the Model can be retrained using additional sample data, new algorithms, or new assumptions. This process can continue until the accuracy of the Model is optimized or has reached an acceptable level of performance.

During this segment of the workflow, new, outcome attribute metrics can be used to further train the Model. The objective is to continuously improve the Model's accuracy as additional outcome attribute metrics and growing condition metrics become available. The initial Model was trained using data from locations identified via intelligent sampling techniques and previously described. Over time the Model will be applied to an ever-increasing number of locations. Samples from production acres will provide and an ever-increasing amount of sample data that can be used to further train the Model.

Figure 15F:
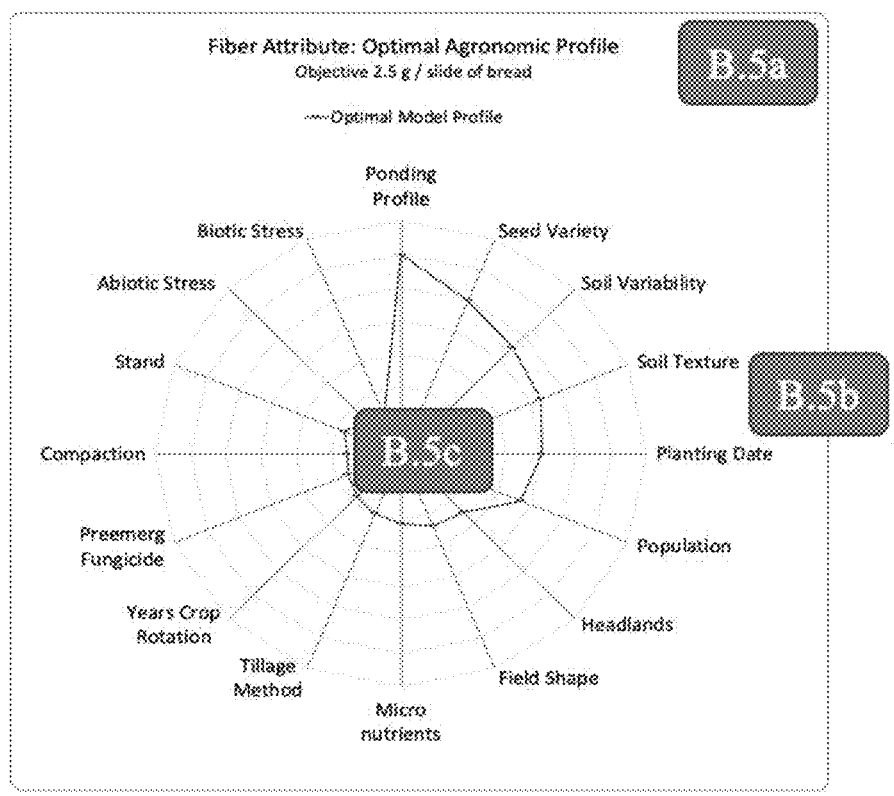

FIG. 15F is a diagram is one form of graphic expression of a model. This is the result of this phase of the workflow. This model is an example for wheat where fiber is the desired attribute as defined by the supply chain's product or brand leadership. The desired attribute metric is 2.5 g/slice of bread in this example. The growing condition metrics that impact fiber, our example, are displayed in the outer circle of this example Model representation. For this example, the growing condition metric, ponding profile is at the 12 o'clock position and has the largest impact on fiber. As we progress through the growing condition metrics in a clockwise direction the impact the growing condition metrics have on fiber decreases. For example, "stand (planting accuracy and germination)" has a lesser impact on fiber than compaction. The fiber Model including the optimal growing condition metrics was created as previously described. Other growing condition metrics not included in this representation had little or no impact on this desired outcome attribute.

Although not represented in this diagram, in some use cases, a combination of two or more growing condition metrics may impact one or more outcome attributes. This may be true even when one growing condition metrics has no impact on the outcome attributes. For example, a combination of the soil and slope growing condition metrics have an impact on the outcome attributes while slope by itself did not.

The relative impact for each growing condition metrics is expressed as the solid line in this example shown in FIG. 15F. The further the line is located from the center of the chart, the larger the impact.

In another segment of the workflow shown in FIG. 14B, the model is applied to growing condition metrics data in an area-of-interest. During this segment of the workflow shown in FIG. 14B, the Model is applied to identify and predict which fields have the highest probability of growing the crop with the desired outcome attribute metrics. The ability of a field to grow the crop with the desired outcome attribute metrics can be expressed as a percentage probability or by some other scoring mechanism such as scale of 10 to 1, odds as in gambling, or on a color scale.

Models can be applied to the data in a variety of ways depending on the objective of the user, for example: Select a field with the highest probability (score) of growing a crop with the desired attribute metrics; Simulate various growing condition metrics as what-if scenarios to predict alternative plans of action; Identify what actions need to be completed to improve outcomes attribute metrics; and predict the outcomes metrics if no action is taken.

Figure 15G:
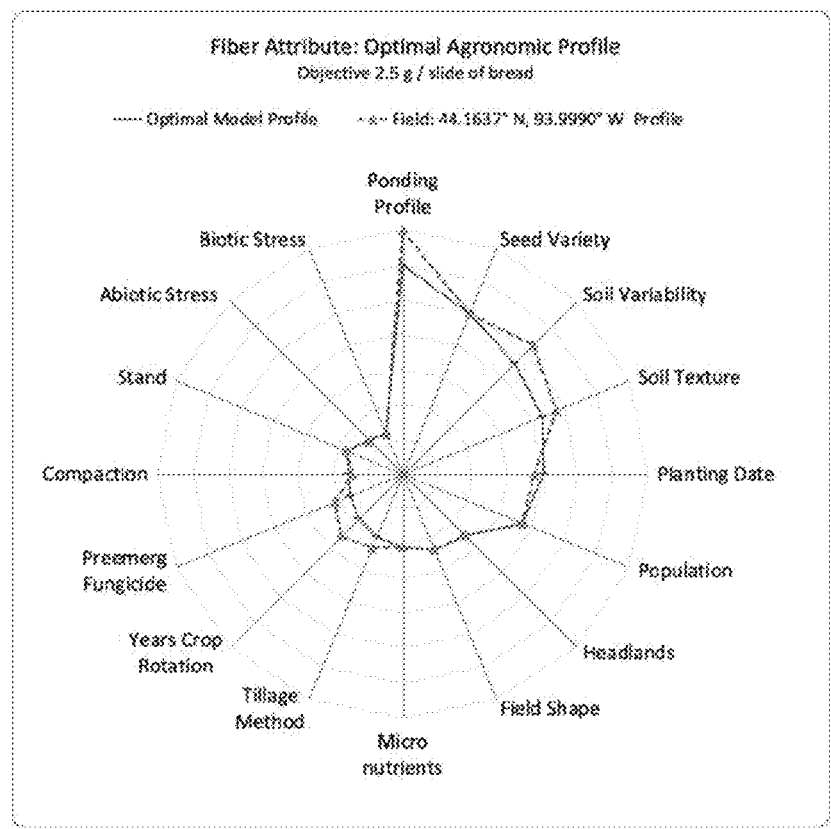

FIG. 15G shows an example wherein wheat is the crop and fiber is the desired attribute. The growing condition metrics for a specific field, has been benchmarked to the desired growing condition metrics contained in the model. The model is displayed as a solid line. The specific field is identified by the latitude and longitude where it is located. Its actual growing condition metrics are represented as a dashed line. Deviations between the model's desired growing condition metrics and the actual growing condition metrics for this specific field are used to predict the probability that this field will grow plants with the desired outcome attributes. The same analysis can be performed for a portion of a field such as a management zone, for example, 0.1-acre grids, or for a larger area such as a geographic region or an area of interest.

In addition to predicting the probability that this field will grow plants and/or crops with the desired attribute metrics, the predicted corrective actions are also identified. By managing the predicted corrective actions (also referred to as root causes) the performance of this field can be optimized and the probability that this field will grow the crop with the desired outcome attribute metrics is increased. By predicting and identifying the limiting issues and the corrective actions before they occur, they can be managed and mitigated or eliminated altogether. This proactive, predictive approach is much more effective and results in a higher rate-of-return (ROI) than the typical approach of reacting post-season after the issue has already occurred.

Figure 15H:
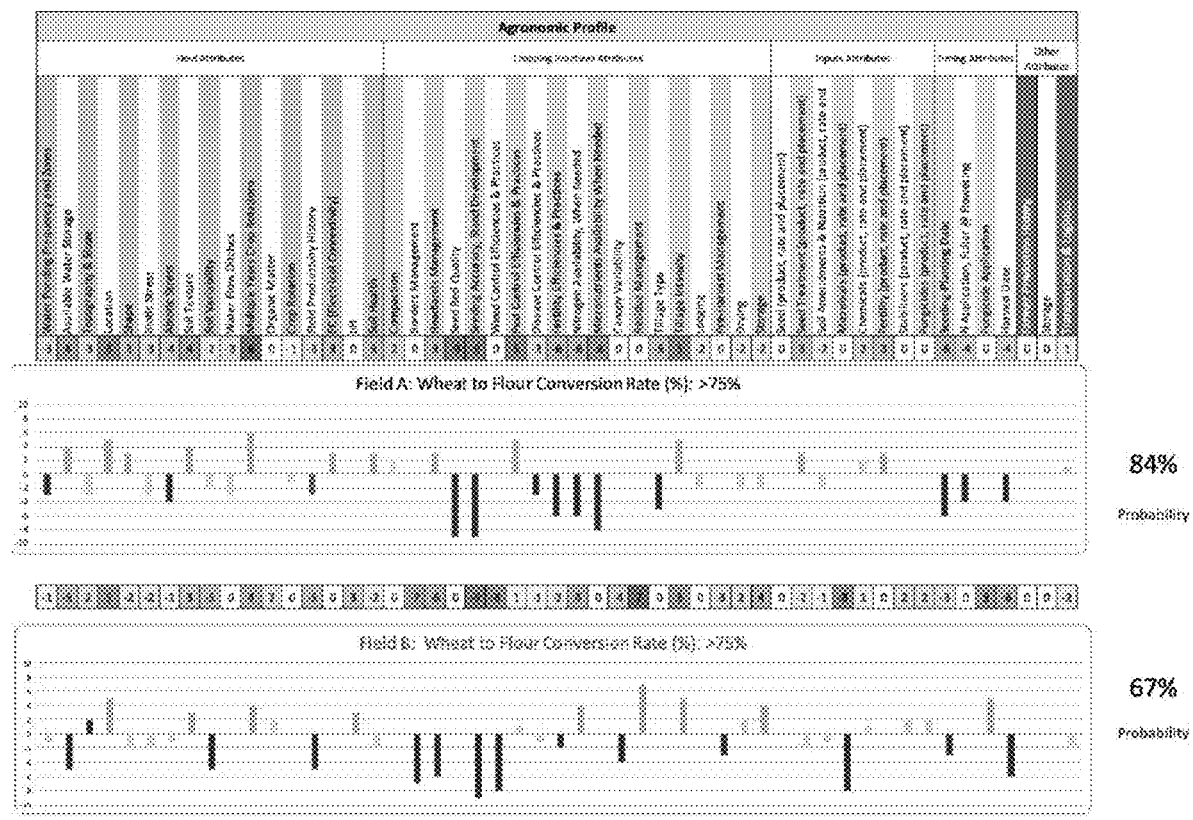

Another expression of the model where it has been applied to the growing condition metrics for two fields is shown in FIG. 15H. In this example shown in FIG. 15H, one desired outcome attribute metric, wheat to flour conversion rate is shown for two fields. The model has identified the probability each field will grow the crops to the desired outcome metric. The impact that the growing condition metrics have on the wheat to flour conversion rate is shown as a number between −10 for the maximum negative impact, +10 as the maximum positive impact, and 0 having no impact.

Figure 15I:
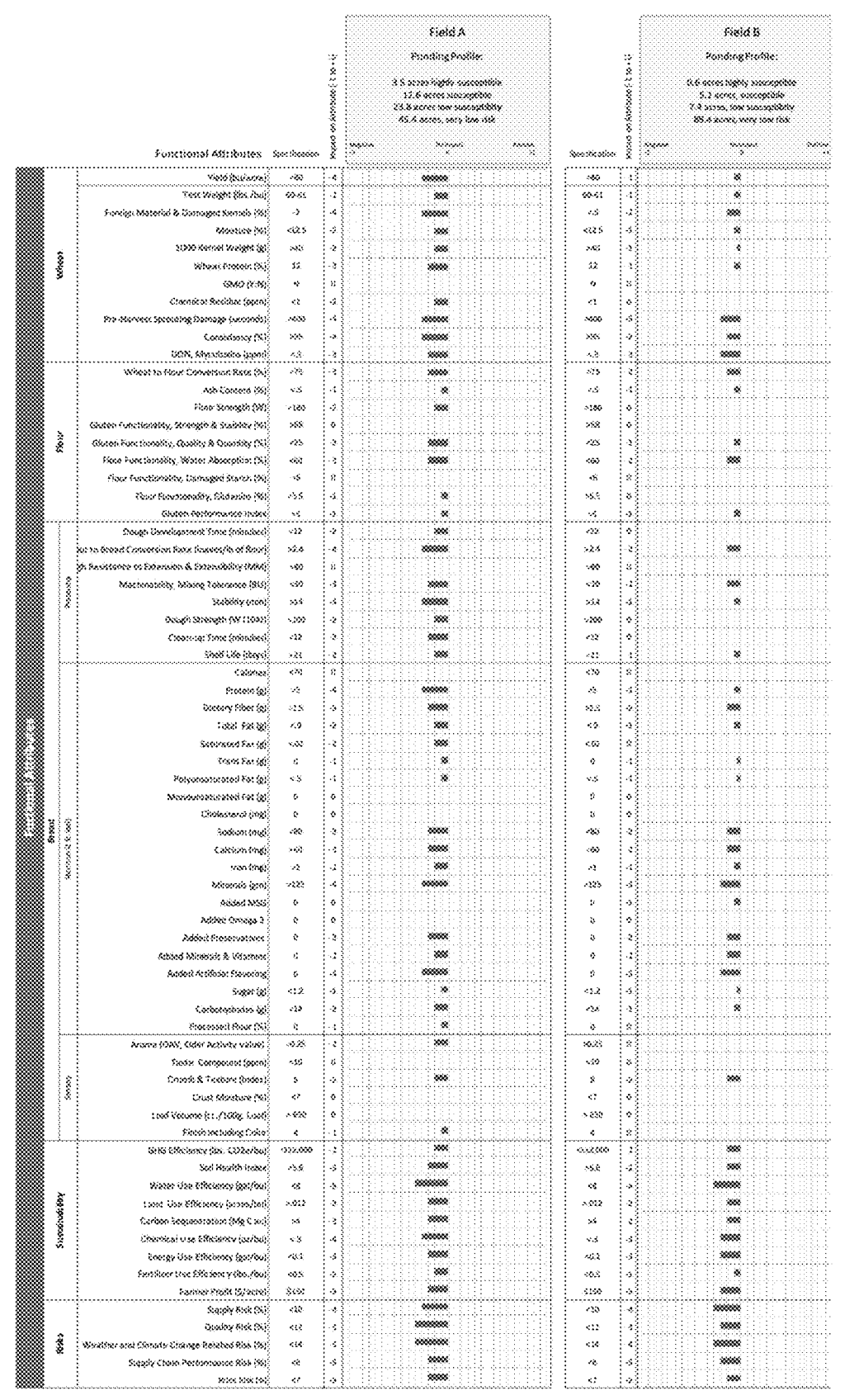

Another expression of the model in shown in FIG. 15I. In this example shown in FIG. 15I, one growing condition metrics, ponding profile, for two fields is compared. The growing condition metrics for ponding profile for two fields is displayed at the top of each heading. The impact that the ponding profile has on each of the outcome attributes is shown as a number between −1 for the maximum negative impact, +1 as the maximum positive impact, and 0 having no impact. All of the outcome attributes are negative or no impact in this scenario. In this use case all of the impacts have been weighted based on relevance.

Figure 15J:
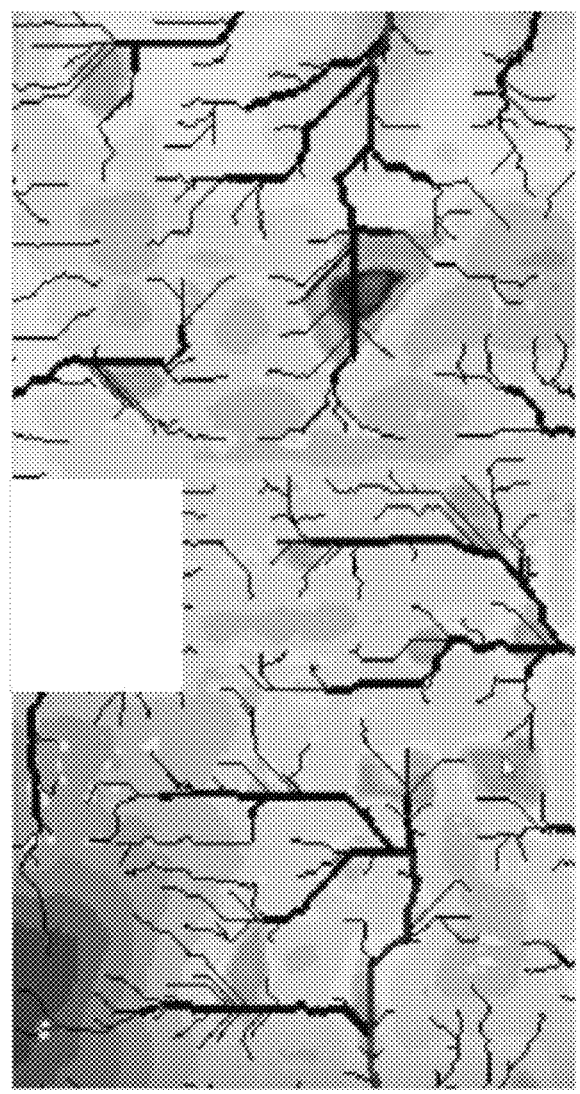
Figure 15K:
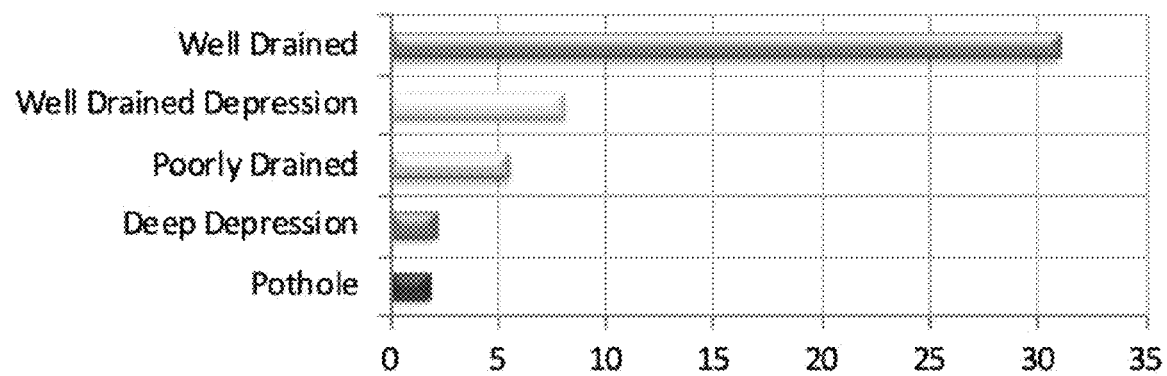

FIGS. 15J and 15K show examples of root causes and predicted corrective actions. The typography of the field shown in FIG. 15J is such that it has zones that are prone to ponding. Ponding profile is a growing condition. Areas prone to ponding may include zones in the field where plants are either killed by excess water (drowned) or are damaged to various degrees depending on rain events. Damaged plants often result in reduced yield and impact many desired outcomes attribute metrics, including fiber. In this example shown in FIG. 15K, lidar data was processed to determine ponding areas, as illustrated in the following map and chart.

The model then identifies the management actions, also referred to as action plans, that can be taken to lessen the impact of ponding on the outcomes attributes. Ponding is becoming a more severe problem due climate change, increased frequency of large rains, the importance of water use and quality, the importance of soil health. Possible corrective actions for the farmer: Modify tillage type, depth, and intensity; Improve drainage; Add ditching; idle (plant no crops) areas with high probability of ponding; and other corrective actions suggested by the supply chain or agronomist. Possible corrective actions for the supply chain: accept the results understanding the risks (perhaps it will not rain at a level to cause ponding); coach farmer on best corrective actions to take; and/or contract with a field with a higher probability of growing a crop with the desired outcome attributes.

Compaction, caused by farming operations, is another growing condition metric in this field, reducing probability of growing a crop with fiber, the desired outcome attribute. Compaction is another growing condition metric. Compaction results in crop stress, planning depth issues, and therefore emergence issues, reduced yields, and impacting several outcome attributes. Compaction may be determined via image analysis or by sensors on a planter. Possible corrective actions for the farmer: adopt a "common path" strategy (drive on the same locations each pass across the field); modify tillage type, depth, and intensity; modify headland management and create common parking areas; improve planting technology; and other corrective actions suggested by the supply chain or agronomist. Possible corrective actions for the supply chain: accept the results understanding the risks; coach farmer on best corrective actions to take; and/or contract with a field with a higher probability of growing a crop with the desired outcome attributes.

Soil texture is another growing condition metric that has a negative impact on fiber, the outcome attribute used as this example. A field with several soil types, rather than one or two dominate soil type, reduces the probability of growing a crop with the desired fiber metrics. Soil texture data is available from a number of public sources and private sources. Possible corrective actions for the farmer: modify tillage type and intensity; and other corrective actions suggested by the supply chain or agronomist. Possible corrective actions for the supply chain: Accept the results understanding the risks; coach farmer on best corrective actions to take; and/or contract with a field with a higher probability of growing a crop with the desired attributes.

Tillage intensity is another growing condition metric that the model has identified as a root cause impacting the ability for this field to grow a crop with the desired fiber metric. Tillage intensity can be determined via analysis of ground cover or tillage-mounted iOT sensors that provide the required data. Possible corrective actions for the farmer: modify tillage type for example minimum tillage; modify tillage speed; modify conditions where tillage occurs, for example soil moisture; and other corrective actions suggested by the supply chain or agronomist. Possible corrective actions for the supply chain: accept the results understanding the risks; coach the farmer on best corrective actions to take; and/or contract with a field with a higher probability of growing a crop with the desired outcome attributes.

In another workflow group shown in FIG. 14B, the findings including for example, field selection, probabilities, and root causes from the application of the model are executed upon. In this workflow group the findings are executed by the supply chain. During this step in the workflow the fields identified with the highest probability of growing a crop with the desired outcome attributes are integrated in the sourcing and contracting process of the supply chain.

Sourcing and contracting is described as the process where the supply chain contracts with the farmer or another supply chain party, to grow the crop as per the growing condition metrics. There are numerous supply chain solutions and other solutions relative to contracting and contract management. The contribution of the present invention is to identify the fields, practices, inputs, timing, and storage to optimize the probability of growing a crop with the desired outcome attribute metrics and provide growing condition metrics that can be included in the contract.

During this step in the workflow the growing condition metrics and predictive corrective action(s) are provided to the farmer and/or farmer's advisor such as agronomist where they can be integrated into the farmer's cropping plan. In some implementations the growing condition metrics may be integrated into a farmer's precision agriculture platforms and equipment for execution.

In another workflow group shown in FIG. 14B, the crops are grown on the fields selected, using the growing condition metrics defined including, for example, practices, inputs, timing, storage, and transportation as defined by the Model and contracted with the farmers by the supply chain. Dashboards alerts and reports are used to monitor conditions and make adjustments as required and conditions change. Dashboards may be as granular as a portion of the field or as all-encompassing as the field, farm, farmer, entire cop, outcome attribute, area-of-interest, and supply chain division, subsidiary, or enterprise level.

During this step in the workflow the crops are monitored in-season via iOT sensors, on site agronomists, and in some cases through the use of plant samples with the objective of sensing in-season issues that need to be addressed. For example, weed, pests, diseases, fertility, and stressors.

During these steps in the workflow the crop status is communicated to the farmer and supply chain via alerts and dashboards. Alerts are used when immediate action is needed. Dashboards are used for a variety of management decision-making including benchmarking, trends, and analysis. Access to data is role-based with access to specific information for the farmer, agronomist, or other consultant approved by the farmer, as well as various roles at the supply chain such as agronomist, territory or regional managers, supply chain managers, product manager and leaderships.

Figure 15L:
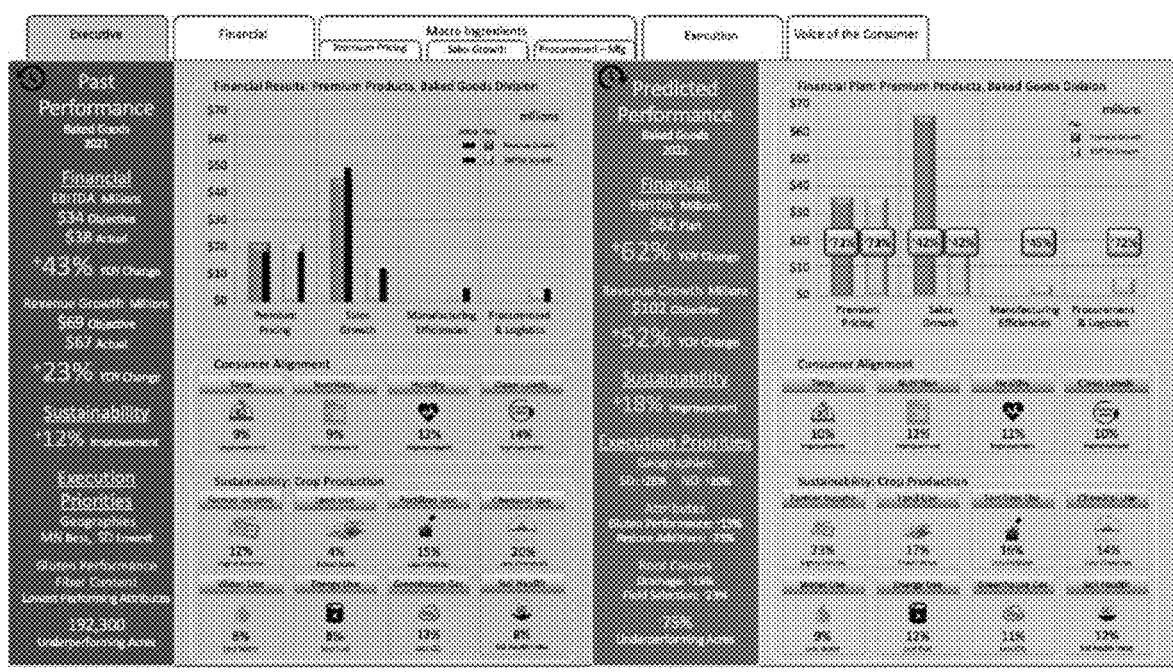

FIG. 15L shows a chart, which is one example of a supply chain's leadership dashboard. Note the past year is compared to the present year. Also included are sustainability attributes, consumer alignment including taste and nutrition as well as the financial impact attributes. In addition, key KPIs are included in this implementation of a dashboard.

During the step in the workflow process shown in FIG. 14B, crops are monitored via sensors, tissue samples and sometimes physically by a person. This monitoring is performed to detect unexpected issues that may arise and can be managed in-season.

During this step in the workflow process shown in FIG. 14B, the crop is harvested. Samples of the harvested crop are analyzed to measure their actual attributes metrics relative to the desired attributes metrics. For some direct sourcing contracts, the supply chain may incentivize the farmer based on meeting the specified outcome attributes metrics. In some scenarios samples are captured so they can be used to further train the model. The process of training the model was defined previously in this document.

Figure 15M:
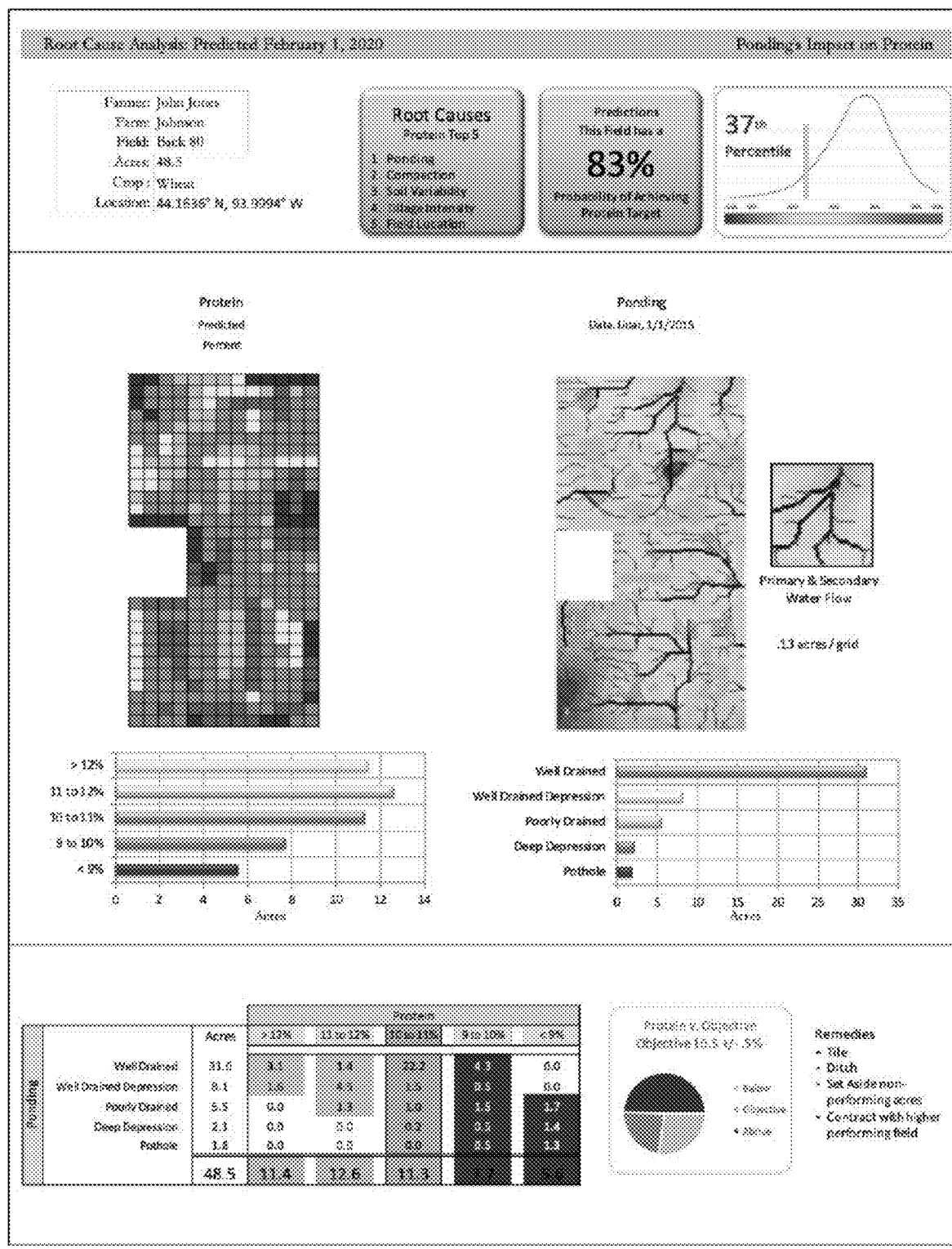

Other types of analyses are also available depending on the specific implementation of the present invention. The analysis shown in FIG. 15M relates to achieving the desired protein attribute metrics, the root causes that are preventing achieving the desired outcome metrics and the predicted corrective actions to improve outcome attributes. The scale included in this analysis is 0.13-acre grids, one field, one attribute, and one root cause.

Preserving the crop's identity as it is stored until needed and transportation to the processor or next step in the supply chain, as shown in FIG. 14B. During this workflow group the crop has been harvested and is stored until it is needed by the supply chain and then transported to a location identified by the supply chain.

During this segment of the workflow the identity of the crop is maintained. The crop has been grown to achieve specific attribute metrics and therefore cannot be co-mingled with other crops or handled in bulk as a commodity and still retain its attribute metrics. There are a variety of identity preservation methods and systems than can be deployed. A common approach is the use of temporary on-farm storage. For many farmers and supply chain the storage and transportation of the crops will be defined contractually with the final delivery location defined by the supply chain. The final destination is often a distribution point or processing plant such as a flour miller or process or food factory or ethanol plant.

The storage conditions for the harvested crop may impact the attribute metrics. Examples include temperature, humidity, time in storage. The model defines the growing condition metrics to best achieve and preserve the harvested crop outcomes attribute metrics.

Transportation, as shown in FIG. 14B, can be defined by the supply chain with the delivery point most often identified in the contract between the farmer and supply chain. These feedback loops provide results as input to further train the model and improve accuracy. These feedback loops provide data relative to the status of outcome attribute metrics and the execution of the growing conditions by the farmers. The feedback is provided via text messaging, email, dashboard, and other communication networks.

Access to the feedback is role dependent, for example a farmer may receive feedback for a field, a supply chains' field personnel for the fields where they have oversight responsible and supply chains' leaderships. This feedback loop provides growing condition metrics data to the primary growing condition metrics database where it can be used in the future. In addition, some implementations may make this data available to other systems where further analysis can occur. Examples of other systems include spread sheets, CRM, ERP, and supply chain management.

This feedback loop provides growing condition metrics data from external sources on an ongoing basis. For example, weather and satellite imagery.

With this feedback loop samples of the crop are captured post-harvest, and in some use cases samples captured pre- and post-harvest. The samples are submitted, along with their location to be tested and measured to determine their actual outcome attribute metrics. This data will then be used to further train the model and further improve the accuracy of the model.

With this feedback loop manufacturing data is provided to the model. This data may be captured via an existing manufacturing system with data made available to the model.

This feedback loop was described previously in this document. In summary, it includes capturing samples, testing, and measuring them to determine their outcomes attribute metrics, combining with growing condition metrics data to train the model.

With this feedback loop status relative to growing the crop and the condition of the crops.

Manufacturing efficiency is also shown in FIG. 14B. During this step in the workflow, metrics concerning manufacturing efficiencies are captured so they can be used to further train the model. Many of a crop's attribute metrics impact manufacturing efficiencies. For example a baker of bread where conversion rate, clean up time, stability, and dough development time are important to costs and quality. Depending on the specific implementation, existing manufacturing systems may be used to measure and capture these efficiencies. The role of the present invention is to use the data to improve the model and thereby improve manufacturing efficiencies.

Figure 17A:
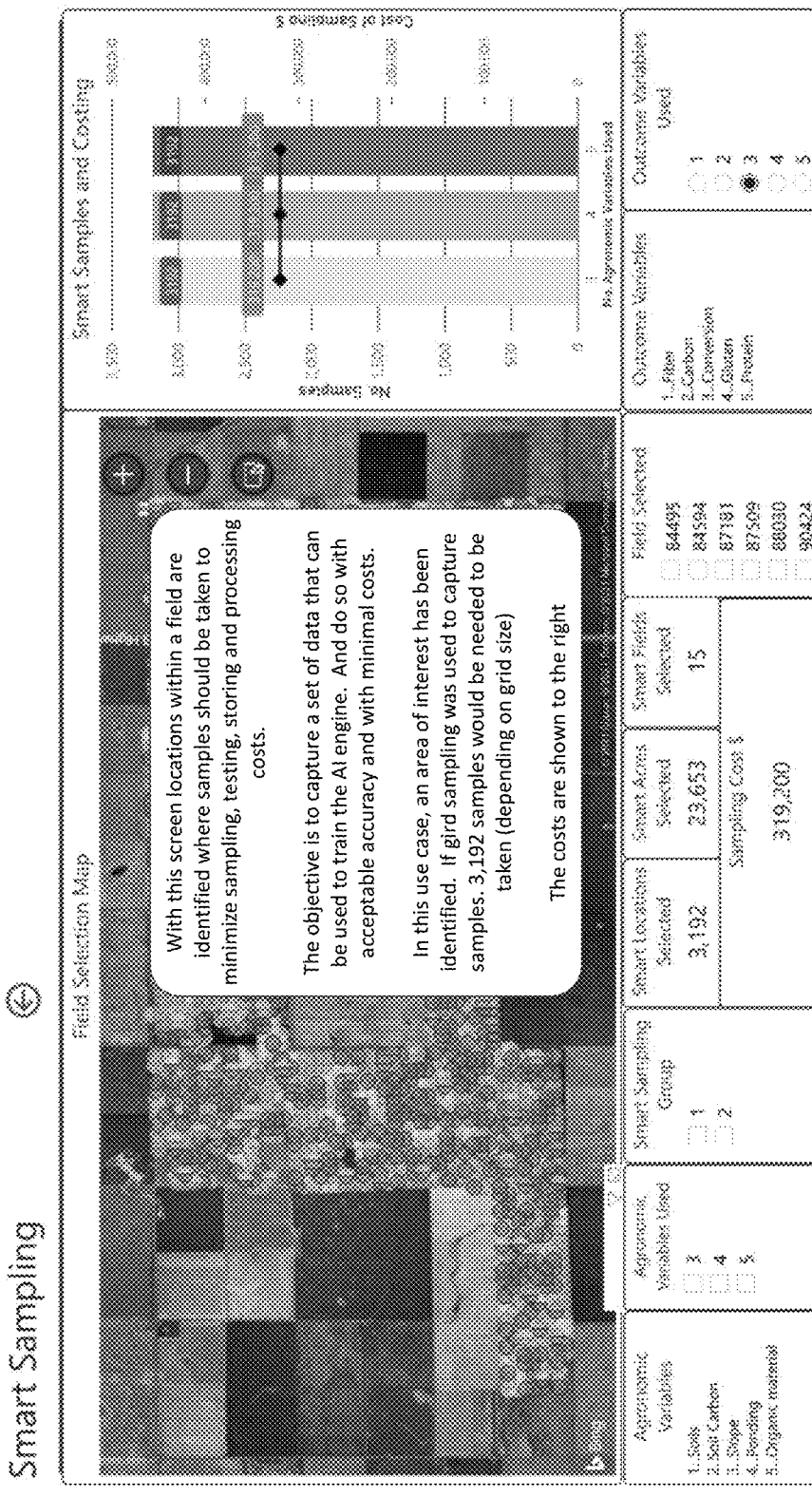
Figure 17B:
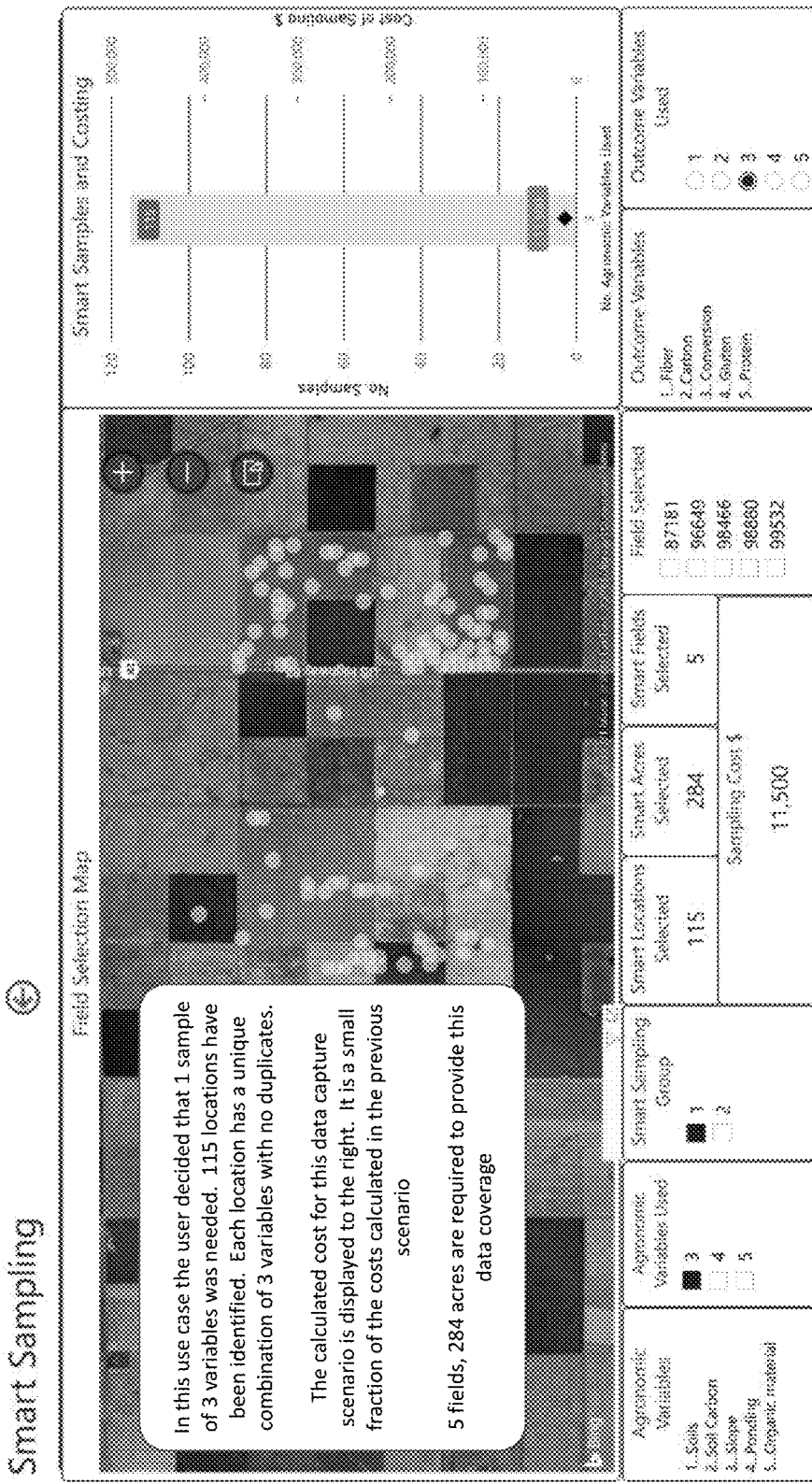
Figure 17C:
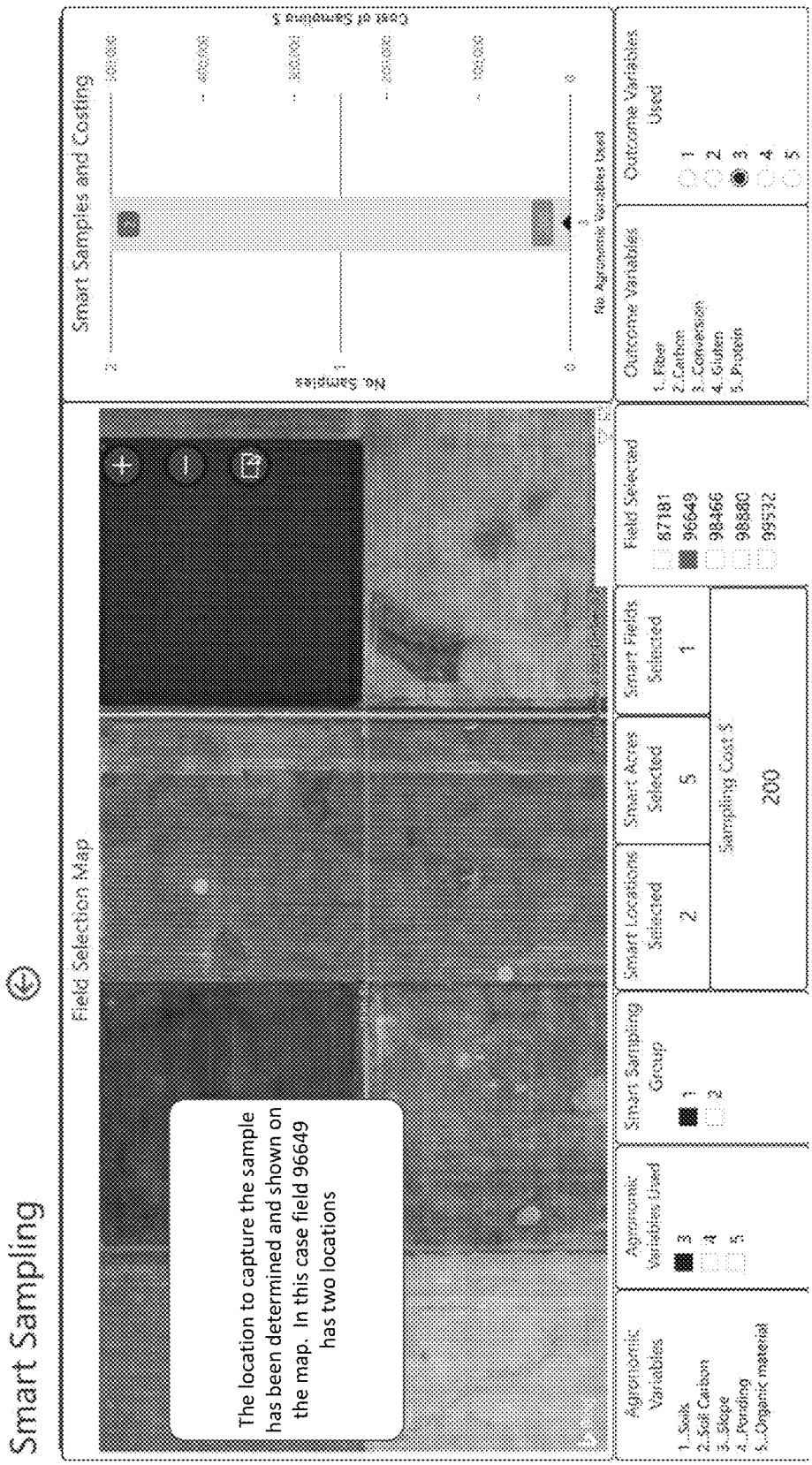
Figure 17D:
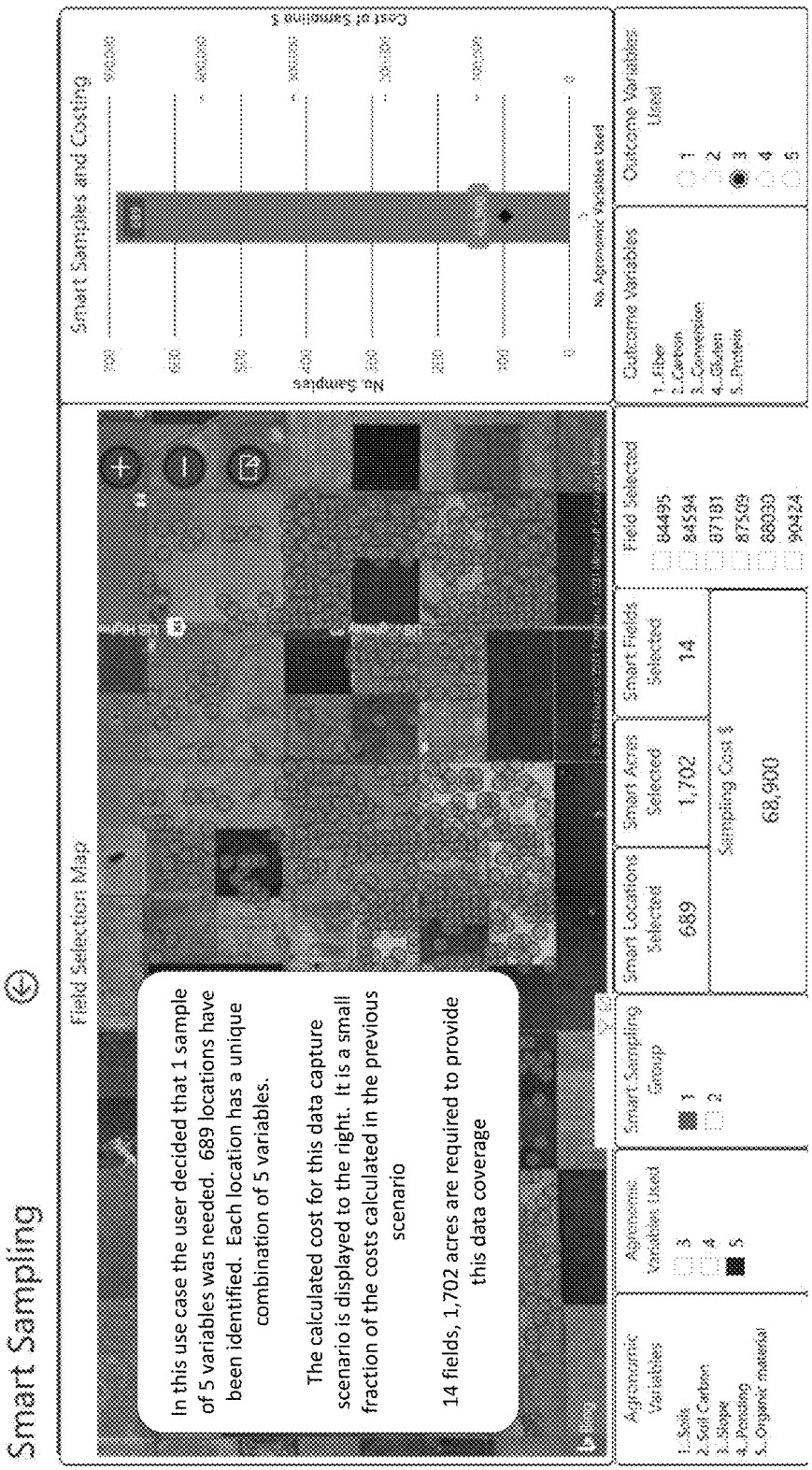
Figure 17E:
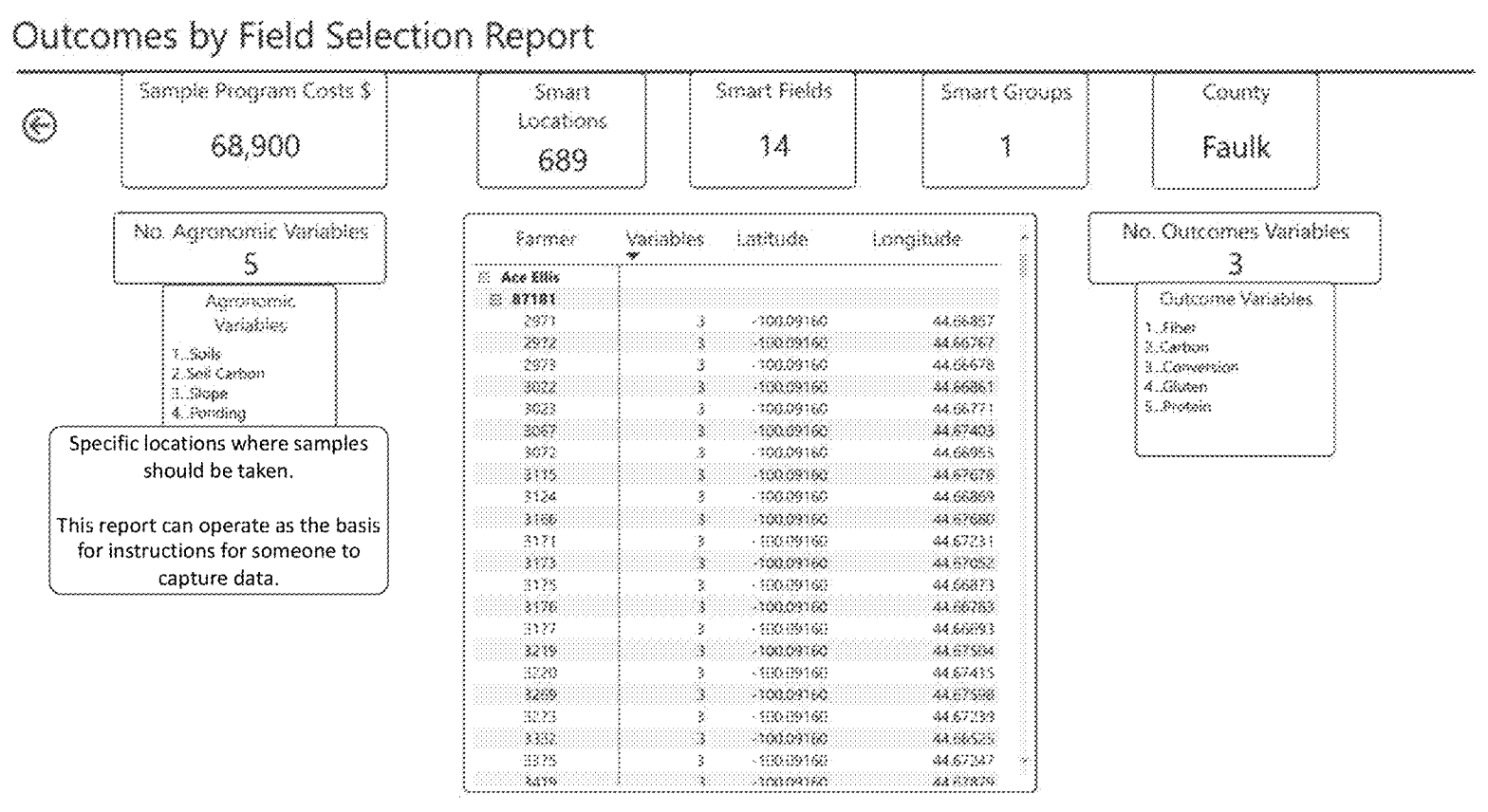

FIGS. 17A-E are examples of smart sampling of the present invention. In accordance with the preferred embodiment of the present invention, Smart sampling is a method to reduce sampling and testing costs by identifying the locations where optimal, non-redundant samples can be captured for data generation purposes. In one use case the samples are used to provide data to train an AI/ML model. FIGS. 17A, 17B, 17C and 17D show different views of this use case. FIG. 17E shows the outcomes by field selection report for this use case.

Much of the current data work is concerned with scaling up data mining algorithms (e.g. improving on existing data mining algorithms for larger datasets). This approach can be prohibitive due to computational time and memory constraints. An alternative approach, smart sampling is to scale down the data. Determining a smallest sufficient training set size that obtains the same accuracy as the entire available dataset.

It is important to capture samples from the optimal number of locations. Too many sampling locations will be costly to capture and test. Too few may result in less that acceptable accuracy. It is often stated, the more data the better, however large amounts of data collected from random locations may result in inconclusive analyses. In this case the costs are higher than needed and the results are less than desired. There are two key components when capturing data used to train the model. Capturing samples at the locations where maximum knowledge can be extracted at minimal costs. Smart Sampling is our name for this process.

Testing to determine the actual attribute metrics for each sample. These tests will produce the data required to train the model. Specific tests need to be performed for each attribute and at each location. For example, if the desired attributes are aroma, protein, fiber, and conversion rate then four separate tests, for each location, will need to be performed. In a few situations more than one attribute can be measured with one test.

The objective of smart sampling is to create the minimal dataset of known attribute metrics that can be used to train the model and achieve acceptable accuracy. The process is in two steps: selecting fields that will provide data that is most helpful; and selecting locations within the fields to collect data representative crop samples.

In some use cases the user may elect to create the initial model based on new and existing research, know how, tribal knowledge, experience, existing data, if any, and other models, if any and then train with data to improve accuracy over time.

In the use case where the farmer has an existing relationship with the supply chain additional data may be available to supplement commercially available data. Farmers where there is no previous relationship and therefore the farmer may question the motives and security of the supply chain and is therefore reluctant to share data with them. In this scenario an effort will be required to solicit cooperation from the farmer.

One of the objectives is to identify, select, and contract with the fields that have the highest probably of growing a crop with the desired attributes. In this use case it is possible to analyze all fields in an area of interest and not limit field selection to fields where there is an existing relationship with the farmer. To accomplish this analysis and not spend the time and costs to engage with the farmers, existing publicly and commercially available field data can be used. This data does not require the farmers' cooperation or assistance. Depending on country and region a large amount of field data is available from public and/or commercial sources. Sources include: free, public data (Departments of agriculture at both the local, regional and national level; NASS, FAO, UN Food and Agriculture Organization, USGS, NOAA, NASA. Commercial Suppliers with data available for a broad area for a fee, for example, weather providers; satellite imagery providers; aviation imagery providers).

Some data processing and analysis may be required to extract additional information from the data. For example, satellite data analysis to quantify a field's susceptibility to stress including the number of high stress days, the number field acres impacted and the frequency. Consistent susceptibility to stress is an indicator of future stress which will impact attribute metrics. Crop rotation data to determine the most crop grown on a field the past year or for a number of years. For example, potatoes following corn is high risk. Field border data to determine the acres per linear feet of border. Border acres often underperform the rest of the field therefore limiting borders reduces the potential impact of borders on the attributes metric. Weather data to determine, for example, number of days above 90 degrees each year, number of high temperature days in total and in series, last frost, first frost, and any changes over time; gaps in rain events of greater than Y inches over X days, soils data to determine variability of soils, greater variability in soils often leads to greater variability in attribute metrics, primary soil texture, percentage of the acres, lidar data analysis to determine, potential water collection areas, and slope.

In accordance with the preferred embodiment of the present invention, after selecting the fields where the sampling will occur, the locations within a field are selected. The objective is the same as when selecting the fields, minimizing sampling costs and determining a smallest sufficient training set size that obtains the same accuracy as the entire available dataset.

In an example use case samples will be during harvest when a trained sampler will visit each pre-selected field and obtain samples from each location that has been identified, quantities of harvested or in some cases pre-harvest crop will be captured and placed in a sample box that has been pre labeled for the purpose. This process will be repeated until samples for all locations have been completed for each field. The captured samples will be identified with relevant information and shipped to the laboratory.

Specific tests are performed on each sample and for each attribute to determine their metric. Some of the testing may be performed using handheld or portable devices. For example, if the desired attributes are aroma, protein, fiber, and conversion rate then four tests will need to be performed. In some scenarios, more than one attribute can be measured with one test.

Examples of commercially available laboratory equipment and their use to measure specific attributes of wheat is described. The Single Kernel Characterization System Test evaluates wheat kernel texture characteristics by measuring the weight, electrical current, and force needed to crush the kernels. Kernel characteristics are related to important milling properties, such as conditioning (tempering), roll gap settings, and flour starch damage content. Wheat samples are milled to evaluate wheat milling properties, including flour extraction and the amount of non-flour components produced, such as bran and shorts. Buhler Laboratory Flour Mill results are expressed as the weight of flour, bran, and shorts. Often, flour extraction is reported as a percentage of flour compared to the total output of other mill products. Flour is produced for other tests. The farinograph determines dough and gluten properties of a flour sample by measuring the resistance of a dough against the mixing action of paddles (blades). Farinograph results include absorption, arrival time, stability time, peak time, departure time, and mixing tolerance index. The Extensigraph determines the resistance and extensibility of a dough by measuring the force required to stretch the dough with a hook until it breaks. Results include resistance to extension, extensibility, and area under the curve. Resistance to extension is a measure of dough strength. A higher resistance to extension requires more force to stretch the dough. Extensibility indicates the amount of elasticity in the dough and its ability to stretch without breaking.

Measuring volatile fractions of odorants can be used to determine global flavor. Global flavor is a combination of olfactory (aroma) and gustatory (taste) sensations produced by compounds. This kind of determination can be carried out by analytical techniques for example gas chromatography (GC) combined with mass spectrometry and/or olfactometric GC. Methods complementary to GC analysis are available, allowing assessment of the olfactory impact by an electronic nose (e-nose) or a panel of selected individuals.

Figure 16A:
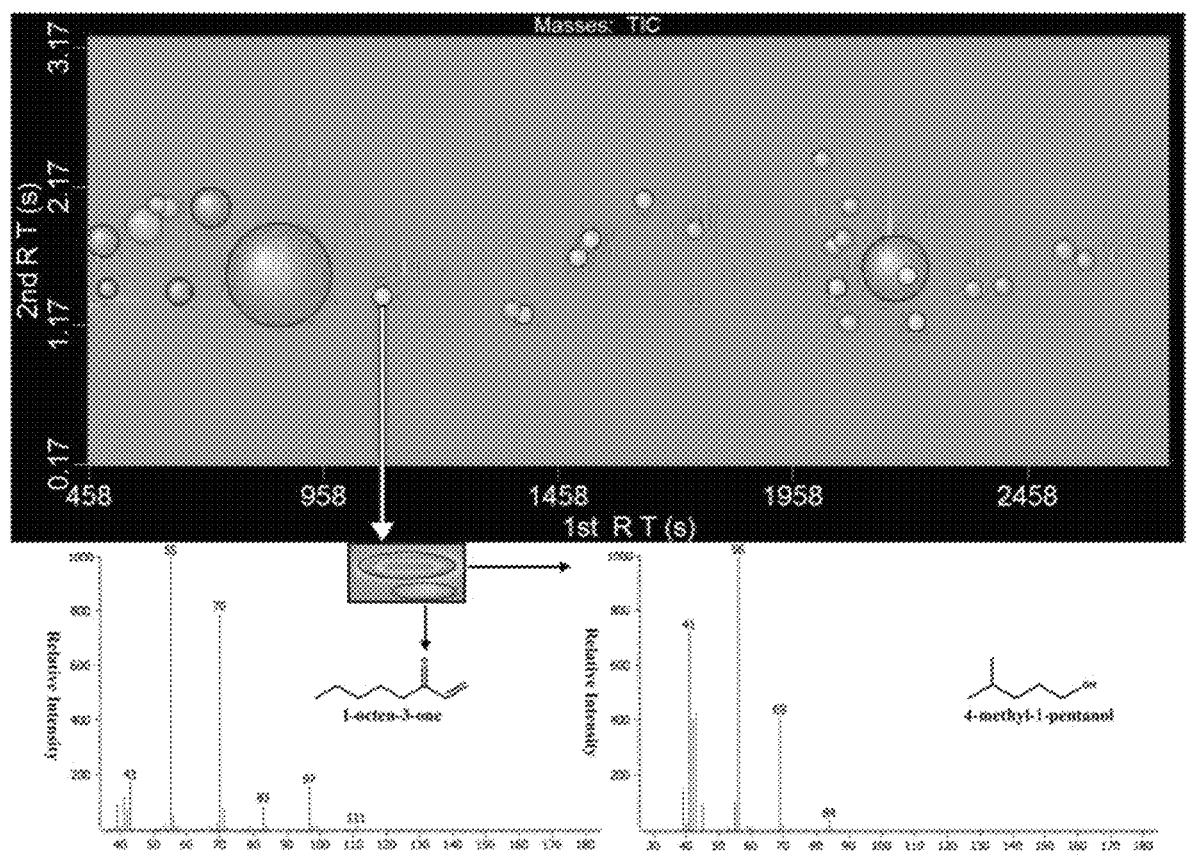
Figure 16B:
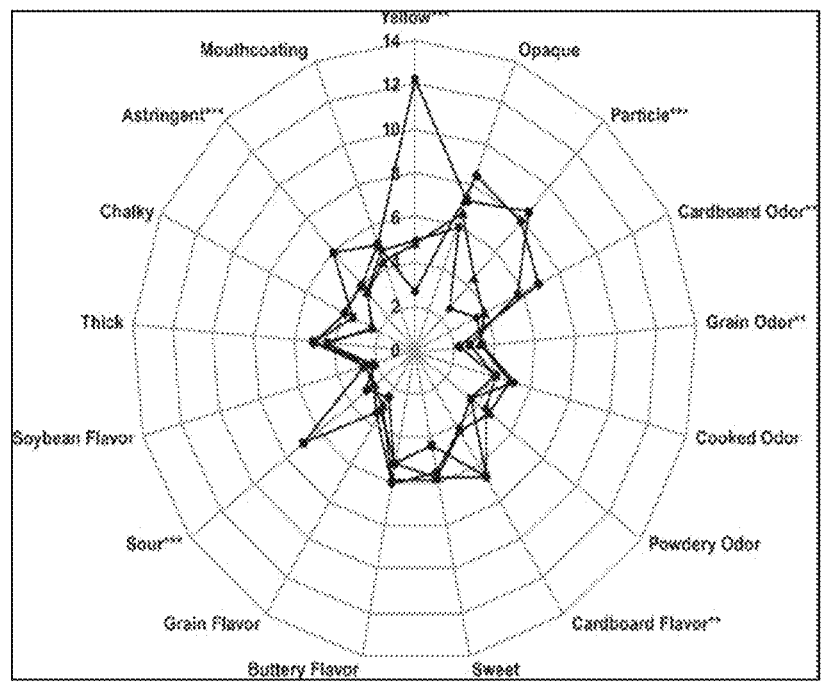

FIG. 16A shows an example of the quantitative compounds in a wine sample displayed using a two-dimensional gas chromatography and time-of-flight mass spectrometry (GC×GC-TOF-MS) contour plot. The size of the bubble represented the relative intensity of the compound's quantitative ion response, and the minimum size of the bubble was set for clarity. The quantitative compounds were marked by bubbles and the bubbles with various colors represented different concentration ranges. Red bubbles: greater than 1000 µg/L, purple bubbles: between 10 and 1000 µg/L, yellow bubbles: less than 10 µg/L. FIG. 16B is a spider diagram showing examples of aroma and taste measures for buttermilk through visualization.

For a food company a new product launch is a key event and is a prime opportunity to implement the invention described herein. Designing a new product can be done several ways using a variety of tools. Using the development of a new product as an example, a product or brand manager will have completed market research and identified the objectives including: target market, perhaps millennial-aged women, label content, price, marketing, budget, ingredients, for example, raw materials, manufacturing, and packaging, other decisions required to design and launch a new product. FIG. 16C shows the nutritional objectives based on what was identified in the market research in a food label format. FIG. 16D shows the desirability of specific ingredients. The new product will require a list of ingredients and just as importantly a list of ingredients the new consumer does not want in the food. For example, removing preservatives, chemicals, sugar, and processed ingredients. Many of these ingredients have been added to compensate for raw material shortcomings. Other relate to shelf life, taste, and manufacturing efficiency, again often to compensate for raw material shortcomings.

Figure 16F:
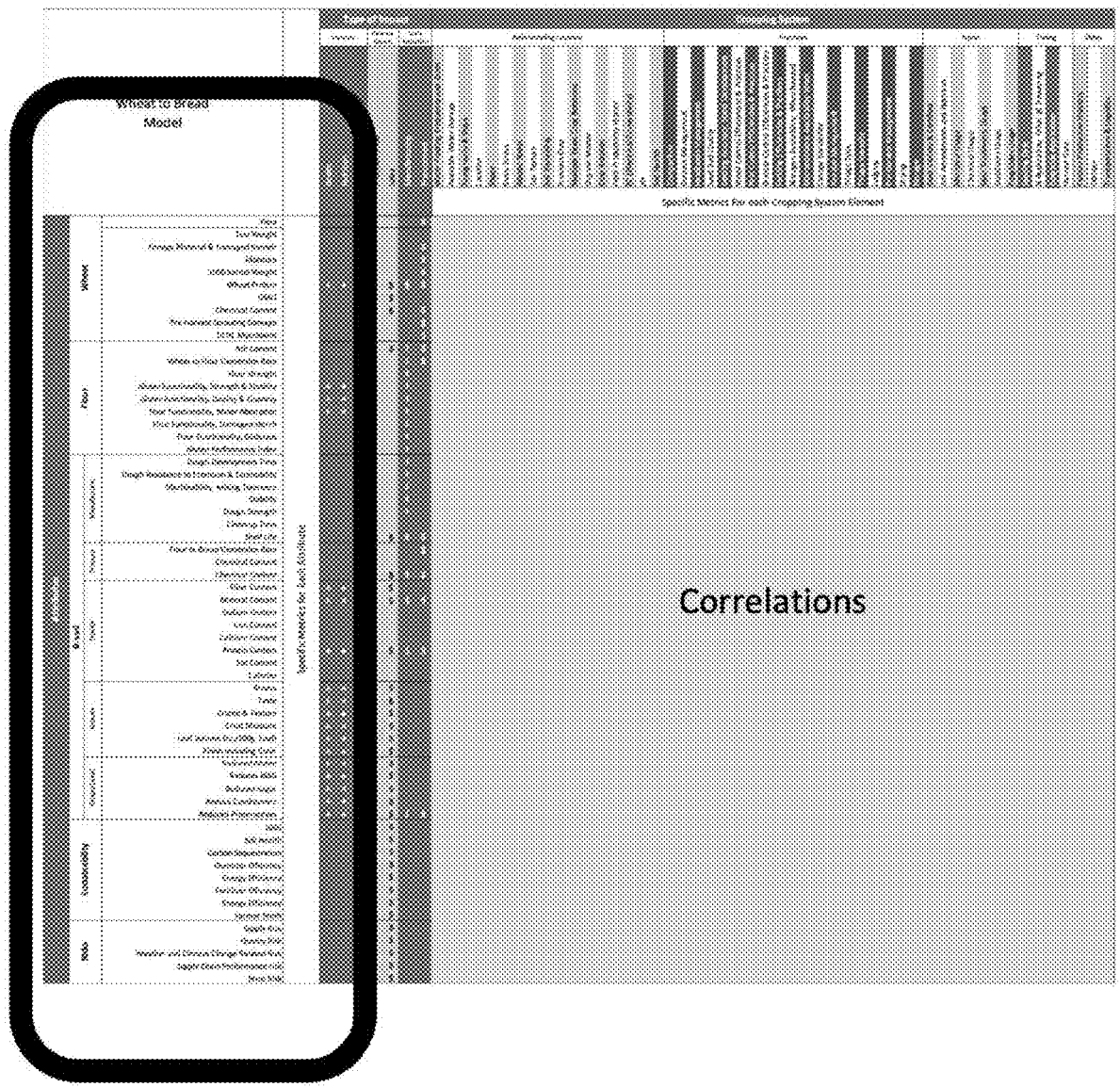

FIG. 16E shows the next group of design elements related to: sustainability objectives; health and wellness metrics; sensory metrics; manufacturing efficiencies; supply chain including procurement, supply, and risks. All of these design elements become the desired attributes in the model. A thumbnail version is included as FIG. 16F for reference. The attributes defined by the product manager are identified.

Figure 18A:
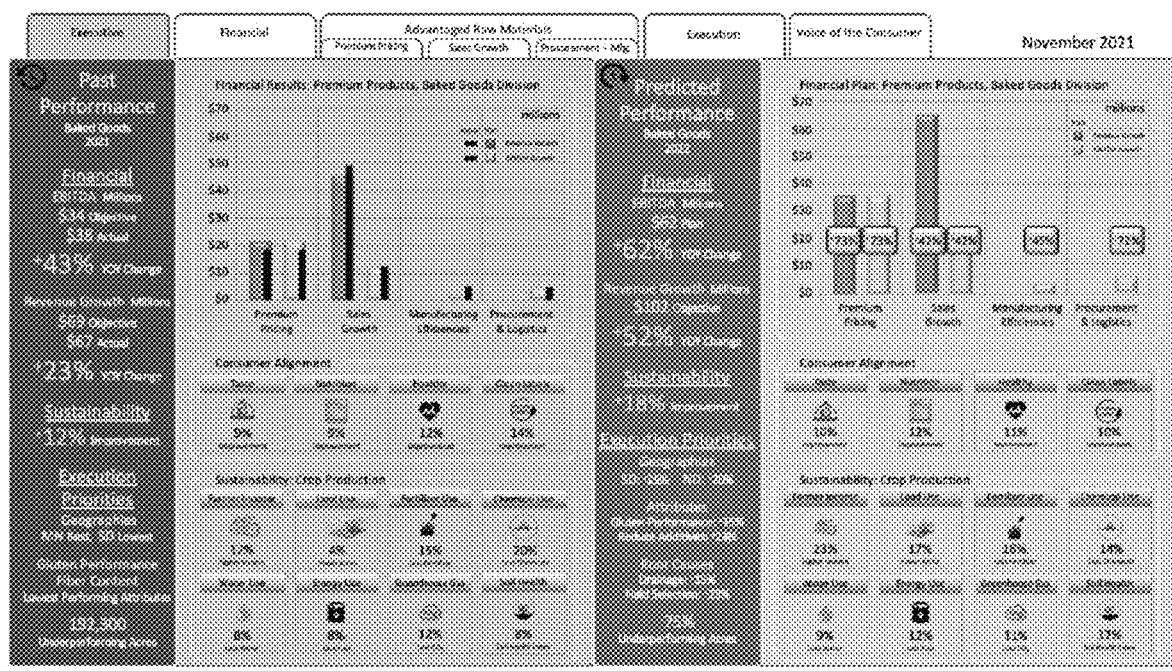
FIGS. 18A-C are examples of the computer dashboard user interface of the present invention.
Figure 18B:
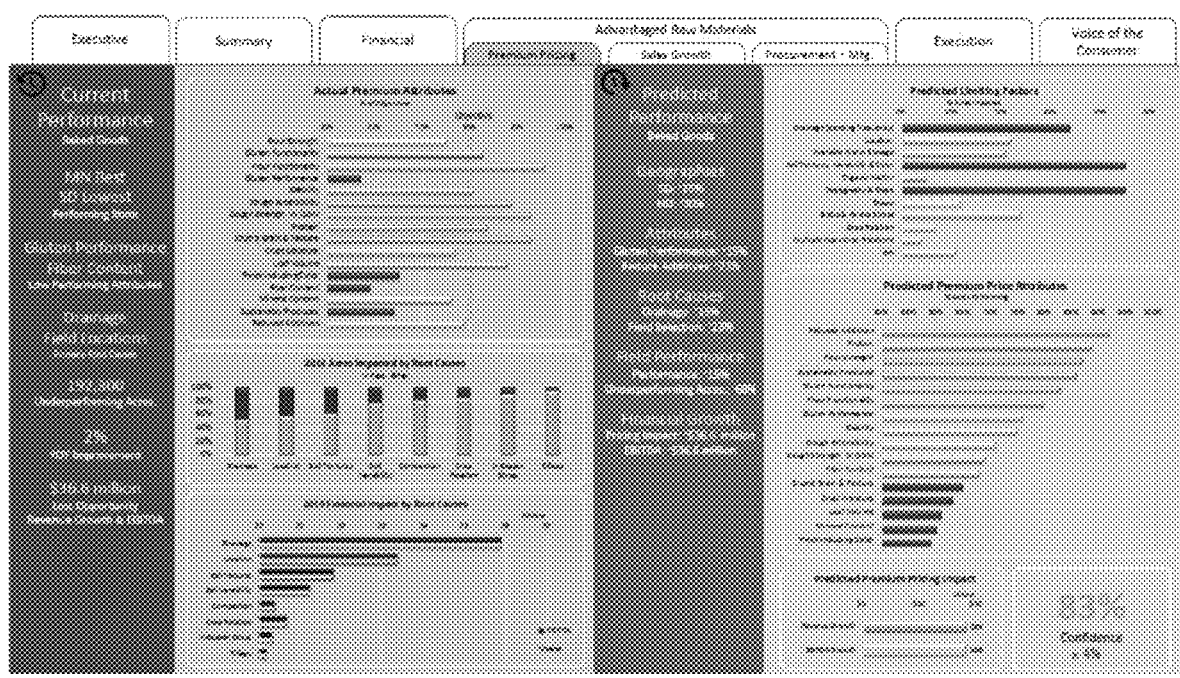
Figure 18C:
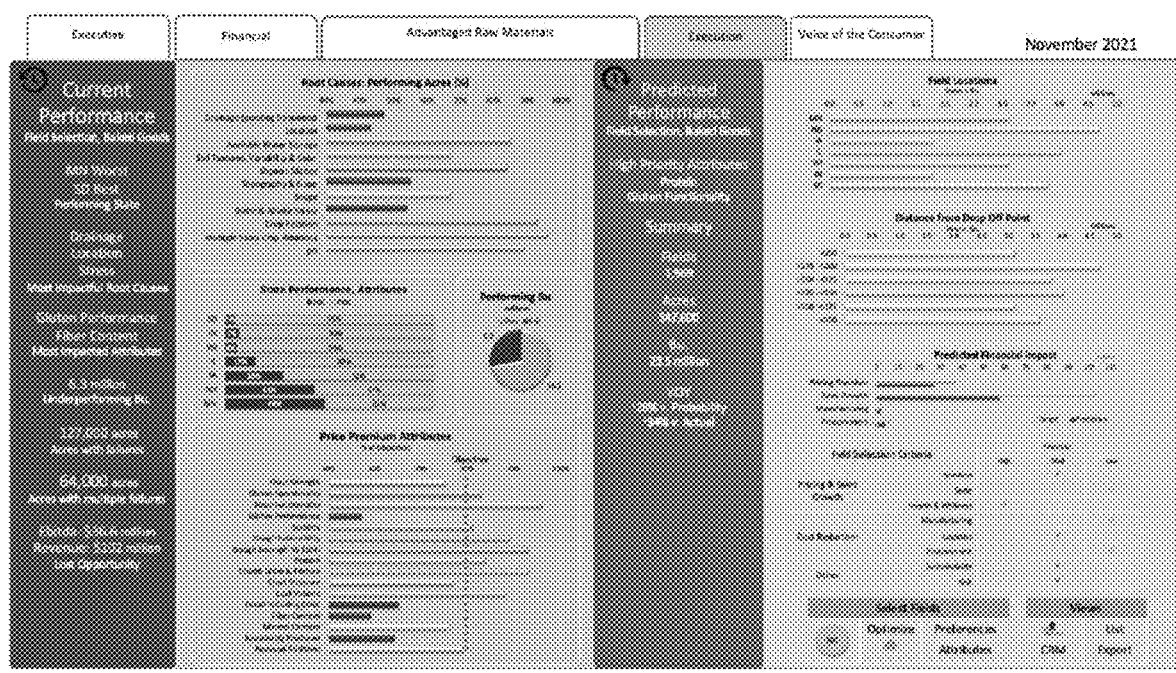

FIGS. 18A-C are examples of the computer dashboard user interface of the present invention. In accordance with the preferred embodiment of the present invention, there are multiple dashboards in the market, however the following dashboard examples demonstrate data visualization of the present invention. FIGS. 18A-C illustrate the type of data and analysis available and should help the reader of this document understand the scope of the envisioned invention. Dashboards provide data visualizations of the end-to-end process, tailored to the objectives in support of improving precision plant growth with specified attributes, as shown in FIG. 18A. FIG. 18B and FIG. 18C show alternate examples of dashboard views.

The present invention requires data and is only as accurate as the data available. The following are a few examples of the data including sources and accuracy. This is only an example and not a complete list of data.

The first data example is Lidar. For background, excess water including water collection areas or ponding is often the number 1 field characteristic that reduces quality. It overwhelms seed varieties, soils, tillage, fertility, and all other conditions, practices, and inputs. Ponding is not an issue each year but frequently is. It can be caused by a wet year or a big rain event. Excess water is growing as an issue due to climate change. While identifying extreme ponding and drowned-out areas can be visually obvious; fringe areas are not easily identified, damage quality, and cannot be analyzed to identify fields. The fringe areas produce a crop with poor quality, except for dry years. There are often many areas in a field that are depressions but do not kill the crop but damage it especially during a wet period of time. Excess water management is a key component of water sustainability. For sources, Lidar data is readily available for many of the crop growing regions. Data is available for all fields (not only contracted farmers-fields) and without farmer assistance. Drones and airplanes can also capture lidar data, but it is expensive and is best used for small areas. Topography or elevation data is readily available, but the quality is variable. Derived Data Maps identifying vulnerability and location of crop damage due to excess water. The accuracy of lidar data depends on the source, however lidar data is highly accurate, often sub-inch. Lidar data does not change year-over-year. It can be used and re-used year-after-year.

Another data example is soil texture. Soil textures and texture variability have a major impact on the ability of a farm field to consistently grow advantaged macro ingredients with specific attributes. A good example of the importance of soils is growing grapes with specific attributes for specific types of wines. The two most important factors of a soil, for the purpose of growing grapes and making wine, are its structure and texture. Soil data is readily available for most agriculture regions. In addition to soil texture data, soil data includes organic matter and water holding capacity. Data is available for all fields (not only contracted farmers-fields) without farmer assistance. The accuracy varies from state to state and county to county and is dependent on when the most recent survey was completed. Identification of soils textures are generally accurate. Accuracy of boundaries between textures is variable.

Another data example is location data. The location of a field has a big impact on attributes metrics. Location is measured as latitude and longitude (lat. long.). Location impacts a crops attributes due to: planting and harvest dates; temperature extremes; rain extremes; and GDD (Growing Degree Days). Impact of certain characteristics can be reduced via certain types of soils, drainage, and other field characteristics. Distance from drop off points is another key factor. Distances further from drop-up locations drives up transportation costs. Lat and long is readily available. Data is available for all fields (not only contracted farmers-fields) and without farmer assistance. Accuracy and resolution is good but does vary from supplier to supplier.

Another data example is clustering data. Locating a high percent of the fields within a specific area increases the risk that events impact a high percent of the supply. Crop insurance companies and other risk management companies have long applied risk mitigation techniques to limit the risk of a catastrophic impact.

Another data example is NDVI and imagery Data. Examples of vegetation indexes can include: NDVI (normalized difference vegetation index); Tasseled Cap Index; Perpendicular Vegetation Index; IPVI; Soil Adjusted Vegetation Index (SAVI); TSAVI; MSAVI; Atmospherically Resistant Vegetation Index (ARVI); Global Environmental Monitoring Index (GEMI); Soil Wetness Index; Other special indexes derived from imagery. Positive features are that the data can be downloaded from many providers. Data is available without any effort by the growers. Historical data is available for many years in the past. Data is available for all acres, globally. Data is often free although commercial providers are charging fees. New indexes to measure various types of crop heath are becoming available as the technology evolves. Companies are launching data services with advanced quality. Providers include companies such as Planet Labs, Boeing, Airbus, and many others. Negative features are that data is not available if cloudy. Satellite data for annual crops is only valuable during brief period of time, in-season. Data availability during critical times of the crop cycle can be poor or good; it is not consistent. Resolution varies from poor to good however good quality is available by paying a fee. Many public and commercial sources provide data with a wide variety of optical ranges and resolution. For field selection purposes NDVI is a simple graphical indicator that can be used to assess whether or not the target being observed contains live green vegetation. Data is available for all fields (not only contracted farmers-fields) and without farmer assistance. Accuracy and resolution vary from supplier to supplier.

Another data example is crop rotation data. Crop rotations have a big impact of several attributes including yield and quality. Crops that follow certain crops can be susceptible to disease, pests, fertility, soil heath, and erosion issues. The past three years rotation when selecting a field. Data is available for all fields from USDA NASS and other commercial sources and is available for all fields and without farmer assistance. Data is at field level resolution. When analyzing past crop rotations, the field may be been split or two fields merged and managed differently over time. If a field has been split or merged in the past three years that data can be troublesome, but the data is largely good for purpose.

Another data example is field shape and size data. The shape and size of a field impacts production practices and therefore attribute metrics. One objective when selecting a field is to identify fields with optimal shape and size. The ratio of acres to borders is one example characterizing a field's shape and size. The accuracy is considered to be good.

Another data example is border data. The edges of a field are prone to competition from weeds, diseases, and pests and generally lower yield and quality attributes. One objective when selecting a field is to identify fields with minimum ratio of boarders of acres to borders that characterize a field. The accuracy is considered to be good.

Another data example is headland data. The headlands of a field are prone to compaction from traffic and turning as well as over and under planting. The objective when selecting a field is to identify fields with minimum headlands.

Another example of data is slope data. Slope in a field leads to soil and water loss and other sustainability attribute issues. Slopes (side hills) are often low performing areas of a field and produce crops with low quality and other attribute issues. The degree of issues may depend on soils, percentage of slope and duration of the slope. The source is USDG, and the accuracy is considered to be good.

Figure 19:
FIG. 19 is a diagram of UN Sustainable Development Goals initiatives incorporated in the present invention.

FIG. 19 is a diagram of UN Sustainable Development Goals initiatives incorporated in the present invention as a reference. The present invention supports the UN Sustainable Development Goals initiatives and will help companies achieve their corporate SDG metrics and align them with their corporate environmental, social, and governance (ESG) factors.

FIGS. 20A-K are examples of scoring metrics and visualizations of the present invention. In accordance with the preferred embodiment of the present invention, scoring the ability to grow and process agriculture products into end products such as food, energy, and fiber, with the desired outcome attribute metrics. Scenario 1, given a set of growing condition metrics, such as practices, fields, soils, timing, and other inputs score the probabilities of growing a crop with the desired outcome attribute metrics. Scenario 2, vice versa, given a desired outcome attribute metrics, identify the growing conditions, practices, fields, soils, timing, that will result in the highest probability of achieving the desired outcome.

The technology and process described herein can be used in several additional not food related scenarios for example, configuring a product such as a truck to achieve certain outcomes such as fuel economy or comfort.

Figure 20A:
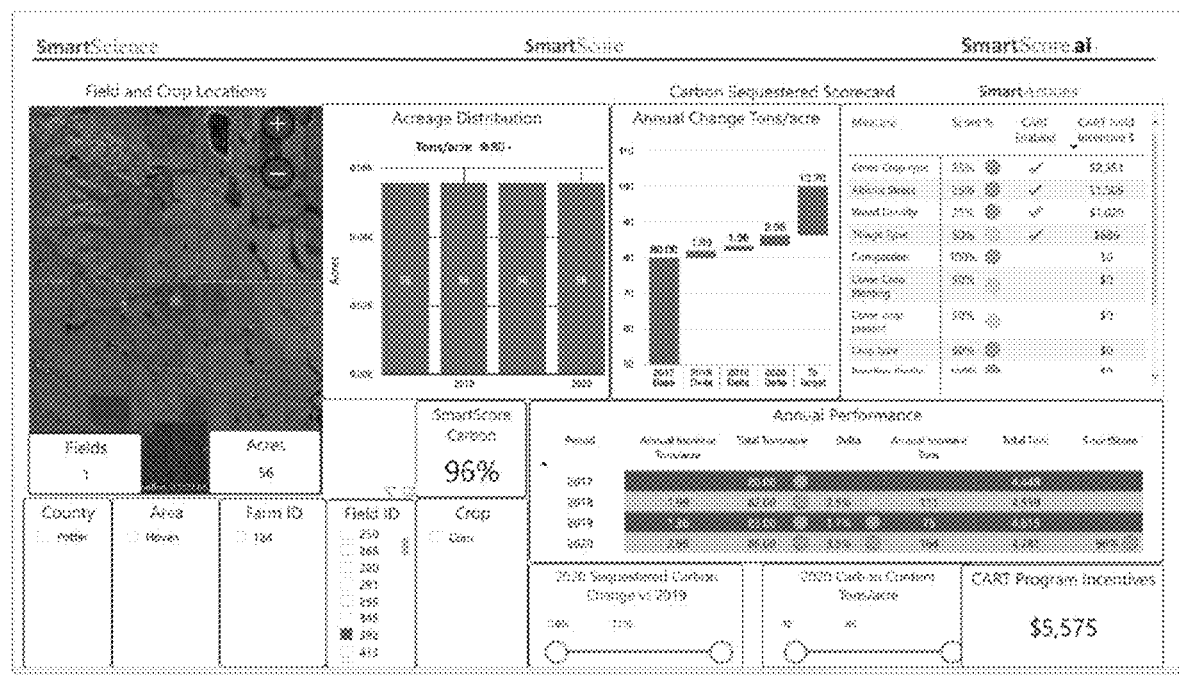
FIGS. 20A-K are examples of scoring metrics and reports of the present invention.

Scoring can take on many forms, for example: Quantifying a farmer's performance relative to growing a crop with a desired outcome attribute metrics such as carbon sequestration. Quantifying land use efficiency when growing corn for ethanol or other crop for an intended us. Quantifying processing efficiency when processing corn into ethanol plant processing raw. Predicting outcomes, such as predicting the ability that the growing conditions will grow a crop with desired outcome attributes. Quantifying outcomes, such as determining the amount of carbon sequestered in the soil using the growing conditions. Determining effectiveness of programs, such as quantifying program costs v. outcomes, for example the number of tons of carbon sequestered per $ of conservation program spent. Scoring can be used to: Benchmark performance to a peer or objective; determine progress of a farmer, and/or program over time; determine incentive compensation for conservation or other initiative or program; determine the effectiveness of programs and incentives; and quantify outcomes to prove results to consumers, investors and regulators. FIG. 20A shows an example of carbon scoring for one field has been integrated, such as wheat to bread, for example.

Figure 20B:
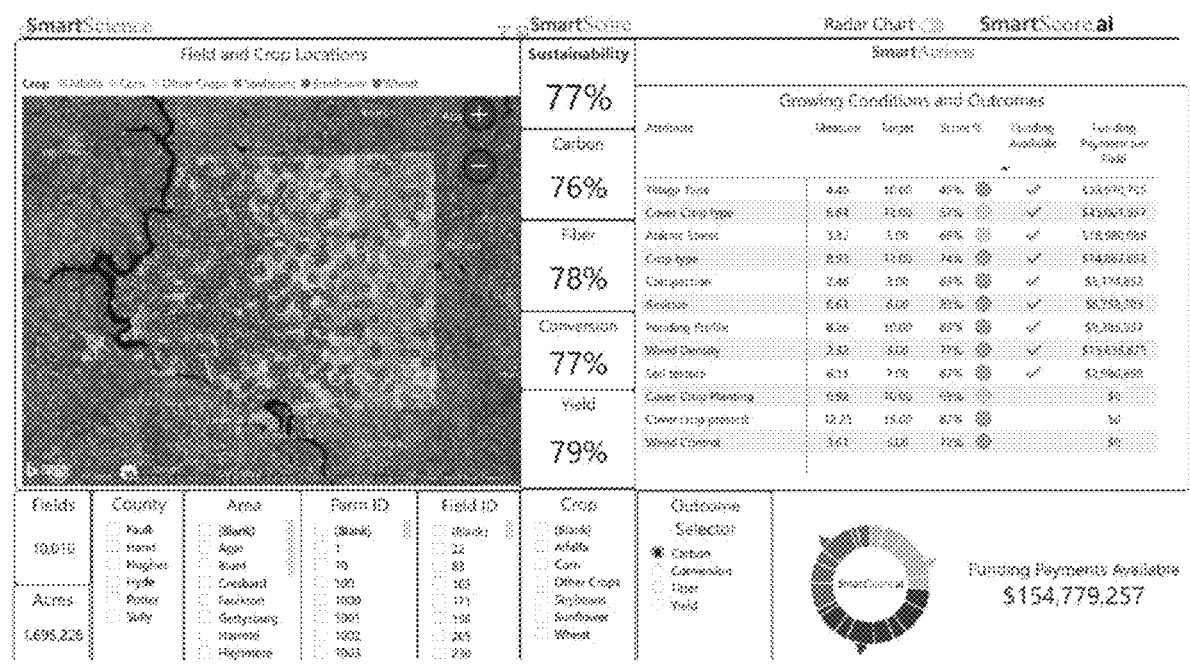
Figure 20C:
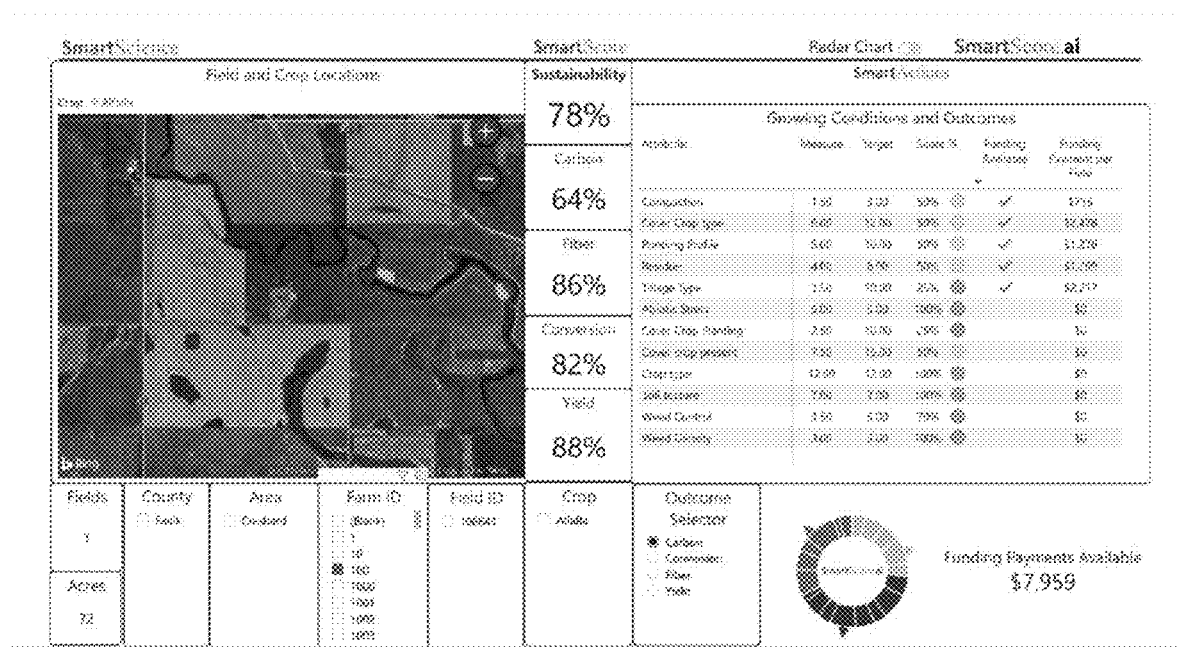

FIGS. 20B and 20C are two examples of scoring. FIG. 20B is wheat to bread example, where sustainability, carbon, fiber (bread), conversion rate (buns/acre) and yield are scored. In this use case the percent score is the probability the group of 10,000 fields will achieve the desired attributes. Note the funding available from conservation programs in the column to the right in this use case example. FIG. 20C is the same as the previous example shown in 20B, except the scope is one field.

Figure 20D:
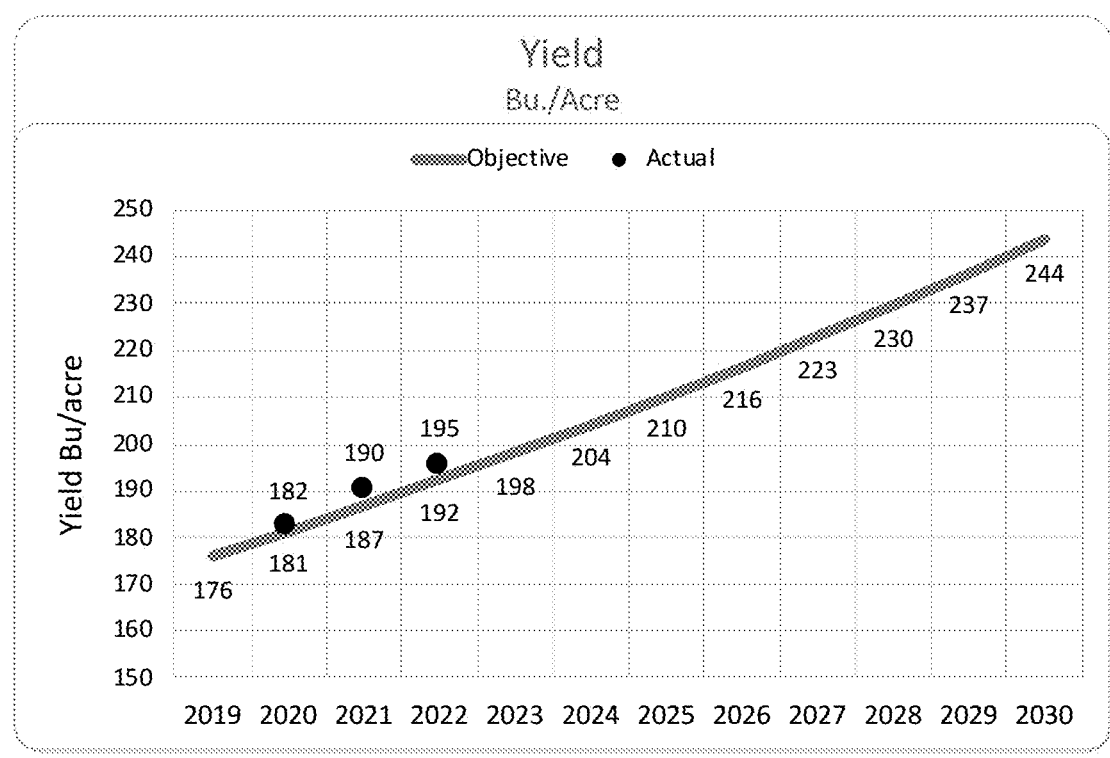
Figure 20E:
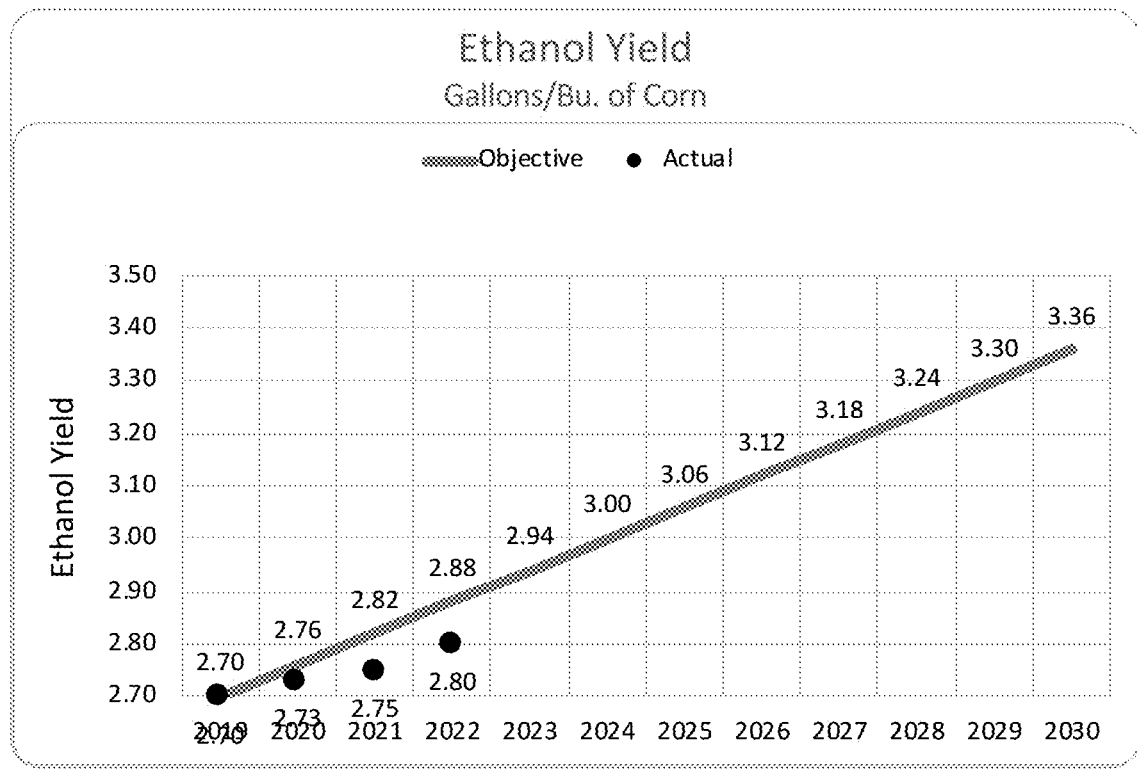
Figure 20F:
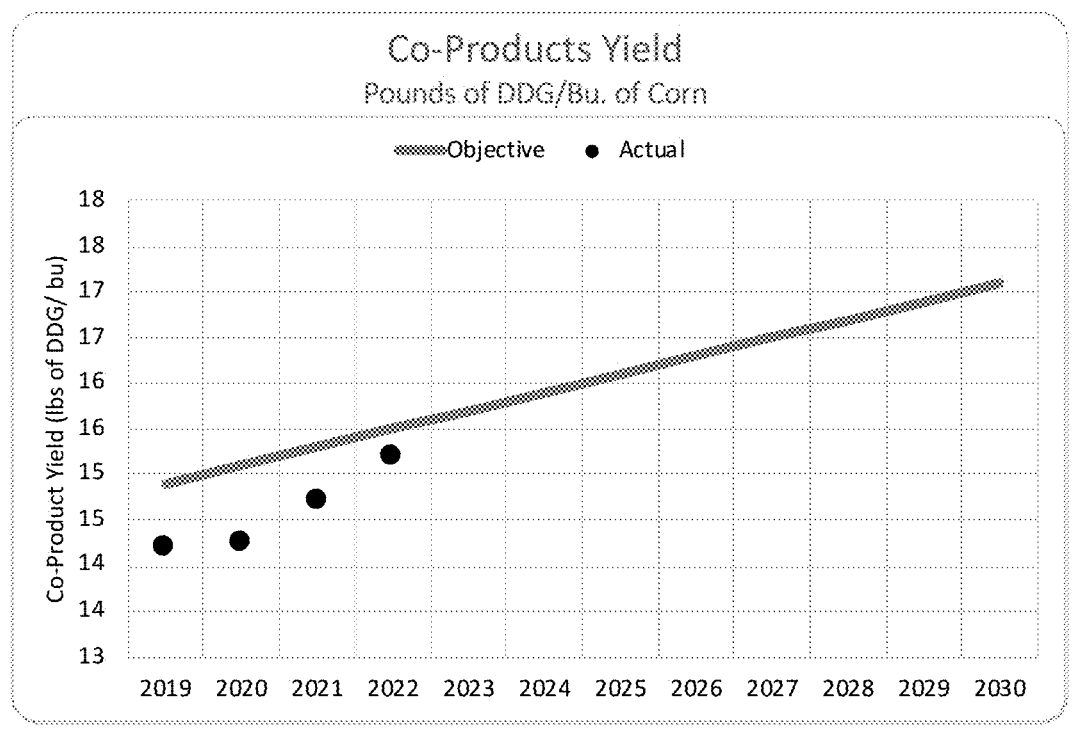
Figure 20G:
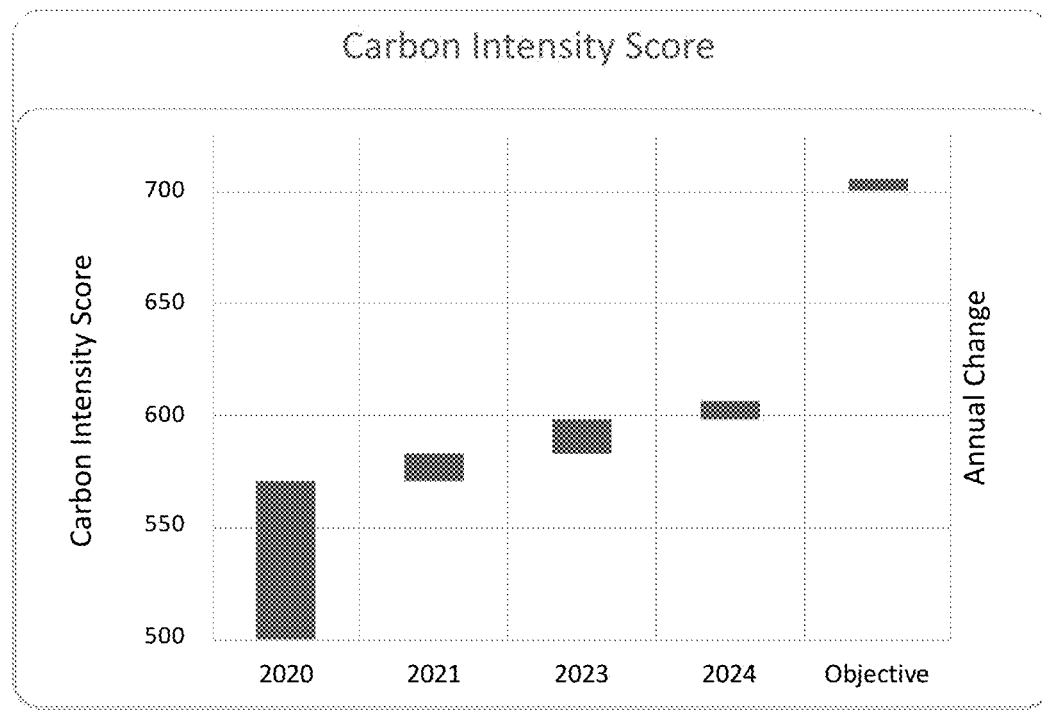
Figure 20H:
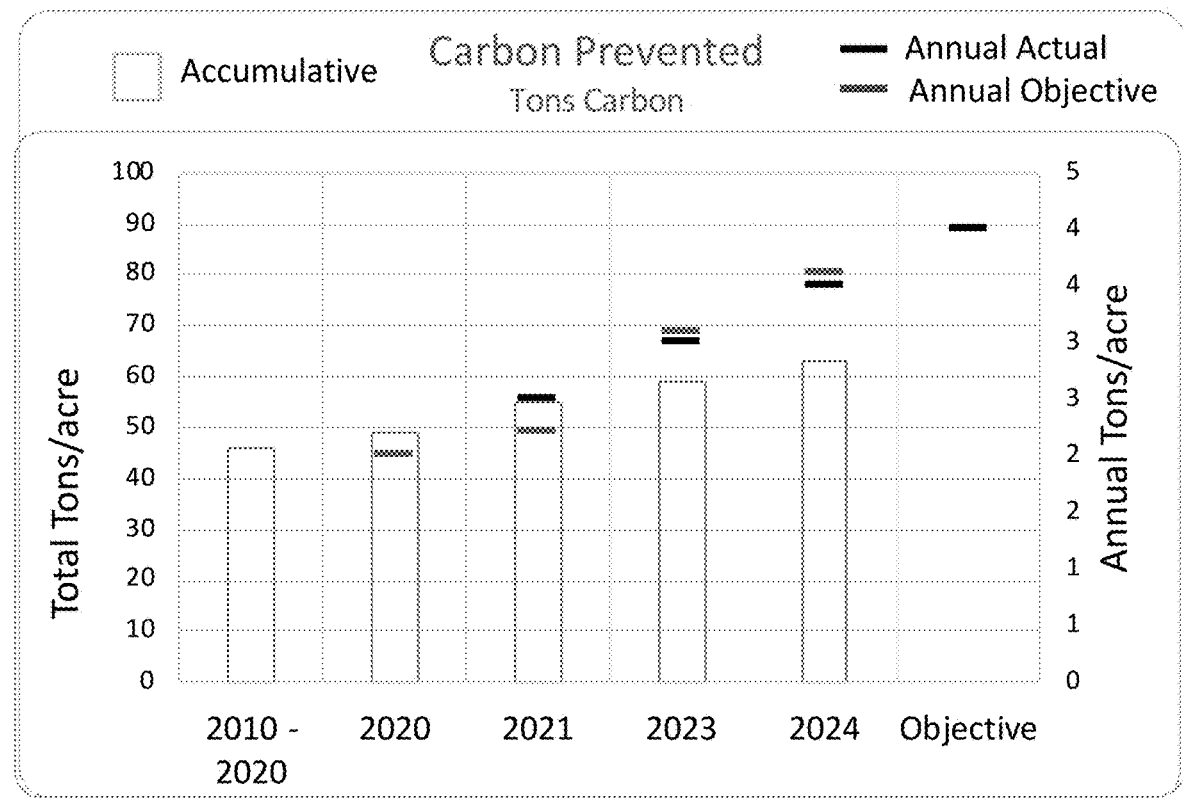
Figure 20I:
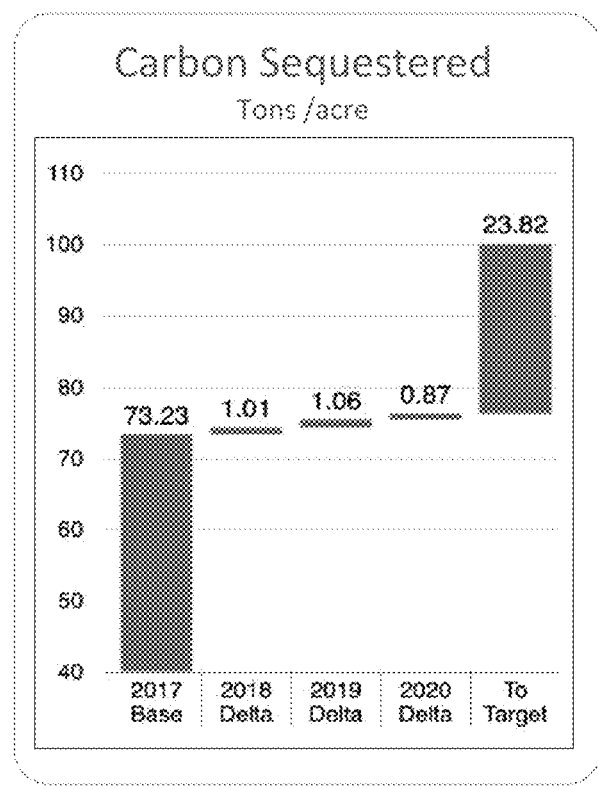
Figure 20J:
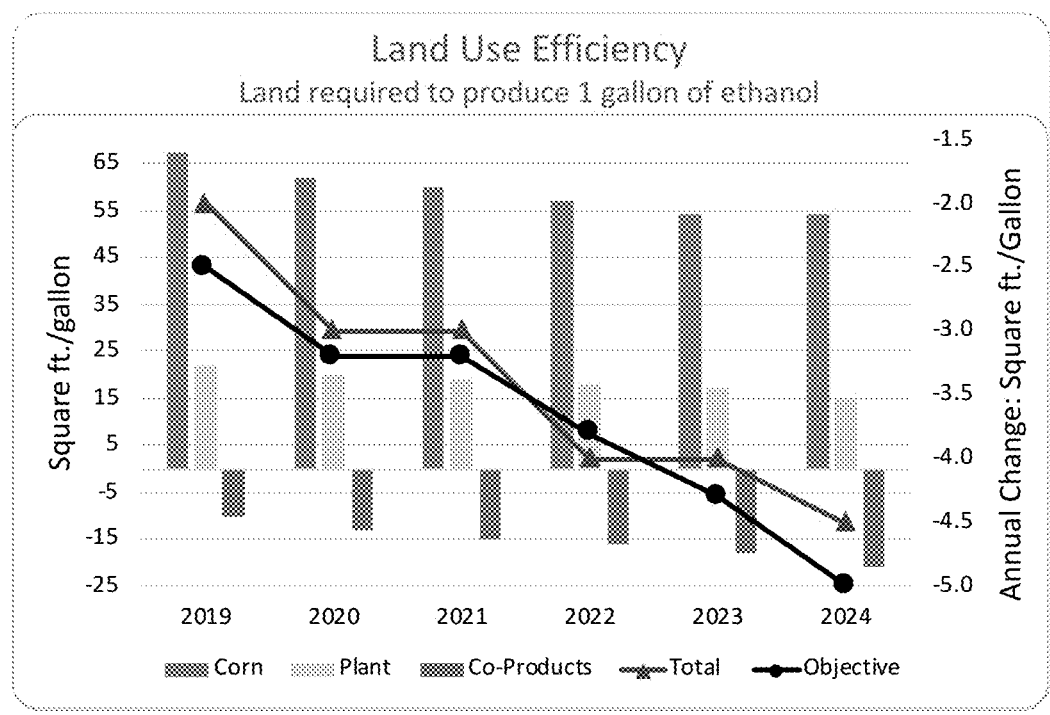
Figure 20K:
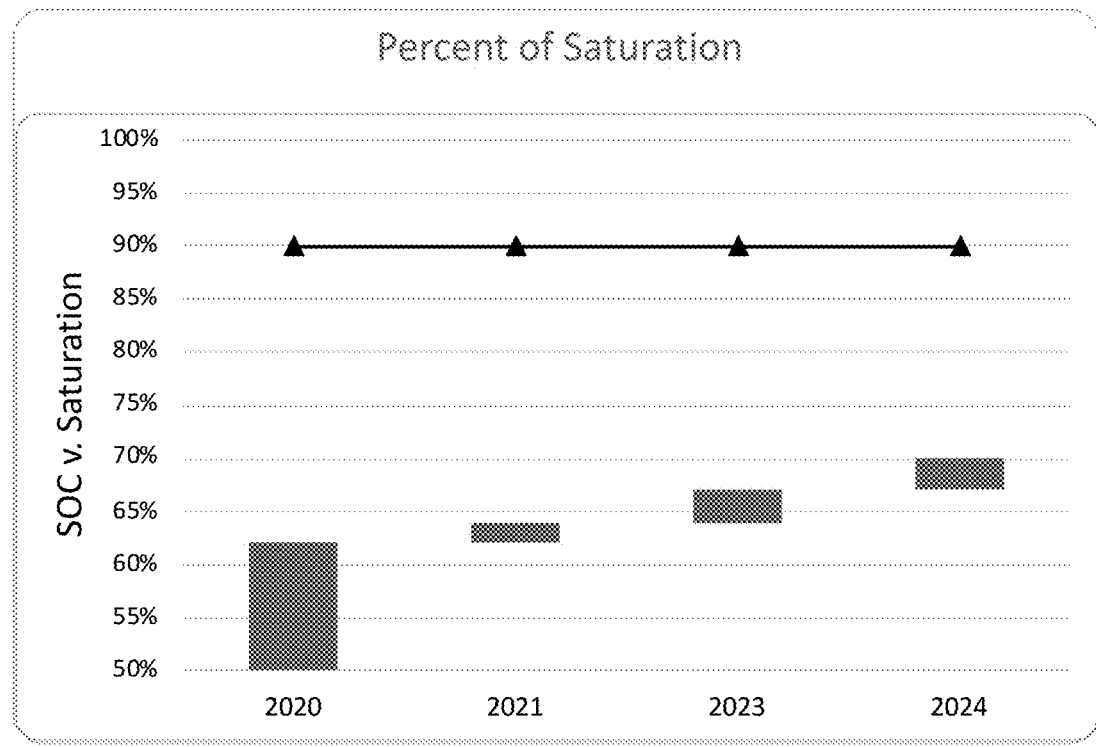

FIGS. 20J-Q are examples of additional scoring use cases, some score desired outcome attribute metrics over time. FIG. 20D shows the score of the yield at the farm field. FIG. 20E shows the score of ethanol yield per bu of corn. FIG. 20F shows the score of co-product yield when converting corn to ethanol. FIG. 20G shows the score of carbon intensity when producing ethanol. FIG. 20H shows the score of carbon prevented. FIG. 20I shows the score of carbon sequestered. FIG. 20J shows the score of land use. As farm yield and ethanol yield increase, less land is required to produce a gallon of ethanol. FIG. 20K shows the score of carbon sequester vs. saturation when producing ethanol.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical, or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A computerized system for identifying optimal growing conditions to achieve specific outcomes and for predicting a probability of successfully growing a crop with desired outcomes comprising:
   at least one measuring device for measuring growing conditions and outcomes comprising:
      a spectrometer, an alcohol analyzer, a refractometer, a titrator, and a
      moisture analyzer configured to test and measure location-specific attributes;
      wherein said at least one measuring device transmits collected data to a computer and a database; and
      wherein said computer is programmed to:
      capture said data needed to minimize redundancy and duplication;
      derive said data via captured samples of cropping related elements at specified locations;
      apply causative relationships between growing conditions and crop attributes to a plurality of fields;
      predict, within said plurality of fields, said probability of successfully growing said crop with desired outcomes;
      score a performance of said crop with desired outcomes; and
      identify issues that are limiting attributes via a plurality of machine learning operations comprising a generalized linear model, a generalized additive model, a non-parametric regression operation, a random forest classifier, a spatial regression operation, a Bayesian regression model, a time series analysis, a Bayesian network, a Guassian network, a decision tree learning operation, an artificial neural network a recurrent neural network, a reinforcement learning operation, a linear/non-linear regression operation, a support vector machine, a clustering operation, and a genetic algorithm operation, wherein said issues are based on at least one result from said at least one measuring device; and
   said database containing data collected from said at least one measuring device, desired outcomes, and their relationships.

2. A system according to claim 1 wherein said system is further implemented for identifying site-specific actions that can be taken to improve the probability of achieving specific outcomes based on said data collected from said at least one measuring device and said plurality of machine learning operations performed on said data.

3. A system according to claim 2 wherein said system is configured to identify programs that provide assistance to aid in the execution of the action plan comprising:
   a computer programmed to score the potential of said crop of interest to achieve desired outcomes; and
   a database containing programs including program criteria and funding.

4. A system according to claim 1 wherein said system for identifying growing conditions is coupled with optimization of an agricultural product based on an outcome from said plurality of machine learning operations.

5. A system according to claim 1 wherein said system for identifying growing condition is coupled with optimization of an agricultural service based on an outcome from said at plurality of machine learning operations.

6. A system according to claim 1 wherein a return on investment is calculated via said plurality of machine learning operations.

7. A system according to claim 1 wherein sampling locations are optimized via said plurality of machine learning operations to minimize the sampling costs and maximize data effectiveness.

* * * * *